US012808530B2

(12) United States Patent
Raposo et al.

(10) Patent No.: US 12,808,530 B2
(45) Date of Patent: Nov. 24, 2026

(54) UNDERWATER LIGHT HAVING A REPLACEABLE LIGHT-EMITTING DIODE (LED) MODULE AND CORD ASSEMBLY

(71) Applicant: Hayward Industries, Inc., Charlotte, NC (US)

(72) Inventors: Danny Raposo, Lincoln, RI (US); James Carter, Warren, RI (US); Steven Mitchell, Chepachet, RI (US); Jeffrey Cho, Northborough, MA (US); Yevgeny Rapoport, Mystic, CT (US)

(73) Assignee: Hayward Industries, Inc., Charlotte, NC (US)

( * ) Notice: Subject to any disclaimer, the term of this patent is extended or adjusted under 35 U.S.C. 154(b) by 0 days.

(21) Appl. No.: 18/800,524

(22) Filed: Aug. 12, 2024

(65) Prior Publication Data

US 2024/0401793 A1 Dec. 5, 2024

Related U.S. Application Data

(63) Continuation of application No. 17/436,514, filed as application No. PCT/US2020/021536 on Mar. 6, 2020, now Pat. No. 12,060,989.

(Continued)

(51) Int. Cl.

*F21V 31/00* (2006.01)
*F21V 3/10* (2018.01)

(Continued)

(52) U.S. Cl.

CPC .............. *F21V 31/005* (2013.01); *F21V 3/10* (2018.02); *F21V 19/003* (2013.01); *F21V 23/06* (2013.01);

(Continued)

(58) Field of Classification Search

CPC ........ F21V 31/005; F21V 3/10; F21V 19/003; F21V 23/06; F21V 29/763; F21V 19/04;

(Continued)

(56) References Cited

U.S. PATENT DOCUMENTS 1,874,513 A 8/1932 Hall
1,991,775 A 2/1935 Spencer (Continued)

FOREIGN PATENT DOCUMENTS

CN 2705700 6/2005
CN 1664439 A 9/2005

(Continued)

OTHER PUBLICATIONS

American/Pentair Niche w/1.0 in. Hub, Vinyl/Fbgls (10 Hole) (78232500), printed from Internet website http://www.poolplaza.com/P-PEN-78210400-2282. html (Oct. 19, 2010) (1 page).

(Continued)

*Primary Examiner* — Tsion Tumebo
(74) *Attorney, Agent, or Firm* — McCarter & English, LLP

(57) ABSTRACT

An underwater light having a replaceable light-emitting diode (LED) module and cord assembly is provided. The underwater light includes a lens, a bezel, a screw, a cable attachment assembly, a mounting flange, a rear housing, a fastening assembly, an internal lens, a printed circuit board (PCB) including light-emitting diodes (LEDs) mounted thereon, a heat sink, and an electronics assembly. The assembly of the underwater light provides for the dissipation of heat away from the PCB thereby cooling the LEDs and electronic components mounted thereon. The electrically non-conductive nature of the exterior components of the underwater light permit the underwater light to be installed in any location in a pool or spa. Since the exterior of the (Continued)

underwater light is electrically non-conductive, no specific bonding or grounding of the underwater light is necessary.

22 Claims, 40 Drawing Sheets

Related U.S. Application Data

(60) Provisional application No. 62/814,761, filed on Mar. 6, 2019.

(51) Int. Cl.

| | |
|---|---|
| ***F21V 19/00*** | (2006.01) |
| ***F21V 23/06*** | (2006.01) |
| ***F21V 29/76*** | (2015.01) |
| ***F21W 131/10*** | (2006.01) |
| ***F21Y 115/10*** | (2016.01) |

(52) U.S. Cl.
CPC ....... *F21V 29/763* (2015.01); *F21W 2131/10* (2013.01); *F21Y 2115/10* (2016.08)

(58) Field of Classification Search
CPC ..... F21V 27/02; F21V 31/04; F21W 2131/10; F21Y 2115/10; F21Y 2105/16; F21S 8/00
See application file for complete search history.

(56) References Cited

U.S. PATENT DOCUMENTS

| | | | |
|---|---|---|---|
| 2,057,186 | A | 10/1936 | Freeberg |
| 2,323,793 | A | 7/1943 | Clark |
| 2,355,607 | A | 8/1944 | Shepherd |
| 2,881,409 | A | 4/1959 | Cook |
| 2,903,674 | A | 9/1959 | Schwab |
| 3,020,522 | A | 2/1962 | Lesher |
| 3,114,127 | A | 12/1963 | Ramsey |
| 3,213,377 | A | 10/1965 | Neale |
| 3,255,433 | A | 6/1966 | Lesher |
| 3,257,641 | A | 6/1966 | Campana et al. |
| 3,271,734 | A | 9/1966 | Cabe et al. |
| 3,435,213 | A | 3/1969 | Colbow et al. |
| 3,594,720 | A | 7/1971 | Cane |
| 3,804,049 | A | 4/1974 | Greer |
| 4,053,758 | A | 10/1977 | Shaw |
| 4,054,792 | A | 10/1977 | Brudy |
| 4,135,144 | A | 1/1979 | Elmasian |
| 4,298,868 | A | 11/1981 | Spurgeon |
| 4,392,187 | A | 7/1983 | Bornhorst |
| 4,636,036 | A | 1/1987 | Pasquali |
| 4,729,076 | A | 3/1988 | Masami et al. |
| 4,814,800 | A | 3/1989 | Lavinsky et al. |
| 4,890,208 | A | 12/1989 | Izenour |
| 4,974,133 | A | 11/1990 | Fujiki |
| 5,045,983 | A | 9/1991 | Shields |
| 5,220,464 | A | 6/1993 | Lin |
| 5,256,948 | A | 10/1993 | Boldin et al. |
| 5,295,054 | A | 3/1994 | Baader et al. |
| 5,528,474 | A | 6/1996 | Roney et al. |
| 5,632,551 | A | 5/1997 | Roney et al. |
| 5,649,242 | A | 7/1997 | O'Brien et al. |
| 5,785,418 | A | 7/1998 | Hochstein |
| 5,842,771 | A | 12/1998 | Thrasher et al. |
| 5,893,626 | A | 4/1999 | Poling |
| 6,002,216 | A | 12/1999 | Mateescu |
| 6,016,038 | A | 1/2000 | Mueller et al. |
| 6,045,240 | A | 4/2000 | Hochstein |
| 6,081,191 | A | 6/2000 | Green et al. |
| RE36,790 | E | 7/2000 | Jincks et al. |
| 6,090,484 | A | 7/2000 | Bergerson |
| 6,100,791 | A | 8/2000 | Bader et al. |
| 6,152,577 | A | 11/2000 | Rizkin et al. |
| 6,166,496 | A | 12/2000 | Lys et al. |
| 6,175,354 | B1 | 1/2001 | Blissett et al. |
| 6,184,628 | B1 | 2/2001 | Ruthenberg |
| 6,196,471 | B1 | 3/2001 | Ruthenberg |
| 6,211,626 | B1 | 4/2001 | Lys et al. |
| 6,241,361 | B1 | 6/2001 | Thrasher et al. |
| 6,241,362 | B1 | 6/2001 | Morrison |
| 6,292,901 | B1 | 9/2001 | Lys et al. |
| 6,357,889 | B1 | 3/2002 | Duggal et al. |
| 6,367,541 | B2 | 4/2002 | McCullough |
| 6,379,025 | B1 | 4/2002 | Mateescu et al. |
| 6,435,691 | B1 | 8/2002 | Macey et al. |
| 6,441,943 | B1 | 8/2002 | Roberts et al. |
| 6,459,919 | B1 | 10/2002 | Lys et al. |
| 6,528,954 | B1 | 3/2003 | Lys et al. |
| 6,548,967 | B1 | 4/2003 | Dowling et al. |
| 6,554,454 | B1 | 4/2003 | Kitano |
| 6,585,399 | B2 | 7/2003 | Kreutzer et al. |
| 6,608,453 | B2 | 8/2003 | Morgan et al. |
| 6,616,291 | B1 | 9/2003 | Love |
| 6,622,053 | B1 | 9/2003 | Hewlett et al. |
| 6,624,597 | B2 | 9/2003 | Dowling et al. |
| 6,717,376 | B2 | 4/2004 | Lys et al. |
| 6,720,745 | B2 | 4/2004 | Lys et al. |
| 6,774,584 | B2 | 8/2004 | Lys et al. |
| 6,777,891 | B2 | 8/2004 | Lys et al. |
| 6,781,329 | B2 | 8/2004 | Mueller et al. |
| 6,798,154 | B1 | 9/2004 | Sullivan et al. |
| 6,801,003 | B2 | 10/2004 | Schanberger et al. |
| 6,811,286 | B2 | 11/2004 | Mateescu et al. |
| 6,831,679 | B1 | 12/2004 | Olsson et al. |
| 6,869,204 | B2 | 3/2005 | Morgan et al. |
| 6,883,929 | B2 | 4/2005 | Dowling |
| 6,886,625 | B1 | 5/2005 | Sagal et al. |
| 6,888,322 | B2 | 5/2005 | Dowling et al. |
| 6,896,045 | B2 | 5/2005 | Panek |
| 6,897,624 | B2 | 5/2005 | Lys et al. |
| 6,936,978 | B2 | 8/2005 | Morgan et al. |
| 6,965,205 | B2 | 11/2005 | Piepgras et al. |
| 6,967,448 | B2 | 11/2005 | Morgan et al. |
| 6,969,954 | B2 | 11/2005 | Lys |
| 6,971,760 | B2 | 12/2005 | Archer et al. |
| 6,975,079 | B2 | 12/2005 | Lys et al. |
| 6,981,805 | B2 | 1/2006 | Miller et al. |
| 7,023,147 | B2 | 4/2006 | Colby et al. |
| 7,031,920 | B2 | 4/2006 | Dowling et al. |
| 7,038,398 | B1 | 5/2006 | Lys et al. |
| 7,038,399 | B2 | 5/2006 | Lys et al. |
| 7,055,988 | B2 | 6/2006 | Mateescu et al. |
| 7,064,498 | B2 | 6/2006 | Dowling et al. |
| 7,097,329 | B2 | 8/2006 | Mateescu et al. |
| 7,113,541 | B1 | 9/2006 | Lys et al. |
| 7,125,146 | B2 | 10/2006 | Willis et al. |
| 7,128,440 | B2 | 10/2006 | Mateescu et al. |
| 7,132,635 | B2 | 11/2006 | Dowling |
| 7,132,785 | B2 | 11/2006 | Ducharme |
| 7,135,824 | B2 | 11/2006 | Lys et al. |
| 7,139,617 | B1 | 11/2006 | Morgan et al. |
| 7,161,311 | B2 | 1/2007 | Mueller et al. |
| 7,161,556 | B2 | 1/2007 | Morgan et al. |
| 7,178,941 | B2 | 2/2007 | Roberge et al. |
| 7,180,252 | B2 | 2/2007 | Lys et al. |
| 7,186,003 | B2 | 3/2007 | Dowling et al. |
| 7,202,613 | B2 | 4/2007 | Morgan et al. |
| 7,204,602 | B2 | 4/2007 | Archer |
| 7,204,622 | B2 | 4/2007 | Dowling et al. |
| 7,228,190 | B2 | 6/2007 | Dowling et al. |
| 7,231,060 | B2 | 6/2007 | Dowling et al. |
| 7,233,115 | B2 | 6/2007 | Lys |
| 7,233,831 | B2 | 6/2007 | Blackwell |
| 7,242,152 | B2 | 7/2007 | Dowling et al. |
| 7,248,239 | B2 | 7/2007 | Dowling et al. |
| 7,253,566 | B2 | 8/2007 | Lys et al. |
| 7,255,457 | B2 | 8/2007 | Ducharme et al. |
| 7,256,554 | B2 | 8/2007 | Lys |
| 7,278,762 | B2 | 10/2007 | Schottland et al. |
| 7,300,192 | B2 | 11/2007 | Mueller et al. |
| 7,303,300 | B2 | 12/2007 | Dowling et al. |
| 7,303,301 | B2 | 12/2007 | Koren et al. |
| 7,344,279 | B2 | 3/2008 | Mueller et al. |
| 7,352,339 | B2 | 4/2008 | Morgan et al. |

(56) References Cited

U.S. PATENT DOCUMENTS

| | | | |
|---|---|---|---|
| 7,353,071 | B2 | 4/2008 | Blackwell et al. |
| 7,357,525 | B2 | 4/2008 | Doyle |
| 7,358,679 | B2 | 4/2008 | Lys et al. |
| 7,358,706 | B2 | 4/2008 | Lys |
| 7,358,929 | B2 | 4/2008 | Mueller et al. |
| 7,364,488 | B2 | 4/2008 | Mueller et al. |
| 7,396,139 | B2 | 7/2008 | Savage |
| 7,410,268 | B2 | 8/2008 | Koren et al. |
| 7,482,764 | B2 | 1/2009 | Morgan et al. |
| 7,488,084 | B2 | 2/2009 | Potucek et al. |
| 7,497,595 | B2 | 3/2009 | Mateescu et al. |
| 7,514,884 | B2 | 4/2009 | Potucek et al. |
| 7,520,628 | B1 | 4/2009 | Sloan et al. |
| 7,524,086 | B1 | 4/2009 | Saieva |
| 7,553,040 | B2 | 6/2009 | Boothe et al. |
| 7,591,564 | B1 | 9/2009 | Ball et al. |
| 7,628,512 | B2 | 12/2009 | Netzel, Sr. et al. |
| 7,705,240 | B2 | 4/2010 | Armstrong et al. |
| 7,722,216 | B2 | 5/2010 | Amor et al. |
| 7,914,162 | B1 | 3/2011 | Huang |
| 8,172,434 | B1 | 5/2012 | Olsson |
| RE43,492 | E | 6/2012 | Willis et al. |
| 9,316,387 | B1 | 4/2016 | Olsson et al. |
| 10,718,507 | B2 | 7/2020 | Potucek et al. |
| 11,168,876 | B2 | 11/2021 | Raposo et al. |
| 11,754,268 | B2 | 9/2023 | Raposo et al. |
| 12,060,989 | B2 | 8/2024 | Raposo et al. |
| 2002/0043938 | A1 | 4/2002 | Lys |
| 2002/0074559 | A1 | 6/2002 | Dowling et al. |
| 2002/0113555 | A1 | 8/2002 | Lys et al. |
| 2002/0130627 | A1 | 9/2002 | Morgan et al. |
| 2002/0149933 | A1 | 10/2002 | Archer et al. |
| 2002/0152045 | A1 | 10/2002 | Dowling et al. |
| 2002/0163316 | A1 | 11/2002 | Lys et al. |
| 2002/0171377 | A1 | 11/2002 | Mueller et al. |
| 2002/0176259 | A1 | 11/2002 | Ducharme |
| 2003/0048632 | A1 | 3/2003 | Archer |
| 2003/0057884 | A1 | 3/2003 | Dowling et al. |
| 2003/0133292 | A1 | 7/2003 | Mueller et al. |
| 2004/0047145 | A1 | 3/2004 | Koren |
| 2004/0052076 | A1 | 3/2004 | Mueller et al. |
| 2004/0085754 | A1 | 5/2004 | Koren et al. |
| 2004/0105261 | A1 | 6/2004 | Ducharme et al. |
| 2004/0141321 | A1 | 7/2004 | Dowling et al. |
| 2004/0184284 | A1 | 9/2004 | Buelow et al. |
| 2004/0208008 | A1 | 10/2004 | Mateescu et al. |
| 2004/0223320 | A1 | 11/2004 | Archer et al. |
| 2004/0252520 | A1 | 12/2004 | Martineau et al. |
| 2005/0040774 | A1 | 2/2005 | Mueller et al. |
| 2005/0041161 | A1 | 2/2005 | Dowling et al. |
| 2005/0047134 | A1 | 3/2005 | Mueller et al. |
| 2005/0047772 | A1 | 3/2005 | Hayami et al. |
| 2005/0088119 | A1 | 4/2005 | Potucek et al. |
| 2005/0088434 | A1 | 4/2005 | Potucek |
| 2005/0099824 | A1 | 5/2005 | Dowling et al. |
| 2005/0116665 | A1 | 6/2005 | Colby et al. |
| 2005/0128751 | A1 | 6/2005 | Roberge et al. |
| 2005/0168970 | A1 | 8/2005 | Mateescu et al. |
| 2005/0174473 | A1 | 8/2005 | Morgan et al. |
| 2005/0213352 | A1 | 9/2005 | Lys |
| 2005/0213353 | A1 | 9/2005 | Lys |
| 2005/0218870 | A1 | 10/2005 | Lys |
| 2005/0248299 | A1 | 11/2005 | Chemel et al. |
| 2005/0276044 | A1 | 12/2005 | Mateescu et al. |
| 2006/0002104 | A1 | 1/2006 | Willis et al. |
| 2006/0012987 | A9 | 1/2006 | Ducharme et al. |
| 2006/0022214 | A1 | 2/2006 | Morgan et al. |
| 2006/0023454 | A1 | 2/2006 | Koren |
| 2006/0072323 | A1 | 4/2006 | Poggi |
| 2006/0076908 | A1 | 4/2006 | Morgan et al. |
| 2006/0087850 | A1 | 4/2006 | Thompson et al. |
| 2006/0092636 | A1 | 5/2006 | Potucek et al. |
| 2006/0198128 | A1 | 9/2006 | Piepgras et al. |
| 2006/0215408 | A1 | 9/2006 | Lee |
| 2006/0238130 | A1 | 10/2006 | Hosoya |
| 2006/0291213 | A1 | 12/2006 | Mateescu et al. |
| 2007/0096134 | A1 | 5/2007 | Kim et al. |
| 2007/0097667 | A1 | 5/2007 | Armstrong et al. |
| 2007/0097675 | A1 | 5/2007 | Koren et al. |
| 2007/0139913 | A1 | 6/2007 | Savage |
| 2007/0159833 | A1 | 7/2007 | Netzel et al. |
| 2007/0230194 | A1 | 10/2007 | Julia Vilarrasa |
| 2007/0263378 | A1 | 11/2007 | Koren |
| 2008/0112157 | A1 | 5/2008 | Boothe et al. |
| 2008/0165547 | A1 | 7/2008 | Amor et al. |
| 2008/0197788 | A1 | 8/2008 | Conover et al. |
| 2008/0297068 | A1 | 12/2008 | Koren et al. |
| 2009/0013570 | A1 | 1/2009 | Grajcar |
| 2009/0109617 | A1 | 4/2009 | Grajcar |
| 2009/0180281 | A1 | 7/2009 | Ahland, III et al. |
| 2009/0180290 | A1 | 7/2009 | Grajcar |
| 2009/0185350 | A1 | 7/2009 | Grajcar |
| 2009/0185373 | A1 | 7/2009 | Grajcar |
| 2009/0204239 | A1 | 8/2009 | Netzel, Sr. et al. |
| 2010/0118511 | A1 | 5/2010 | Wegat |
| 2010/0157599 | A1 | 6/2010 | Carter et al. |
| 2011/0096548 | A1 | 4/2011 | Pickard |
| 2011/0267834 | A1* | 11/2011 | Potucek .................. F21V 29/70 362/267 |
| 2013/0182442 | A1 | 7/2013 | Potucek et al. |
| 2013/0249375 | A1 | 9/2013 | Panagotacos et al. |
| 2013/0264943 | A1 | 10/2013 | Bora et al. |
| 2015/0184837 | A1* | 7/2015 | Zhang ....................... F21K 9/20 362/294 |
| 2017/0122544 | A1 | 5/2017 | Schmitt |
| 2017/0261196 | A1 | 9/2017 | Chapman et al. |
| 2017/0299159 | A1 | 10/2017 | Mjelde |
| 2017/0343185 | A1 | 11/2017 | Fieberg et al. |
| 2018/0087741 | A1* | 3/2018 | McFadyen .......... F21V 23/0442 |
| 2022/0065432 | A1 | 3/2022 | Raposo et al. |
| 2022/0186921 | A1 | 6/2022 | Raposo et al. |

FOREIGN PATENT DOCUMENTS

| | | |
|---|---|---|
| CN | 101010234 A | 8/2007 |
| DE | 10321992 | 3/2005 |
| DE | 102008056498 | 5/2010 |
| EP | 1016062 | 7/2000 |
| GB | 2239306 | 6/1991 |
| WO | 1999/31560 | 6/1999 |
| WO | 00/01067 | 1/2000 |
| WO | 01/05195 | 1/2001 |
| WO | 01/24584 | 4/2001 |
| WO | 01/36864 | 5/2001 |
| WO | 01/82657 | 11/2001 |
| WO | 01/99475 | 12/2001 |
| WO | 02/10847 | 2/2002 |
| WO | 02/11497 | 2/2002 |
| WO | 02/12127 | 2/2002 |
| WO | 02/13490 | 2/2002 |
| WO | 02/18913 | 3/2002 |
| WO | 02/25842 | 3/2002 |
| WO | 02/040921 | 5/2002 |
| WO | 02/045467 | 6/2002 |
| WO | 02/061330 | 8/2002 |
| WO | 02/069306 | 9/2002 |
| WO | 02/091805 | 11/2002 |
| WO | 02/098182 | 12/2002 |
| WO | 02/098183 | 12/2002 |
| WO | 02/099780 | 12/2002 |
| WO | 02/101702 | 12/2002 |
| WO | 03/024269 | 3/2003 |
| WO | 03/026358 | 3/2003 |
| WO | 03/055273 | 7/2003 |
| WO | 03/067934 | 8/2003 |
| WO | 03/096761 | 11/2003 |
| WO | 2004/021747 | 3/2004 |
| WO | 2004/023850 | 3/2004 |
| WO | 2004/032572 | 4/2004 |
| WO | 2004/094896 | 11/2004 |
| WO | 2004/100624 | 11/2004 |
| WO | 2005/012997 | 2/2005 |
| WO | 2005/060309 | 6/2005 |
| WO | 2005/084339 | 9/2005 |

(56) References Cited

FOREIGN PATENT DOCUMENTS

| | | |
|---|---|---|
| WO | 2005/089293 | 9/2005 |
| WO | 2005/089309 | 9/2005 |
| WO | 2006/023149 | 3/2006 |
| WO | 2006/031753 | 3/2006 |
| WO | 2006/031810 | 3/2006 |
| WO | 2008/067402 | 6/2008 |
| WO | 2010/032062 | 3/2010 |

OTHER PUBLICATIONS

American/Pentair Niche w/3/4 in. Side Hub, Concrete (78210400), printed from Internet website http://www.poolplaza.com/P-PEN-78210400-2282. html (Oct. 19, 2010) (1 page).
Aqua Logic Automation and Chlorination Operation Manual (2004) (40 pages).
Bond-Ply 100—"Thermally Conductive, Fiberglass Reinforced Pressure Sensitive Adhesive Tape," The Bergquist Company, http://www.bergquistcompany.com, publicly available prior to Dec. 24, 2008 (3 pages).
CoolPoly® D5108 Thermally Conductive Polyphenylene Sulfide (PPS), Product Data Sheet dated Aug. 8, 2007 (2 pages).
Communication (Notice of Intetnion to Grant) mailed Oct. 31, 2017, issued in connection with European Patent Application No. 11164216.1 (5 pages).
Decision on Appeal issued by the Patent Trial and Appeal Board on Dec. 12, 2019, in connection with U.S. Appl. No. 13/786,739 (12 pages).
Decision on Appeal issued by the Patent Trial and Appeal Board on Jan. 30, 2020, in connection with U.S. Appl. No. 12/769,038 (14 pages).
Examination Report dated Feb. 20, 2017, issued by the Canadian Intellectual Property Office in connection with Canadian Patent Application No. 2,738,255 (7 pages).
Examiner's Answer in response to Appeal Brief dated Dec. 10, 2018, issued in connection with U.S. Appl. No. 13/786,739 (12 pages).
Examiner's Answer to Appeal Brief mailed Nov. 27, 2018, issued in connection with U.S. Appl. No. 12/769,038 (10 pages).
Extended European Search Report mailed Aug. 22, 2011, issued in connection with European Patent Application No. 11164216.1 (7 pages).
Notice of Allowance mailed Mar. 9, 2020, issued in connection with U.S. Appl. No. 13/786,739 (7 pages).
Office Action (Restriction Requirement) mailed May 9, 2011, issued in connection with U.S. Appl. No. 12/769,038 (9 pages).
Office Action dated Apr. 1, 2015, issued in connection with U.S. Appl. No. 13/786,739 (20 pages).
Office Action dated Apr. 2, 2015, issued in connection with U.S. Appl. No. 12/769,038 (15 pages).
Office Action dated Aug. 20, 2014, issued in connection with U.S. Appl. No. 12/769,038 (11 pages).
Office Action dated Dec. 3, 2013, issued in connection with U.S. Appl. No. 12/769,038 (10 pages).
Office Action dated Jan. 6, 2016, issued in connection with U.S. Appl. No. 13/786,739 (19 pages).
Office Action dated May 9, 2012, issued in connection with U.S. Appl. No. 12/769,038 (11 pages).
Office Action dated Nov. 18, 2016, issued in connection with European Patent Application No. 11164216.1 (6 pages).
Office Action dated Nov. 3, 2015, issued in connection with European Patent Application No. 11164216.1 (9 pages).
Office Action dated Sep. 6, 2011, issued in connection with U.S. Appl. No. 12/769,038 (11 pages).
Office Action mailed Aug. 15, 2017, issued in connection with U.S. Appl. No. 13/786,739 (23 pages).
Office Action mailed Aug. 20, 2014, issued in connection with U.S. Appl. No. 13/786,739 (15 pages).
Office Action mailed Aug. 25, 2017, issued in connection with U.S. Appl. No. 12/769,038 (15 pages).
Office Action mailed Dec. 30, 2015, issued in connection with U.S. Appl. No. 12/769,038 (13 pages).
Office Action mailed Dec. 4, 2013, issued in connection with U.S. Appl. No. 13/786,739 (11 pages).
Office Action mailed Nov. 17, 2016, issued in connection with U.S. Appl. No. 12/769,038 (13 pages).
Office Action mailed Nov. 22, 2016, issued in connection with U.S. Appl. No. 13/786,739 (21 pages).
Patent Examination Report dated Dec. 3, 2015, issued in connection with Australian Patent Application No. 2011201916 (4 pages).
Patent Examination Report dated Jul. 19, 2016, issued in connection with Australian Patent Application No. 2015271887 (3 pages).
Patent Examination Report dated Mar. 18, 2014, issued in connection with Australian Patent Application No. 2011201916 (4 pages).
Patent Examination Report dated May 13, 2015, issued in connection with Australian Patent Application No. 2011201916 (4 pages).
Supplemental Examiner's Answer to Appeal Brief, dated Jan. 16, 2019, issued in connection with U.S. Appl. No. 13/786,739 (2 pages).
Supplemental Notice of Allowability mailed Mar. 25, 2020, issued in connection with U.S. Appl. No. 13/786,739 (4 pages).
Third Party Observations dated Apr. 11, 2015, submitted in connection with European Patent Application No. 11164216.1 (2 pages).
U.S. Appl. No. 60/068,792 entitled "Multi-Color Intelligent Lighting" filed Dec. 24, 1997, Inventors: George G. Mueller and Ihor Lys (2 pages).
U.S. Appl. No. 60/071,281 entitled "Digitally Controlled Light Emitting Diode Systems and Methods" filed Dec. 17, 1997, Inventors: George G. Mueller and Ihor A. Lys (24 pages).
U.S. Appl. No. 60/078,861 entitled "Digital Lighting Systems" filed Mar. 20, 1998, Inventors: Ihor Lys (2 pages).
U.S. Appl. No. 60/079,285 entitled "Systems and Methods for Controlled Illumination" filed Mar. 25, 1998, Inventors: George G. Mueller and Ihor Lys (34 pages).
U.S. Appl. No. 60/090,920 entitled "Method for Software Driven Generation of Multiple Simultaneous High Speed Pulse Width Modulated Signals" filed Jun. 26, 1998, Inventors: Ihor Lys (8 pages).
U.S. Appl. No. 60/199,333 entitled "Autonomous Color Changing Accessory" filed Apr. 24, 2000, Inventors: Al Ducharme, Ihor Lys and Kevin Dowling (19 pages).
U.S. Appl. No. 60/243,250 entitled "Illumination of Liquids" filed Oct. 25, 2000, Inventors: Frederick Morgan, Timothy Holmes, Chris Cantone, Ihor Lys and George Mueller (24 pages).
U.S. Appl. No. 60/290,101 entitled "Systems and Methods for Synchronizing Illumination Systems" filed May 10, 2001, Inventors: Kevin Dowling and Eric K. Schanberger (27 pages).
U.S. Appl. No. 60/296,377 entitled "Systems and Methods for Controlling Lighting Systems" filed Jun. 6, 2001, Inventors: Mike Blackwell (11 pages).
U.S. Appl. No. 60/297,828 entitled "Systems and Methods for Controlling Lighting Systems" filed Jun. 13, 2001, Inventors: George Mueller, Frederick Morgan, Ihor Lys and Kevin Dowling (13 pages).
U.S. Appl. No. 60/515,090 entitled "Color Changing Image with Backlighting and Combination Localized Gray-Scale and Color Image" filed Oct. 28, 2003, Inventors: Kevin Potucek and Kevin Murphy (13 pages).
English Translation of the First Office Action dated Jul. 31, 2014, issued in connection with Chinese Patent Application No. 201110152483.3 (11 pages).
English Translation of the Second Office Action dated May 21, 2015, issued in connection with Chinese Patent Application No. 201110152483.3 (4 pages).
IntelliBrite™ Underwater Color-Changing Lights (2007) (4 pages).
International Preliminary Report on Patentability mailed Apr. 6, 2021 in connection with International Application No. PCT/US2020/021536, including annexed PCT Article 34 Amendments filed Jan. 6, 2021 (51 pages).
International Search Report and Written Opinion of the International Searching Authority dated Jun. 19, 2020, issued in connection with International application No. PCT/US2020/021536 (7 pages).

(56) References Cited

OTHER PUBLICATIONS

International Search Report of the International Searching Authority mailed Jun. 12, 2008, issued in connection with International Patent Appl. No. PCT/US07/85793 (3 pages).
Jandy Installation Manual Jandy Housing for Wet Niche Fixtures (2007) (8 pages).
Jandy ProNiche ~ Pool & Spa Light Niches, product description (2007) (2 pages).
Notice of Allowance dated Apr. 25, 2023, issued in connection with U.S. Appl. No. 17/522,700 (7 pages).
Notice of Allowance dated Apr. 4, 2024, issued in connection with U.S. Appl. No. 17/436,514 (7 pages).
Notice of Allowance dated Jun. 22, 2021, issued in connection with U.S. Appl. No. 16/812,037 (6 pages).
Notice of Allowance dated Mar. 16, 2021, issued in connection with U.S. Appl. No. 16/812,037 (10 pages).
Office Action dated Feb. 1, 2024, issued in connection with U.S. Appl. No. 18/225,547 (8 pages).
Office Action dated Mar. 1, 2023, issued in connection with U.S. Appl. No. 17/436,514 (17 pages).
Office Action dated Oct. 11, 2022, issued in connection with U.S. Appl. No. 17/522,700 (12 pages).
Office Action dated Oct. 21, 2020, issued in connection with U.S. Appl. No. 16/812,037 (11 pages).
Office Action dated Sep. 14, 2023, issued in connection with U.S. Appl. No. 17/436,514 (17 pages).
Pentair 620004 AmerLite Quick Niche, printed from Internet website http://www.aqua-man.com/row_num.asp?Ic=1892 (Oct. 19, 2010) (2 pages).
Pentair 79206700 AmerLite Large Plastic Niche, printed from Internet website http://www.aqua-man.com/row_num.asp?Ic=1895 (Oct. 19, 2010) (2 pages).
Product Specifications for Jandy ProNiche Pool and Spa Light Niches, printed from Internet website http://www.jandy.com/html/products/lights/proniche/specs.php (Oct. 19, 2010) (2 pages).
QuickNiche Vinyl Pool Lighting Niche by Pentair Water Pool and Spa, product description (2006) (2 pages).
Sta-Rite Large Underwater Light Niche Owner's Manual (2004) (8 pages).
Underwater ColorLogic™ LED Lighting Fixtures SP0523(S) Owner's Manual (2004) (12 pages).
Underwater ColorLogic™ LED Lighting Fixtures SP0524(S), SP0525(S), SP0527(S), SP0532(S), SP0533(S) and SP0535(S) Owner's Manual (2004) (12 pages).
Underwater ColorLogic™ LED Lighting Fixtures SP0525(S) Owner's Manual (2004) (12 pages).
Written Opinion of the International Searching Authority mailed Jun. 12, 2008, issued in connection with International Patent Appl. No. PCT/US07/85793 (5 pages).
Notice of Allowance dated Aug. 20, 2024 issued in connection with U.S. Appl. No. 18/225,547 (7 pages).
Notice of Allowance dated Apr. 16, 2024, issued in connection with U.S. Appl. No. 17/436,514 (2 pages).
Canadian Office Action dated Sep. 5, 2025, issued in connection with Canadian Patent Appln. No. 3,132,690 (7 pages).
Office Action dated Apr. 1, 2026, issued in connection with U.S. Appl. No. 19/018,751 (8 pages).

* cited by examiner

UNDERWATER LIGHT HAVING A REPLACEABLE LIGHT-EMITTING DIODE (LED) MODULE AND CORD ASSEMBLY

RELATED APPLICATIONS

The present application is a continuation of, and claims the benefit of priority to, U.S. patent application Ser. No. 17/436,514 filed on Sep. 3, 2021, which claims the benefit of priority to U.S. National Phase Application under 35 U.S.C. § 371 of International Application No. PCT/US2020/021536 filed on Mar. 6, 2020, which claims the benefit of priority to U.S. Provisional Patent Application Ser. No. 62/814,761, filed on Mar. 6, 2019, the entire disclosures of which are hereby incorporated by reference.

TECHNICAL FIELD

The present disclosure relates generally to the field of underwater lights for pools and spas. More specifically, the present disclosure relates to an underwater light having a replaceable light-emitting diode (LED) module and a cord assembly.

RELATED ART

In the underwater lighting field, submersible luminaires are known and commonly used. These devices are conventionally made from a combination of metal, plastic, and glass. The various electrical components within a submersible luminaire housing generate heat. A difference between the temperature of the air within the submersible luminaire housing and the temperature of pool water around the submersible luminaire can cause the formation of condensation on an interior portion of a submersible luminaire lens. Condensation on the interior portion of the submersible luminaire lens can cause a degradation in luminaire luminosity and can damage the electrical components or luminaire. As a result of the foregoing, it would be desirable to provide a submersible luminaire lens constructed of a material which prevents the formation of condensation on the interior portion of the submersible luminaire lens and is electrically insulative.

In addition, the various electrical components within the submersible luminaire housing require adequate heat dissipation through the use of heat sinks. A heat sink may draw heat away from the electrical components and dissipate it, thereby preventing any damage to the electrical components or luminaire. Metal components are often utilized for a heat sink due to their high thermal conductivity compared to plastics, glass, and other materials. However, a metal heat sink is also electrically conductive.

In submersible luminaires, the exposed metal portions of the luminaire, as well as components external to the luminaire housing (e.g., the luminaire cord and a niche), require safe electrical grounding. This requires significant design efforts and expense to assure the safety of the device. Indeed, a critical interface must be provided between the metal components of the luminaire and the niche into which the luminaire is installed, to allow for adequate grounding. Such an interface facilitates the safe grounding and bonding of the metal components. Due to the complexity of such interfaces and the necessity for a luminaire and niche to create a safe interface, Underwriter's Laboratories has required that luminaires and niches be fabricated by the same manufacturer. As a result of the foregoing, it would be desirable to provide a submersible luminaire housing constructed of a material which is thermally conductive yet electrically insulative. It would also be desirable to provide components external to the luminaire housing (e.g., the luminaire cord) which are also electrically insulative.

Thermally conductive and electrically insulative polymer materials are known. These materials allow for the dissipation of heat while restricting the conduction of electricity therethrough, making them ideal for a situation in which thermal energy must be transferred yet electrical energy must be insulated.

In submersible luminaires, one or more light-emitting elements (e.g. light emitting diodes (LEDs)) mounted on a printed circuit board (PCB) within the submersible luminaire housing may become inoperable due to extended use or for other reasons. Conventional luminaires are hermetically sealed and therefore must be replaced when LEDs are inoperable (e.g., when LEDs burn out). As a result of the foregoing, it would be desirable to provide a submersible luminaire with a replaceable PCB to avoid replacing a luminaire in its entirety when LEDs mounted on the PCB are inoperable.

Accordingly, the underwater light of the present disclosure addresses these and other needs.

SUMMARY

The present disclosure relates to underwater light having a replaceable light-emitting diode (LED) module and cord assembly. The underwater light includes a lens, a bezel, a screw, a cable attachment assembly, a mounting flange, a rear housing, a fastening assembly, an internal lens, a printed circuit board (PCB) including light-emitting diodes (LEDs) mounted thereon, a heat sink, and an electronics assembly. The lens surface comprises a glass layer configured to prevent the formation of condensation on an interior portion of the lens. The glass layer thermally insulates the underwater light and thereby prevents the formation of condensation caused by a difference between the temperature of the air within the underwater light and the temperature of pool water around the underwater light. The assembly of the underwater light provides for the dissipation of heat away from the PCB thereby cooling the LEDs and electronic components mounted thereon. The electrically non-conductive nature of the exterior components of the underwater light (i.e., the lens, the bezel, the mounting flange and the rear housing) permit the underwater light to be installed in any location in a pool or spa without requiring specific approval of Underwriters Laboratories (UL). Further, since the exterior of the underwater light is electrically non-conductive, no specific bonding or grounding of the underwater light is necessary. Also, an optically-transparent potting compound encapsulating the PCB and the LEDs and electronic components mounted thereon in addition to the ability to remove the rear housing or the coupled lens and rear housing of the underwater light provide for the safe replacement of the PCB mounted within the underwater light when an LED mounted thereon is inoperable.

BRIEF DESCRIPTION OF THE DRAWINGS

The foregoing features of the present disclosure will be apparent from the following Detailed Description of the Invention, taken in connection with the accompanying drawings, in which.

Figure 13A:
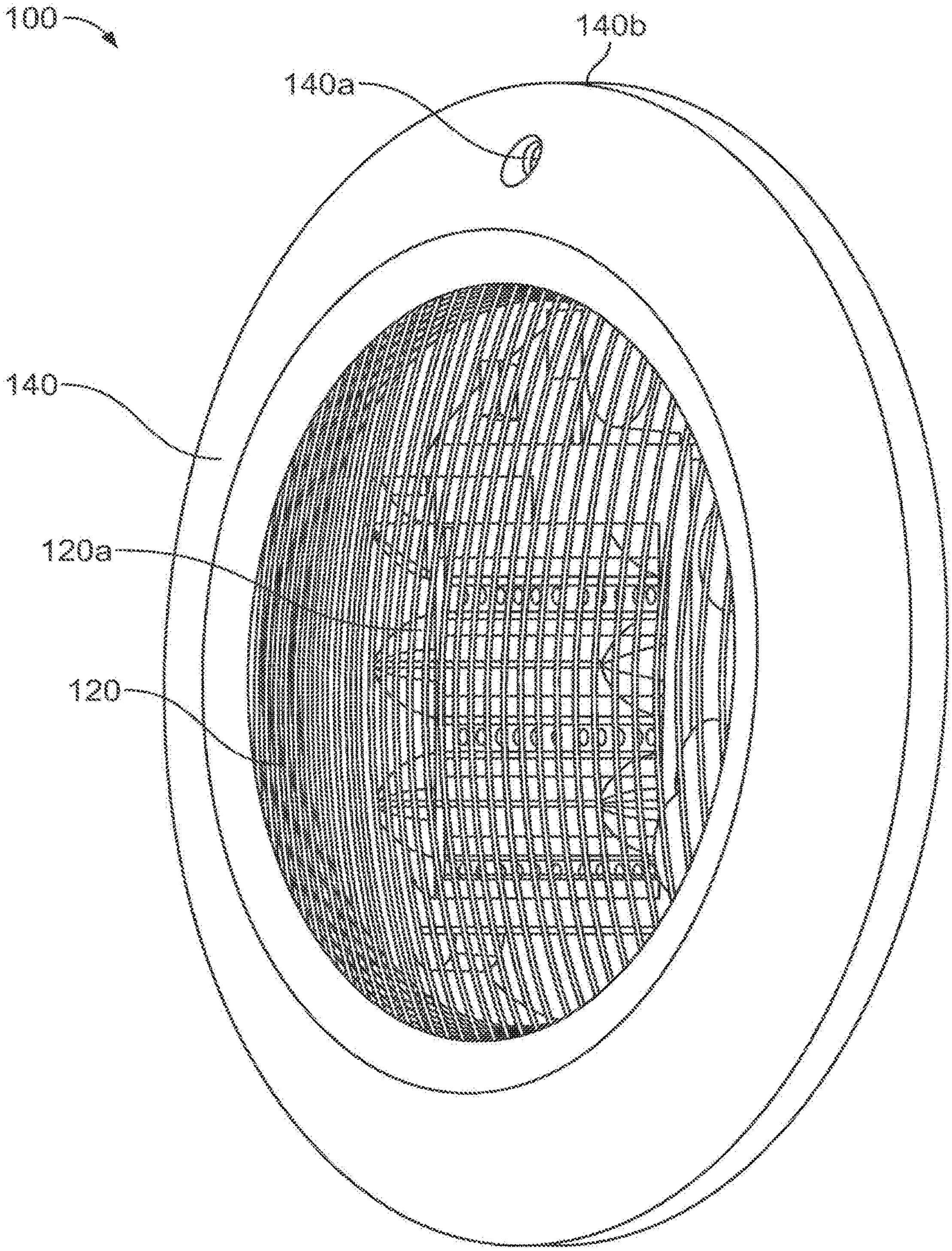

FIG. **13*a*** is a perspective view of another embodiment of the underwater light of the present disclosure;

FIG. **13*b* is a perspective view of the lens of the underwater light of FIG. 13*a*;**

Figure 14:
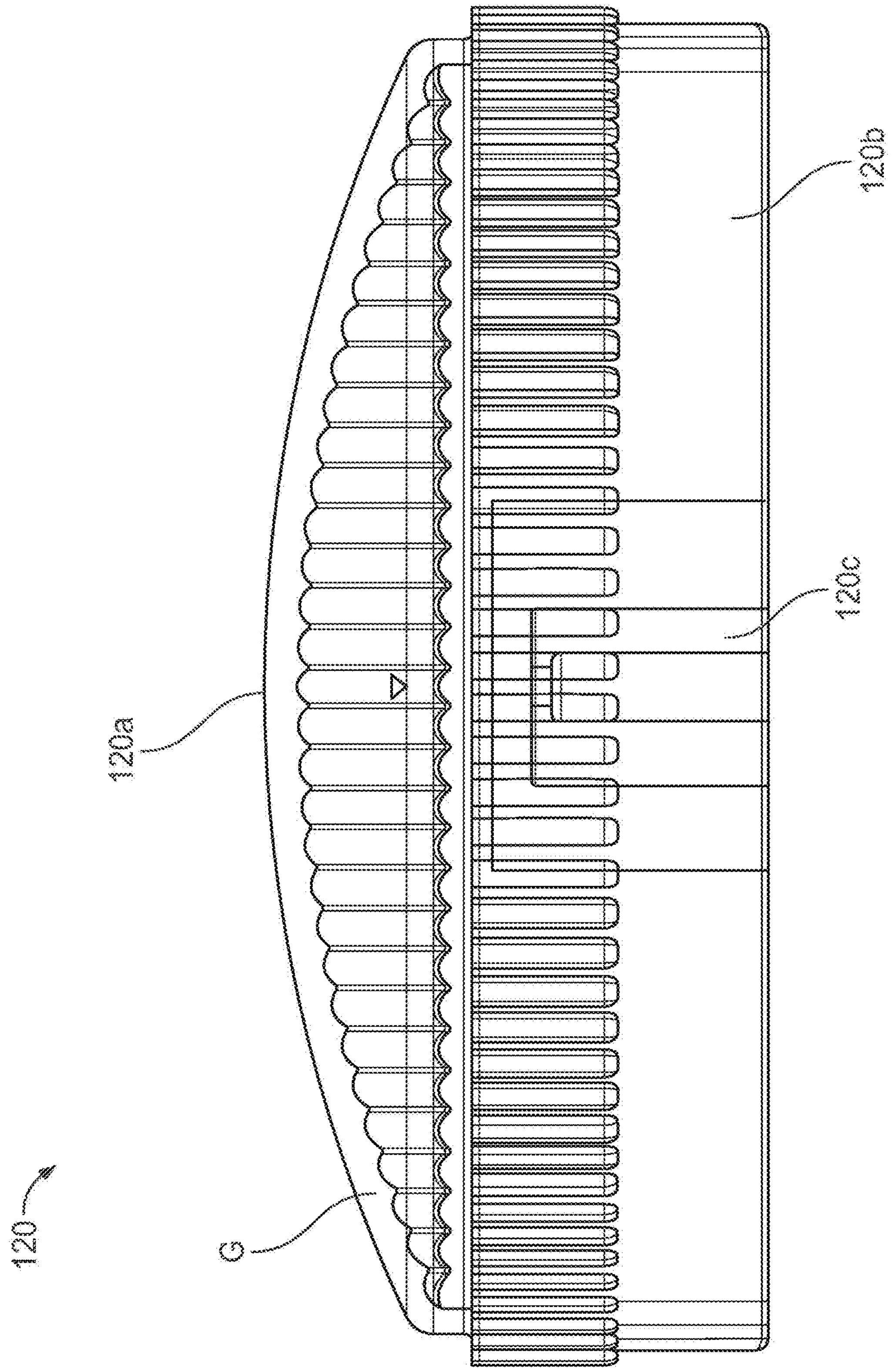

FIG. 14 is a bottom view of the lens of the underwater light of FIG. **13*a*;**

Figure 15:
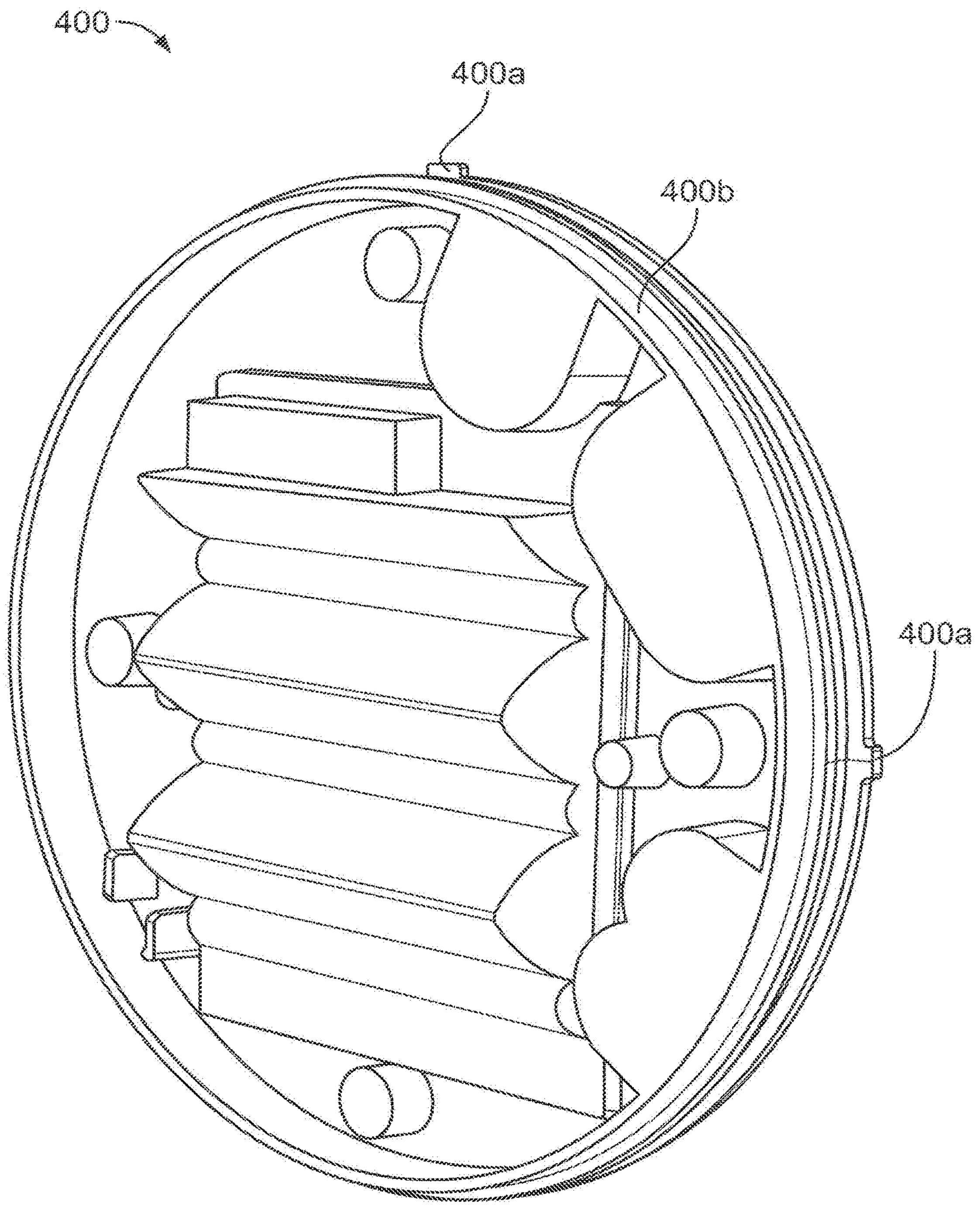

FIG. 15 is a perspective view of a rear housing plate of the underwater light of FIG. **13*a*;**

Figure 16:
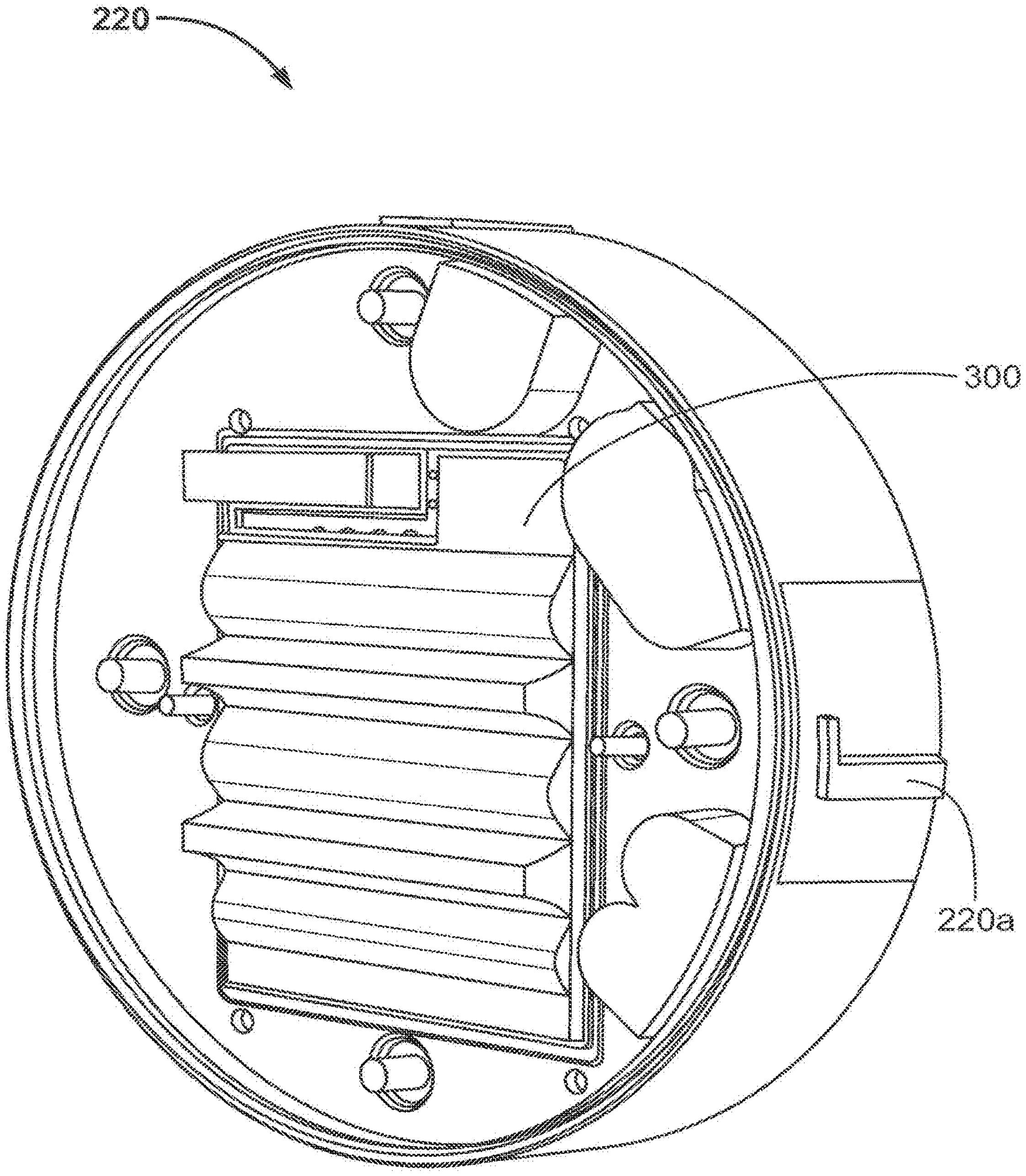

FIG. 16 is a perspective view of the rear housing of the underwater light of FIG. **13*a*;**

Figure 17:
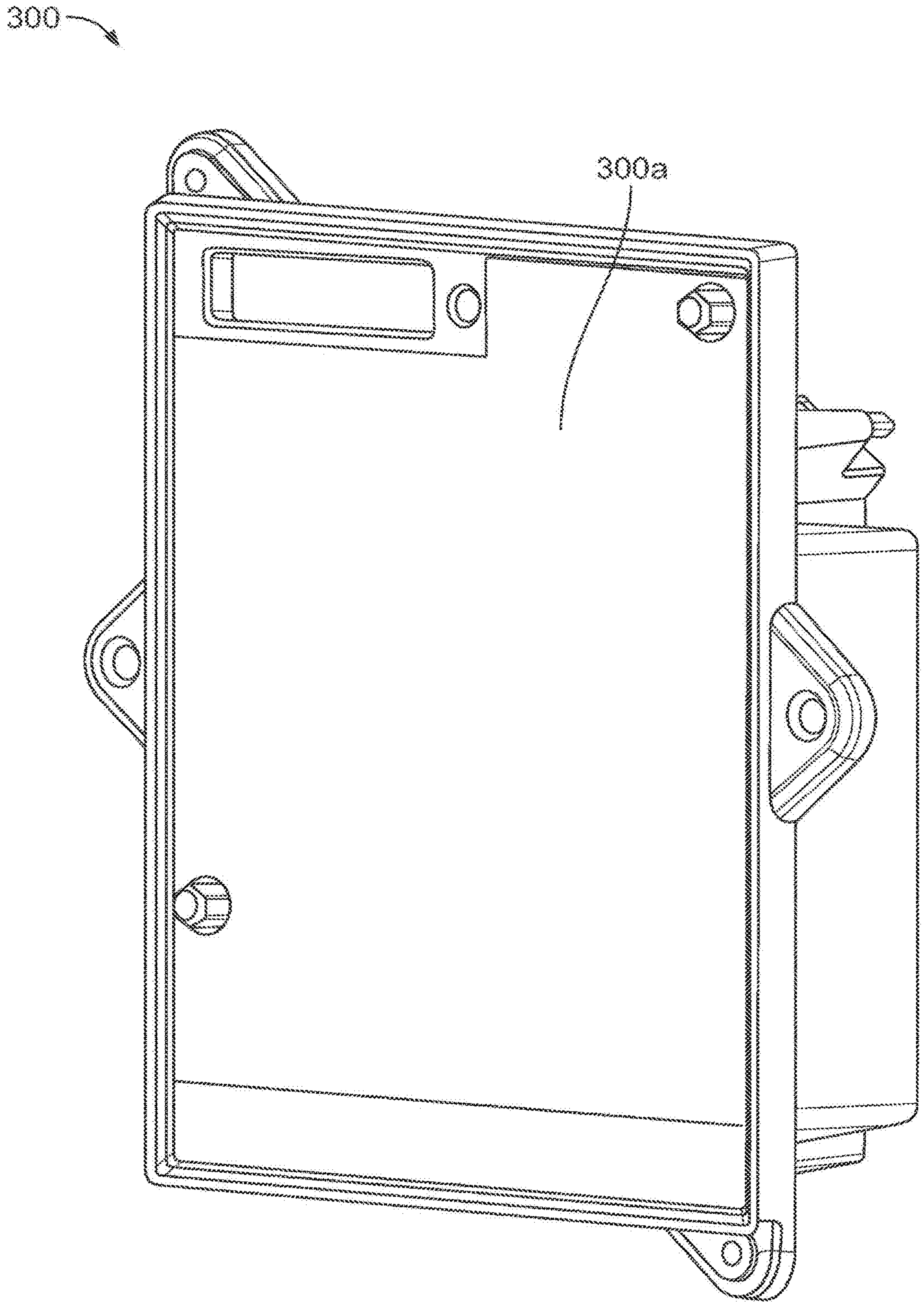

FIG. 17 is a perspective view of the front of the heat sink of the underwater light of FIG. **13*a*;**

Figure 18:
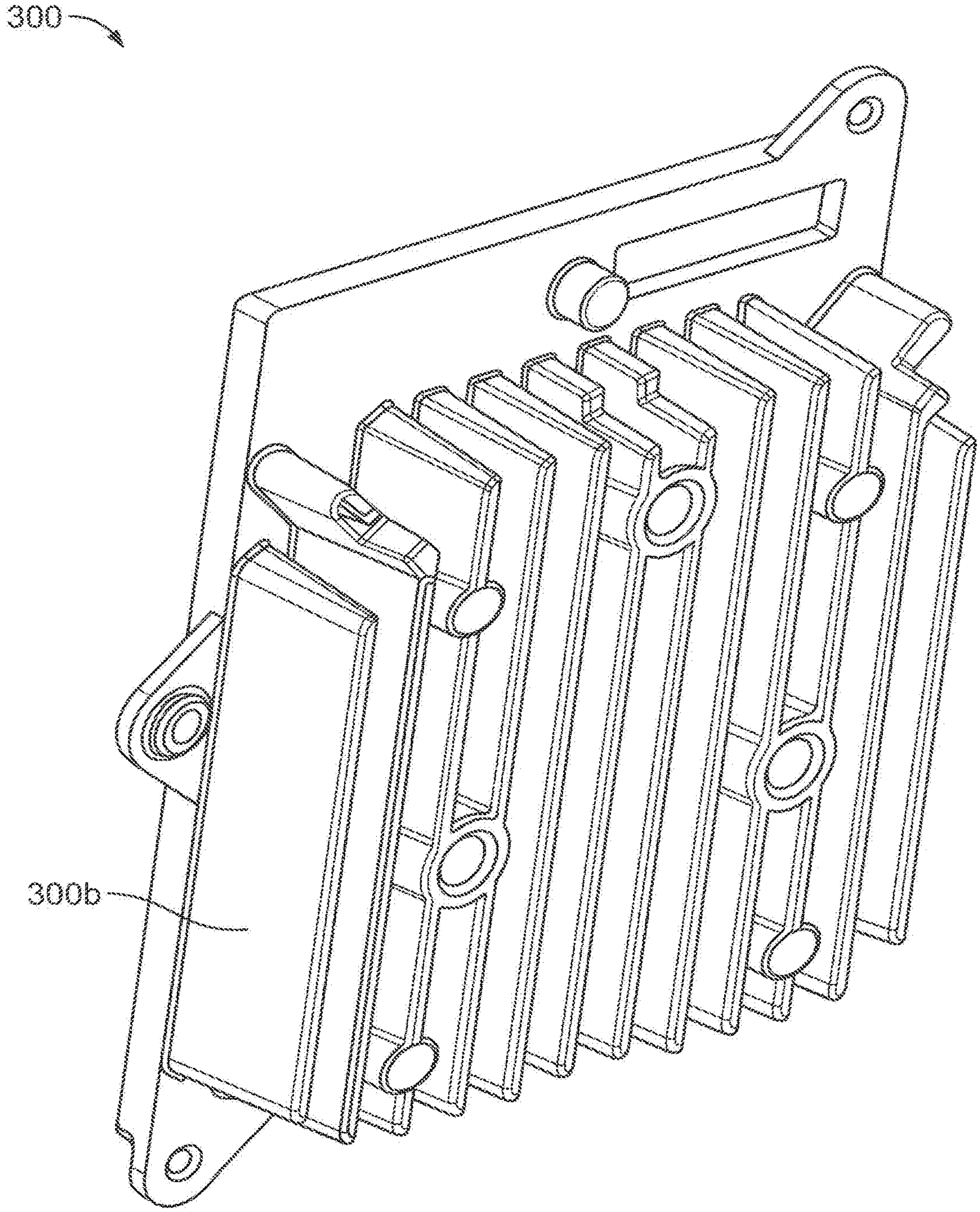

FIG. 18 is a perspective view of the rear of the heat sink of the underwater light of FIG. **13*a*;**

Figure 19:
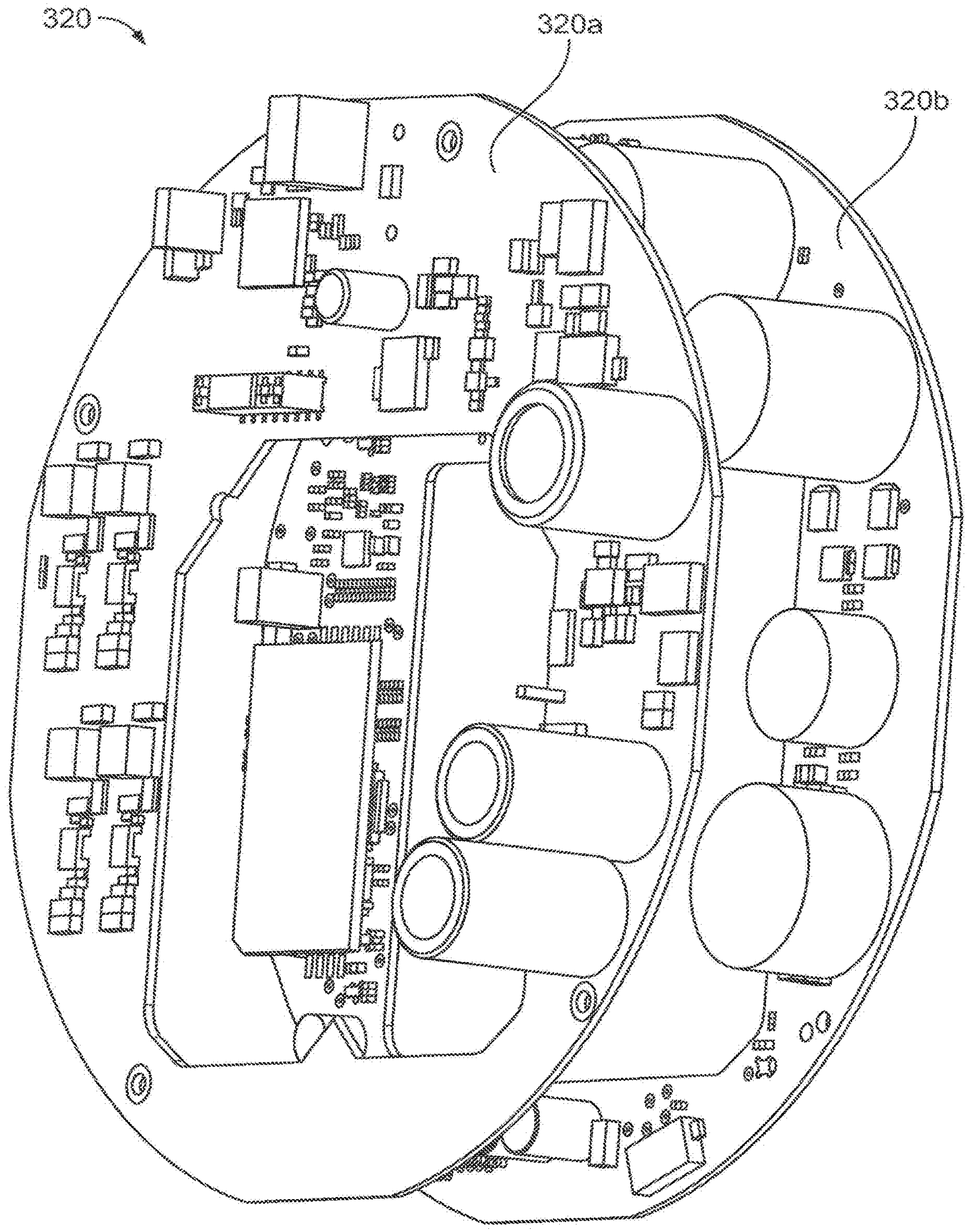

FIG. 19 is a perspective view of the electronics assembly of the underwater light of FIG. **13*a*;**

Figure 20:
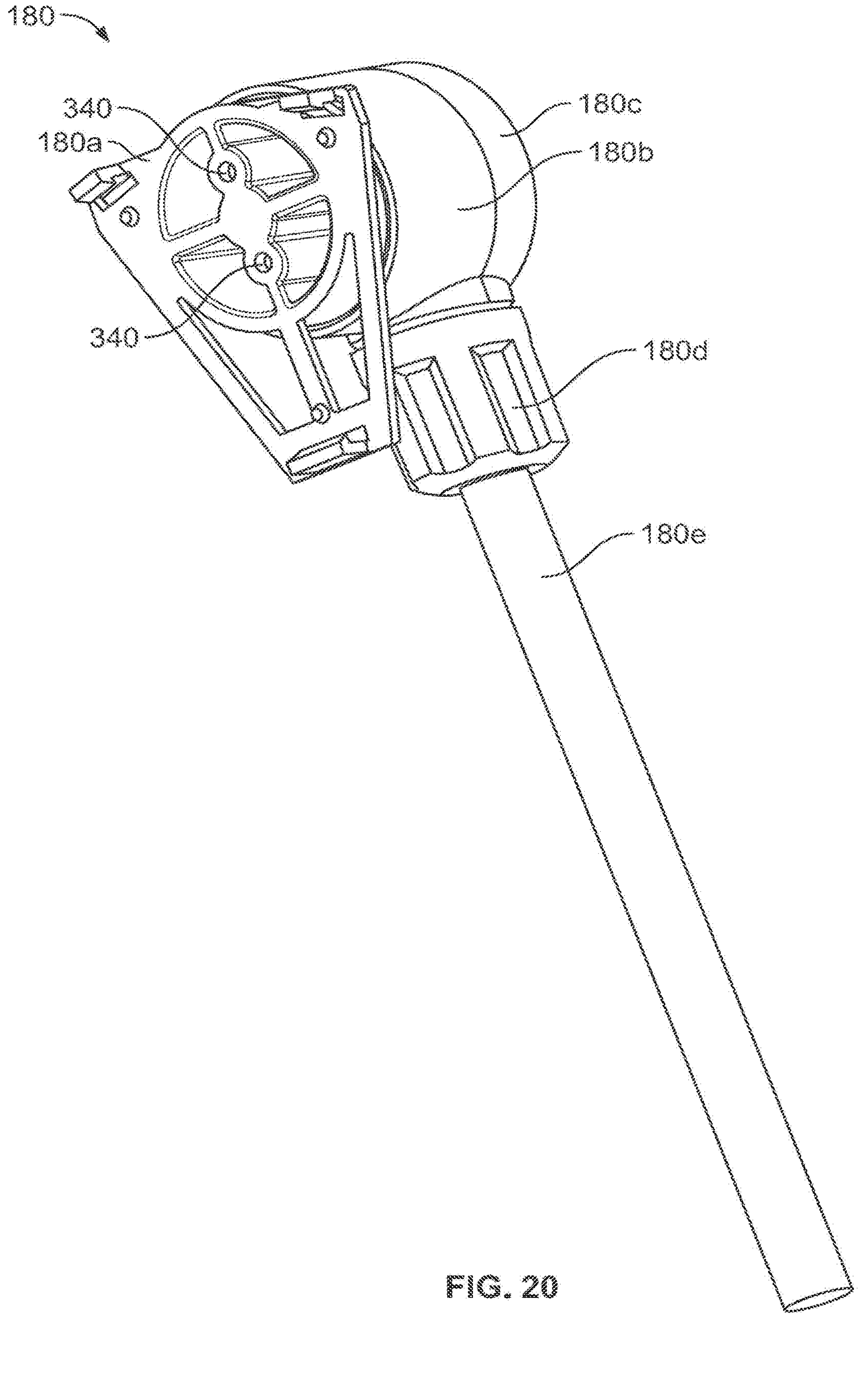
Figure 21:
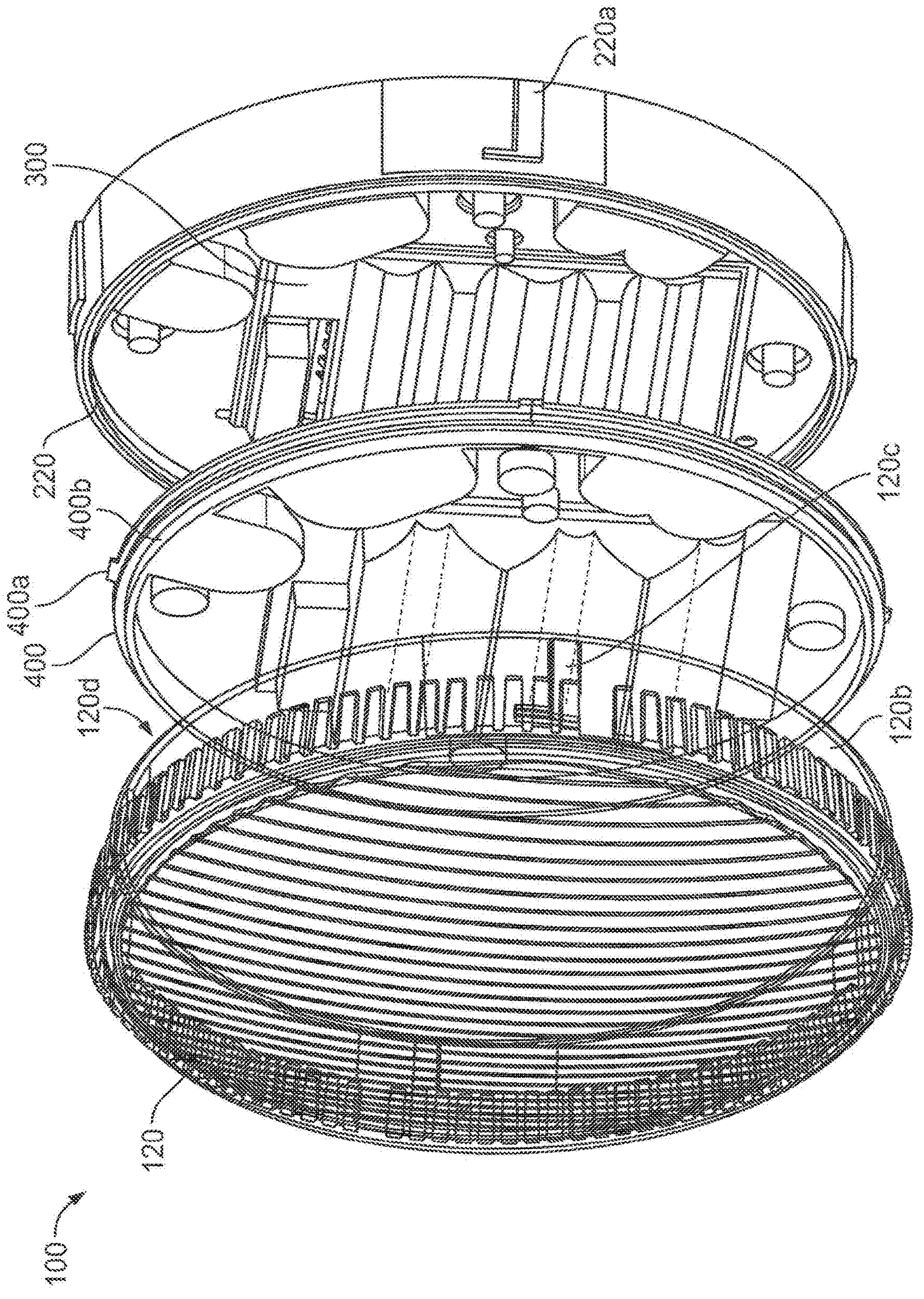

FIG. 20 is a perspective view of the cable attachment assembly for providing a watertight connection between a power and/or communications cord and the underwater light of FIG. **13*a*; and FIG. 21 is an exploded view of the underwater light of FIG. 13*a*** showing assembly of the lens, the rear housing plate and the rear housing.

Figure 22:
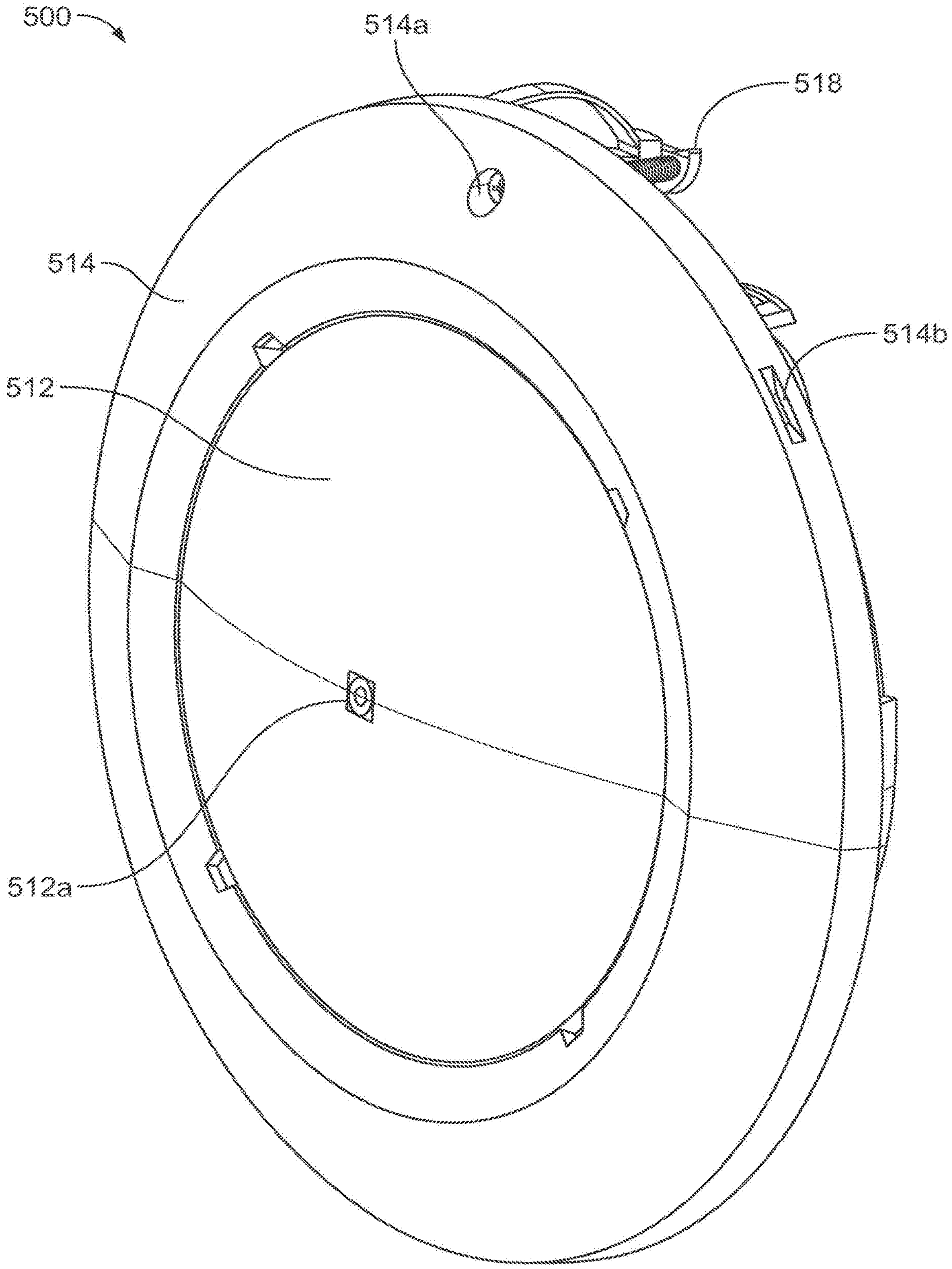
Figure 23:
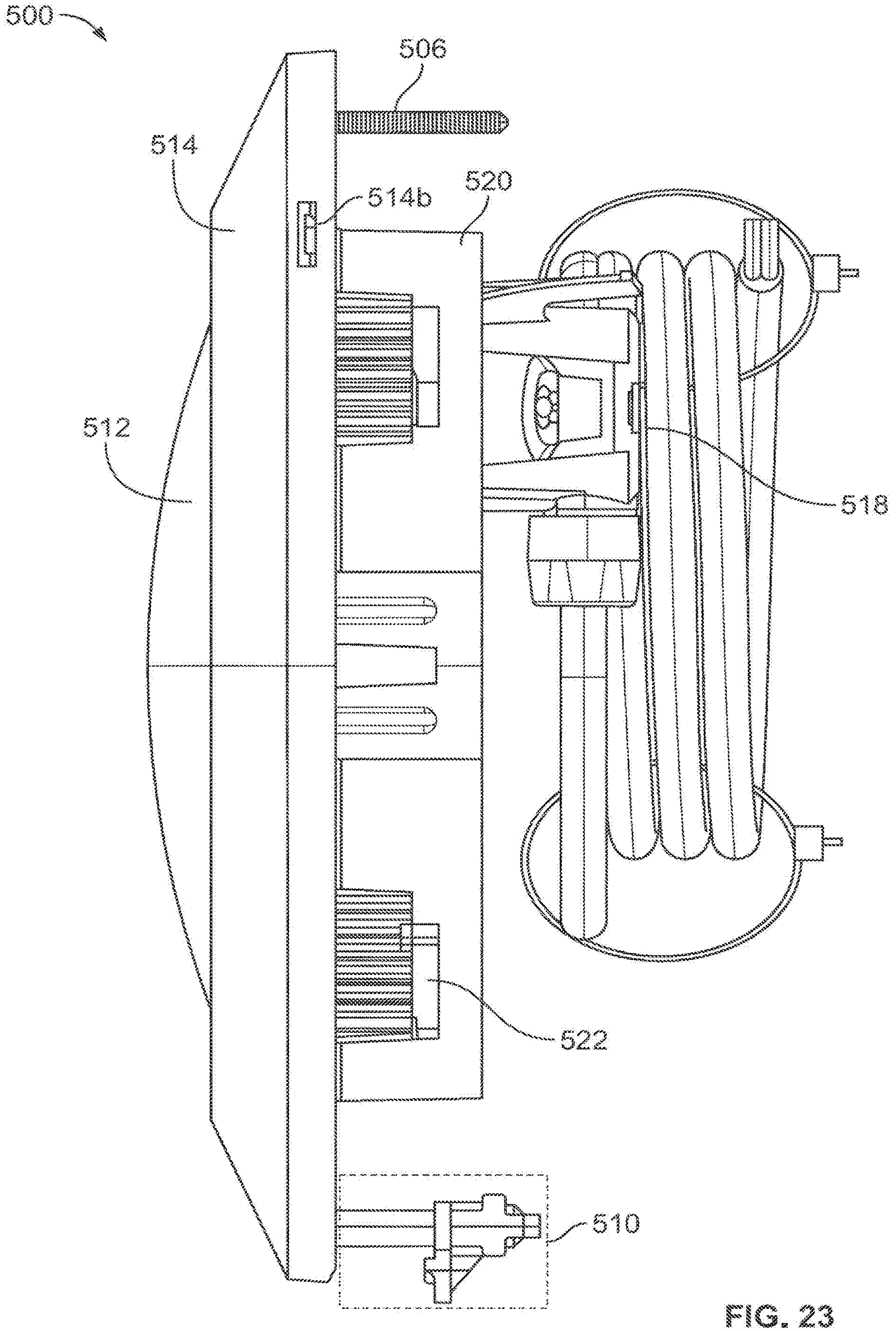
Figure 24:
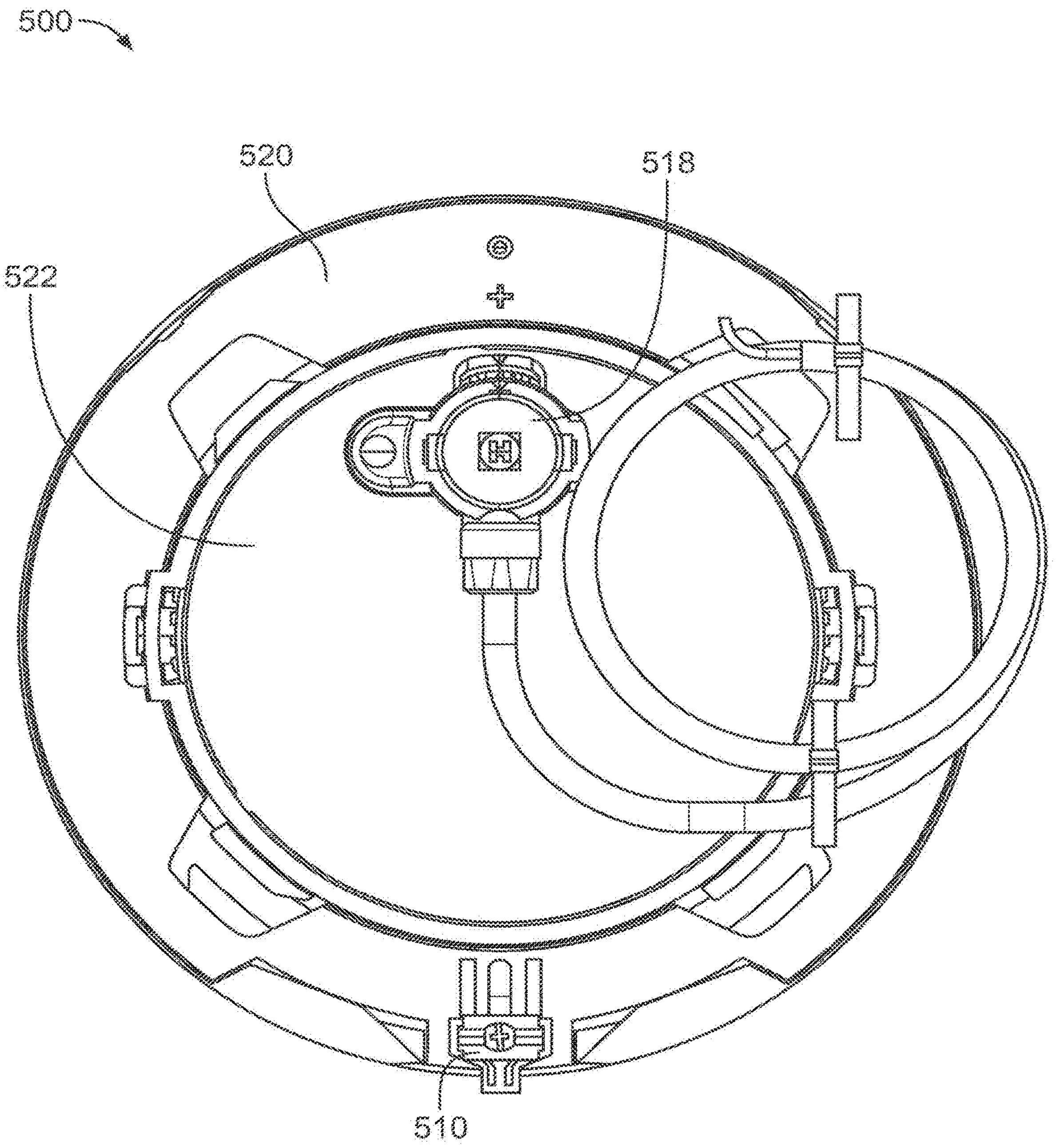

FIG. 22 is a perspective view of another embodiment of the underwater light of the present disclosure;

FIG. 23 is a side view of the underwater light of FIG. 22;

FIG. 24 is a rear view of the underwater light of FIG. 22

Figure 25:
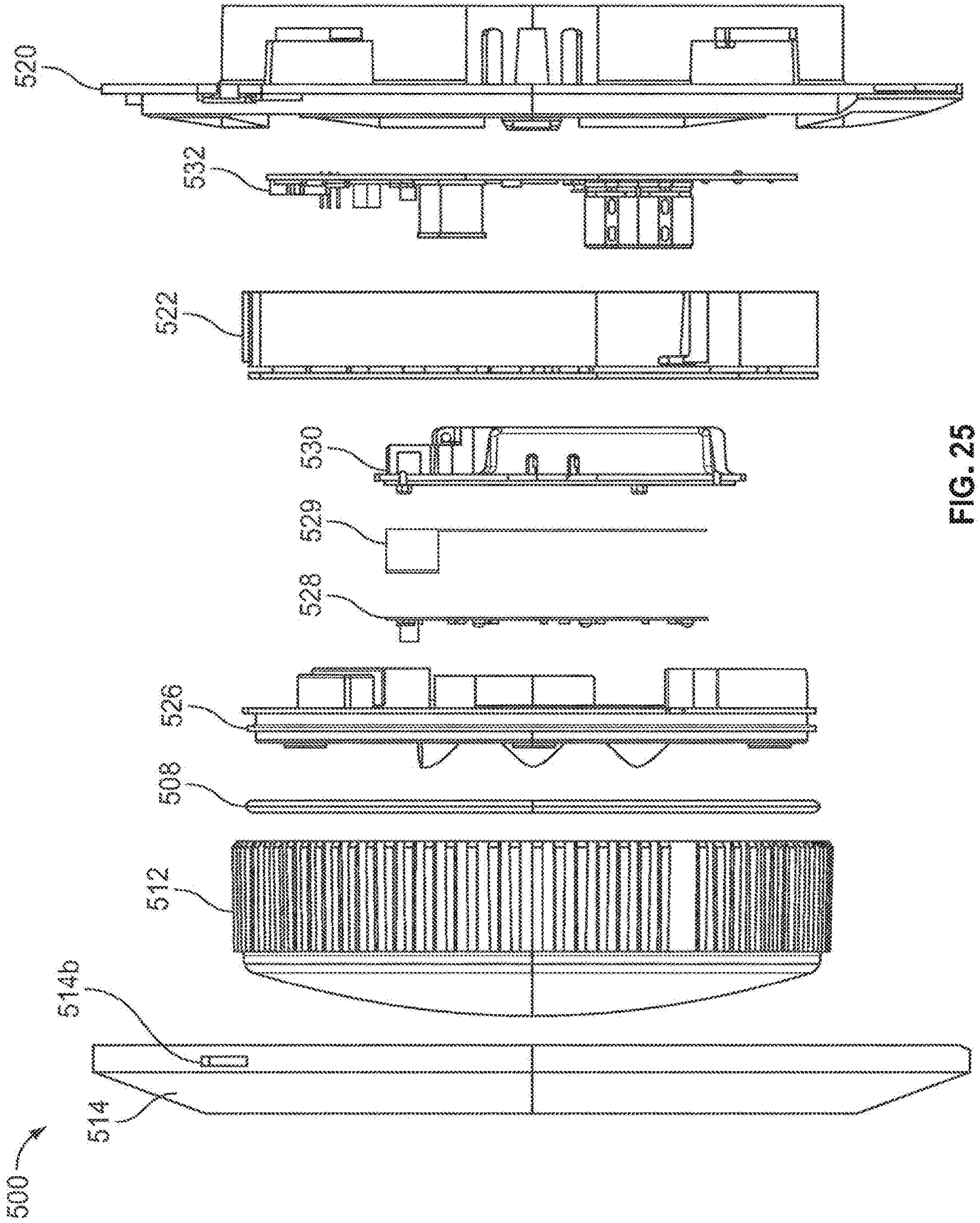
Figure 26:
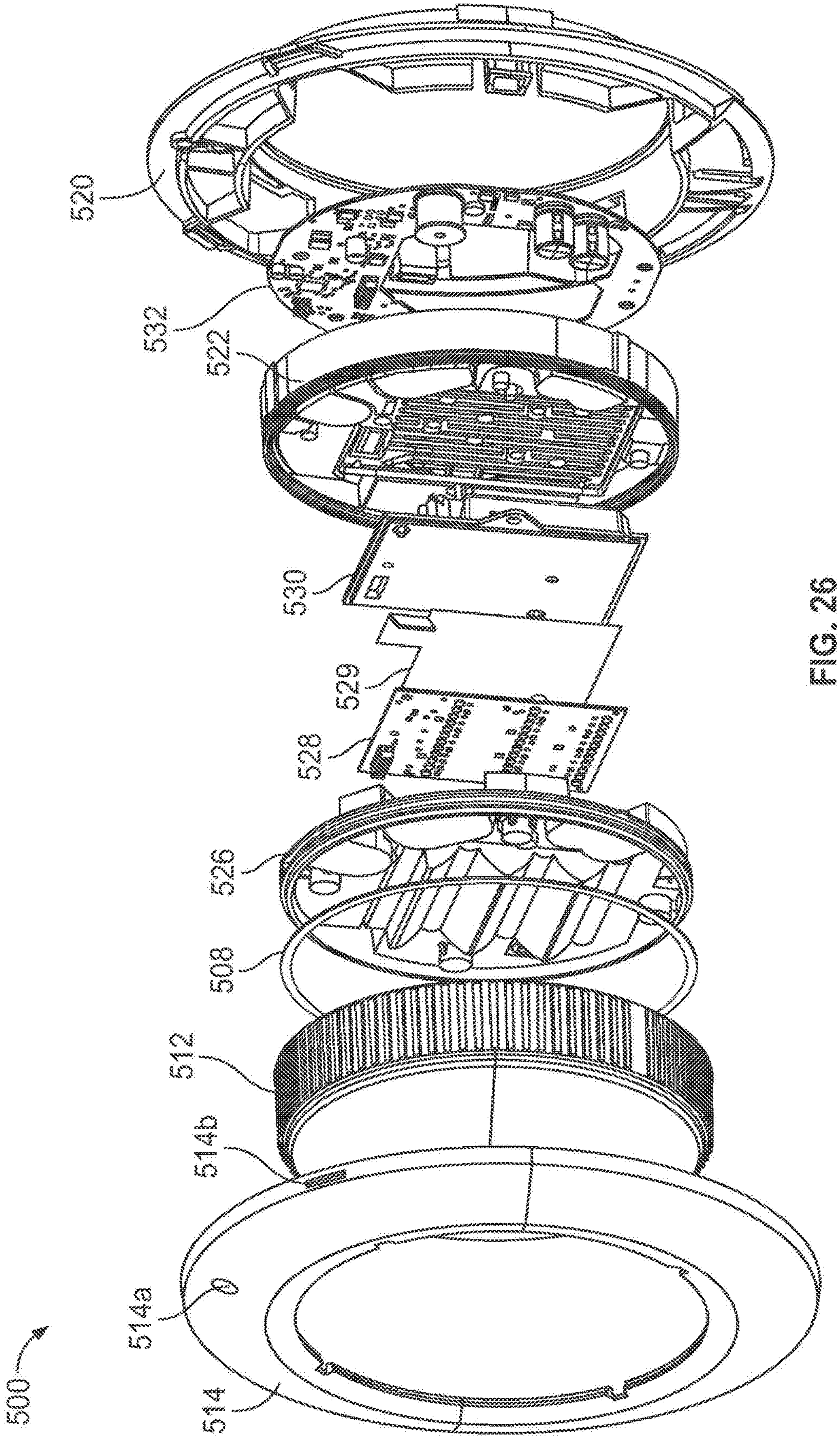
Figure 27:
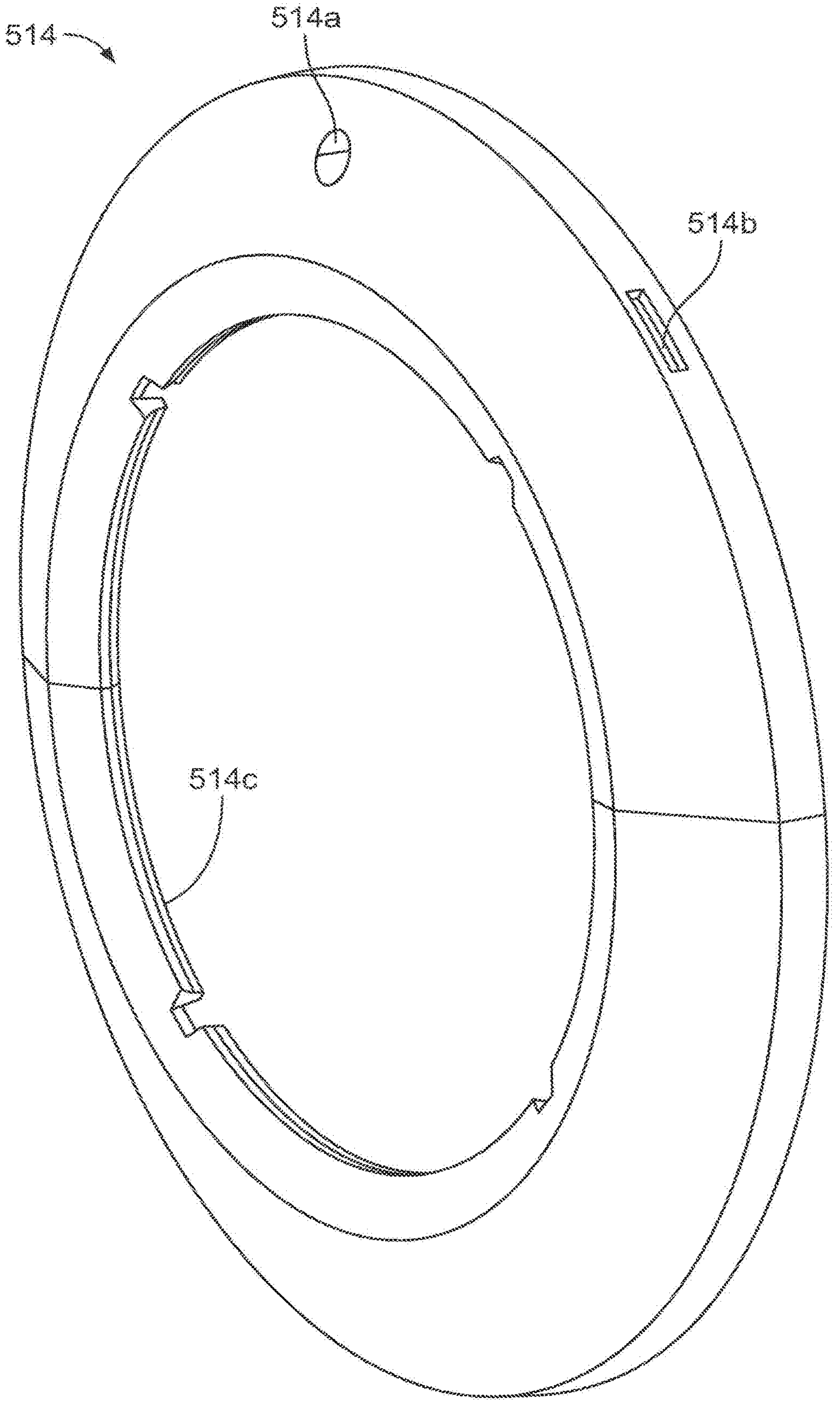
Figure 28:
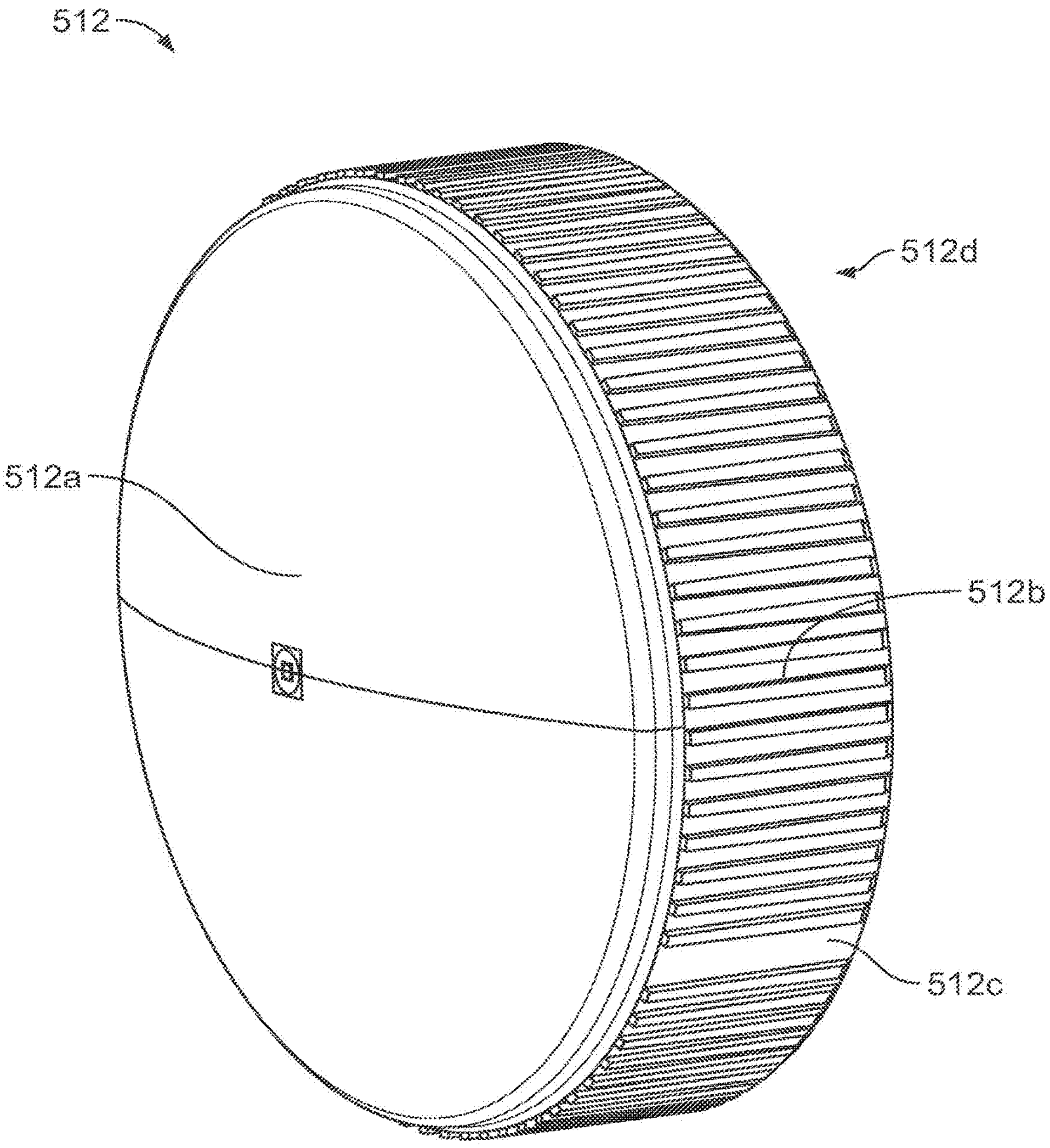
Figure 29:
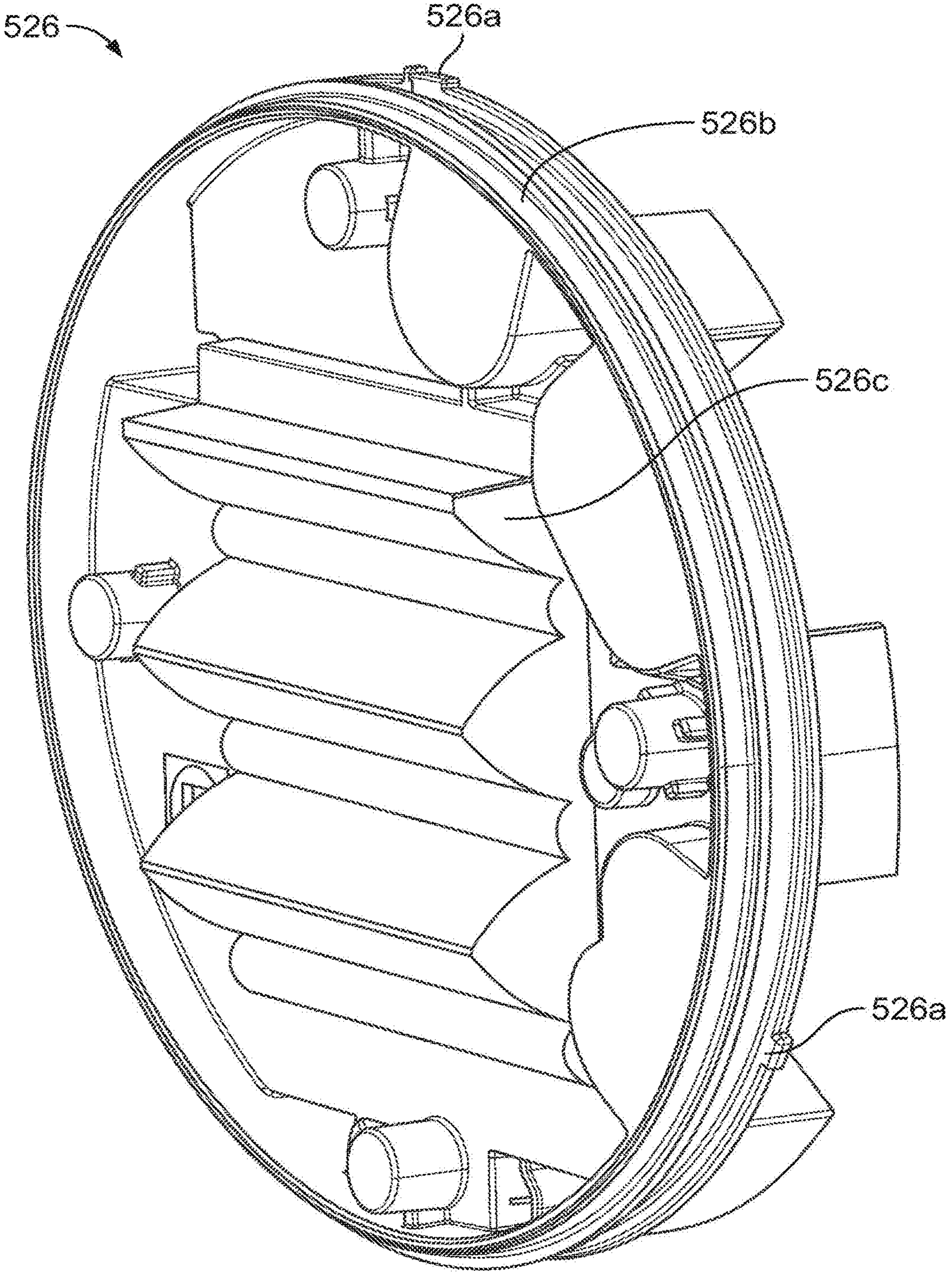
Figure 30:
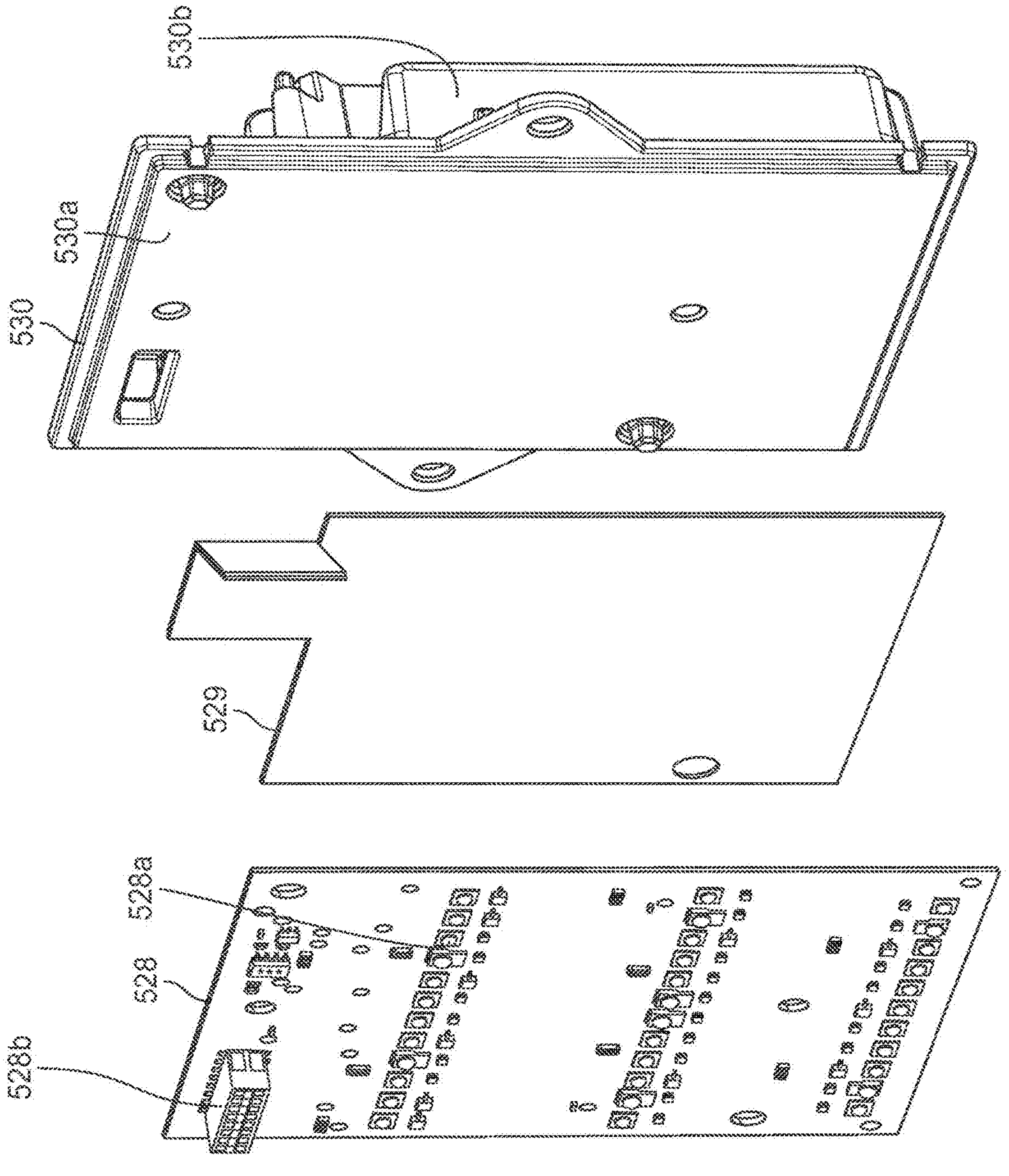
Figure 31:
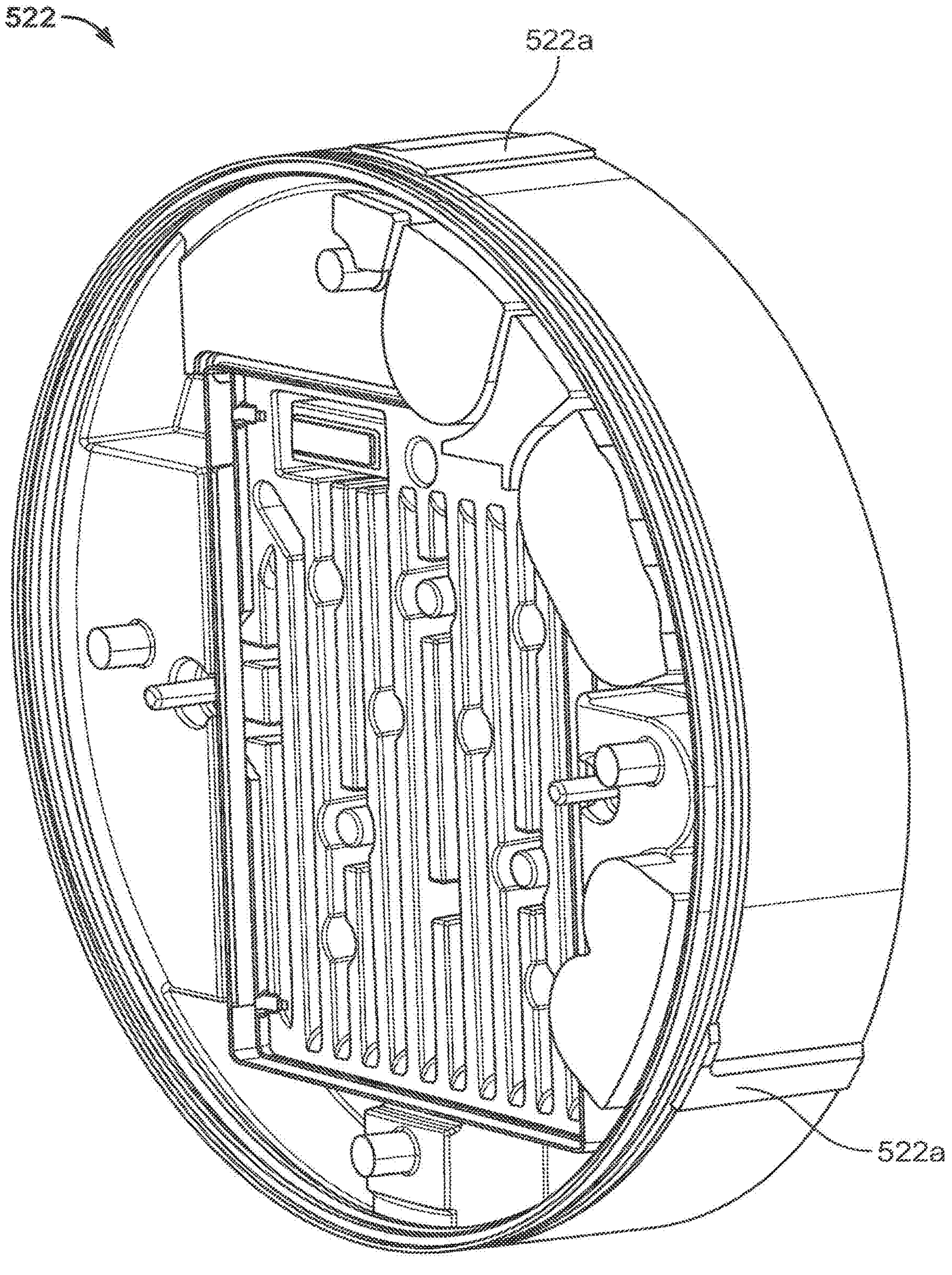
Figure 32:
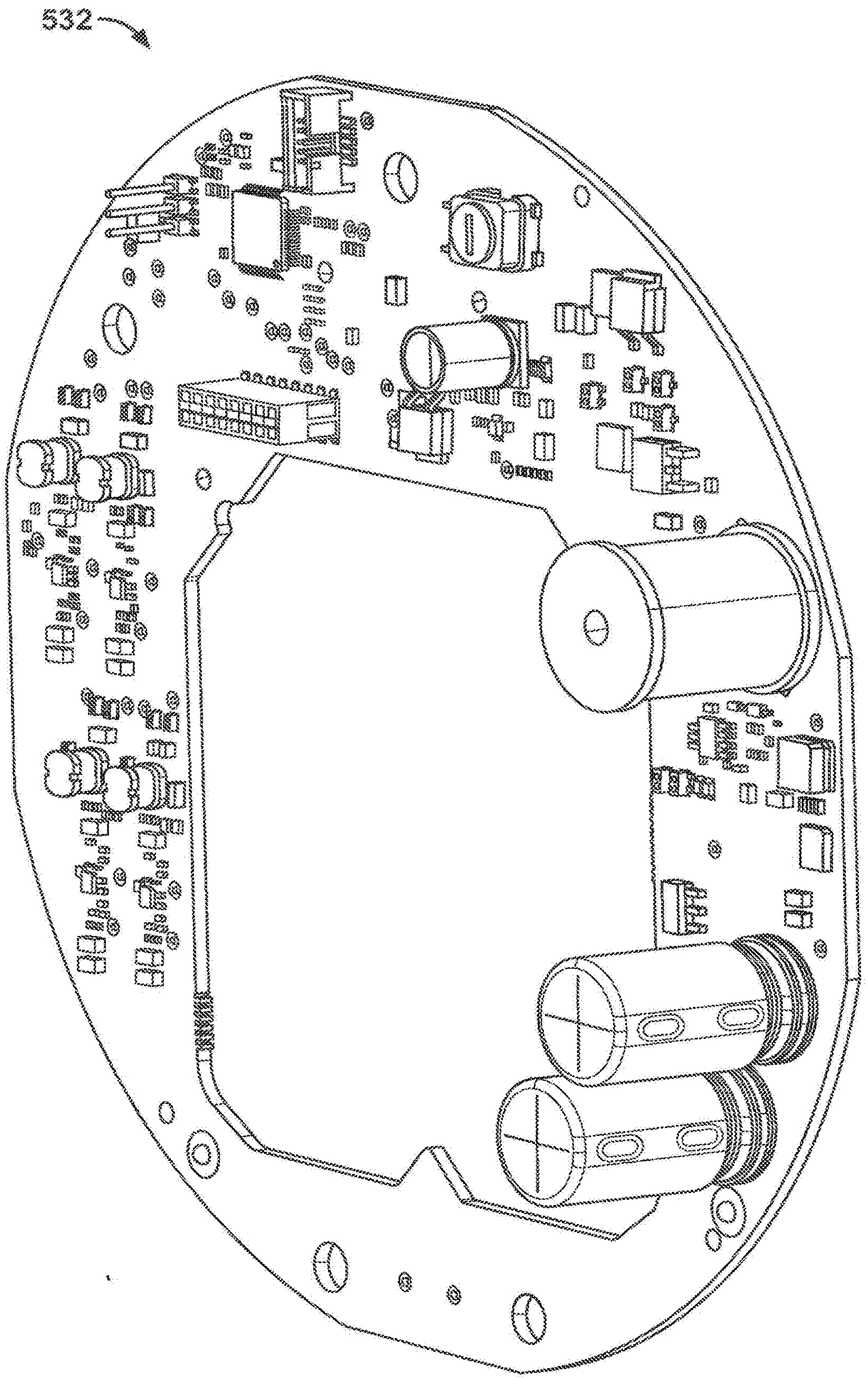
Figure 33:
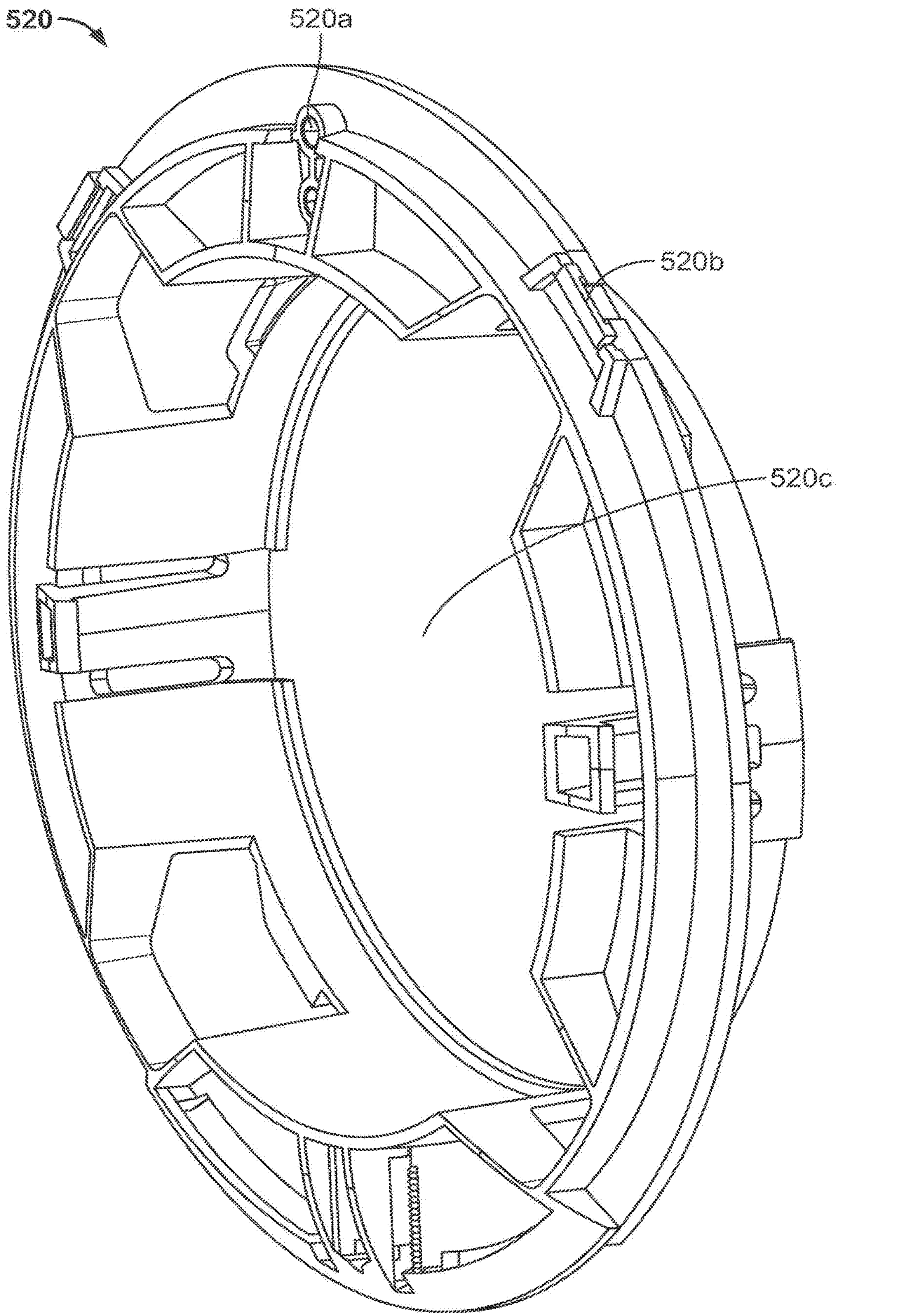
Figure 34:
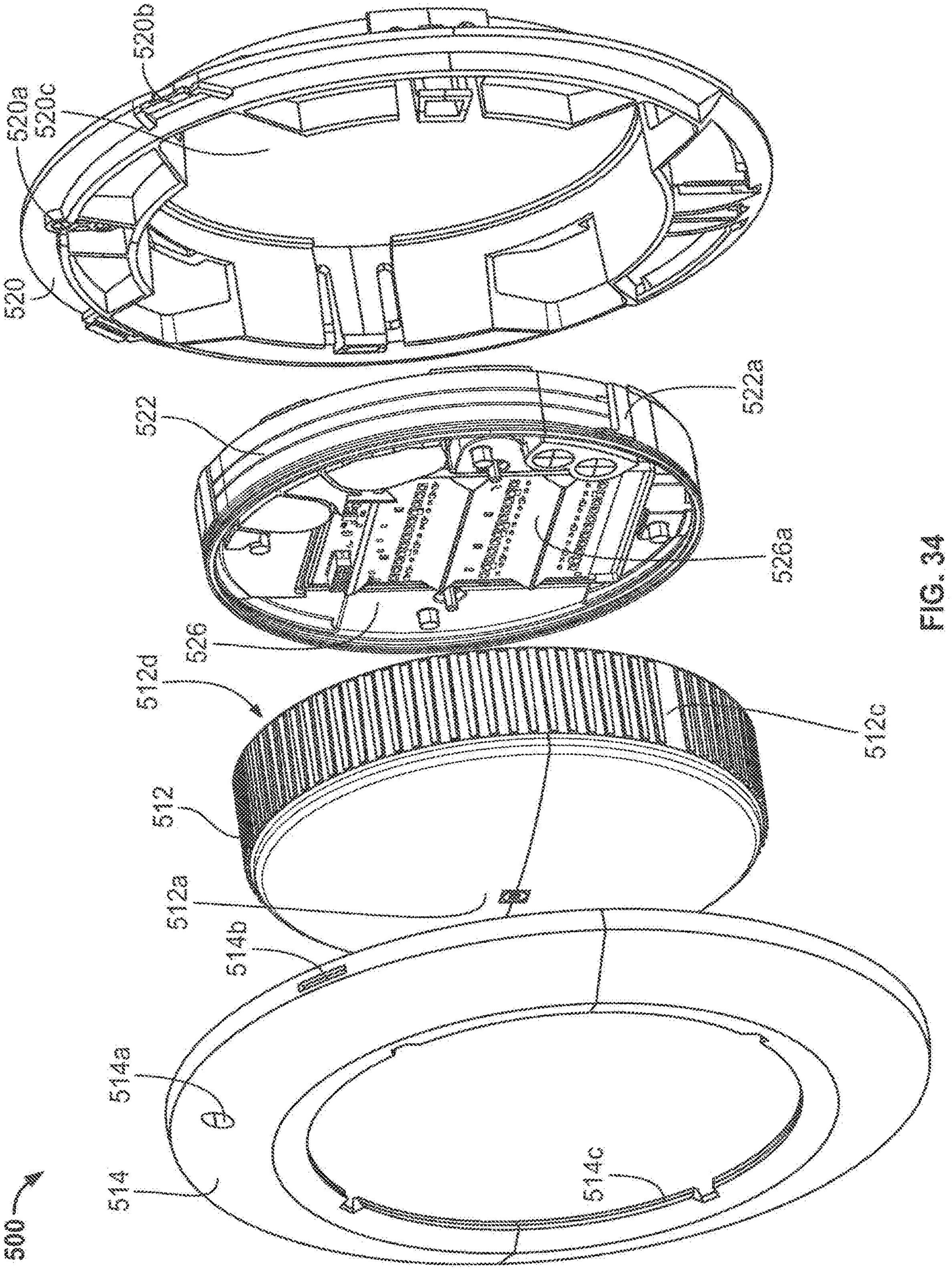
Figure 35:
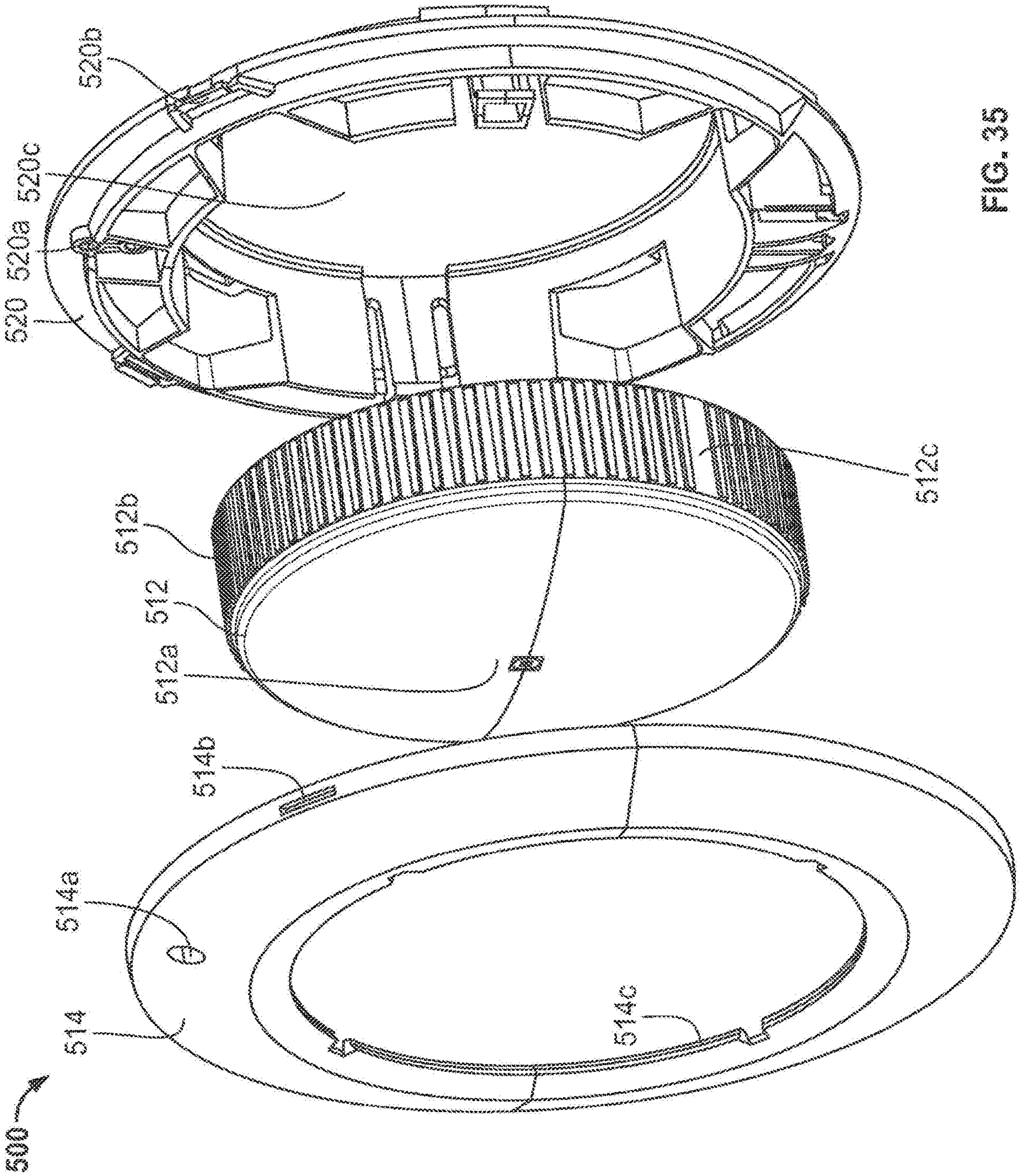
Figure 36:
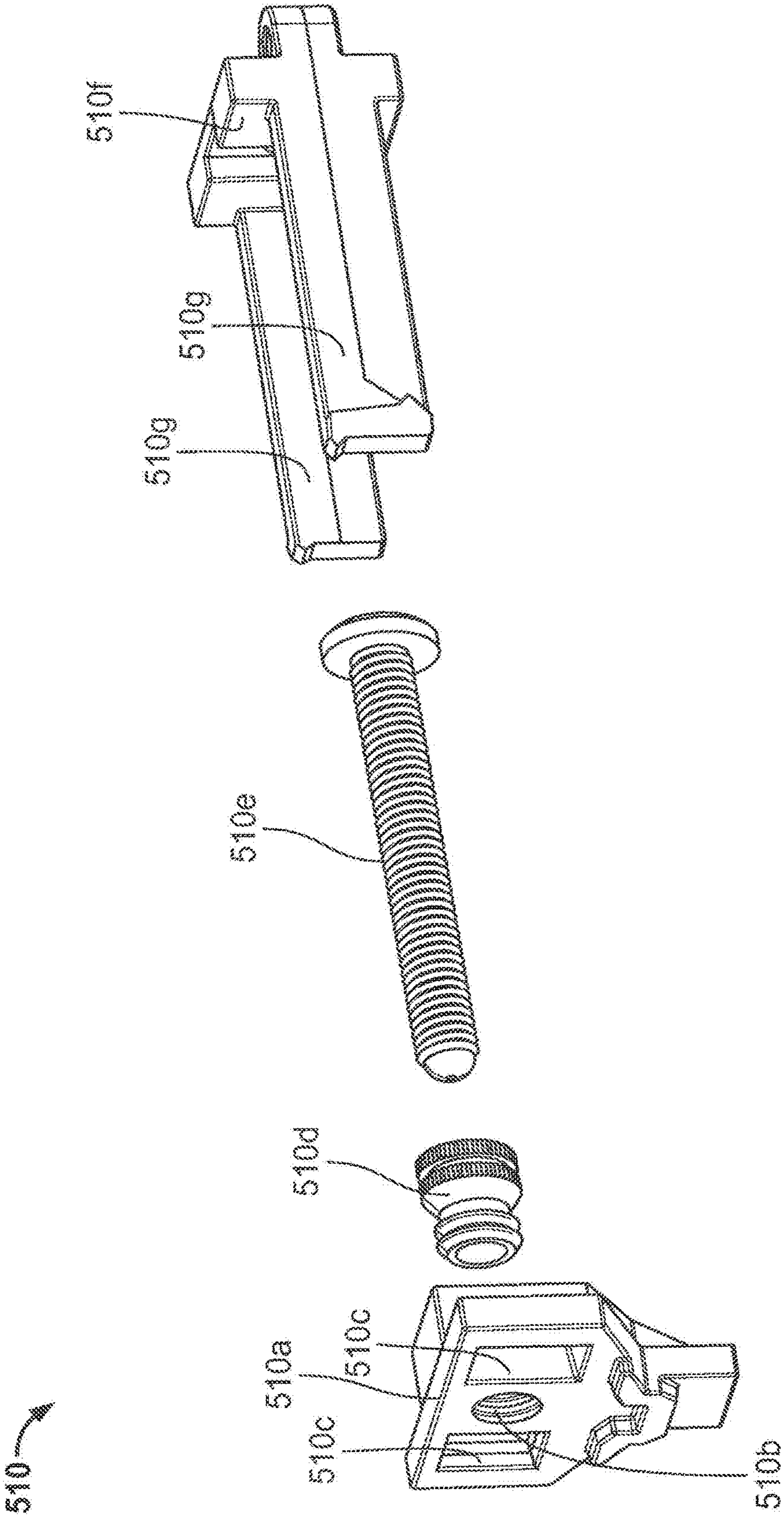
Figure 37:
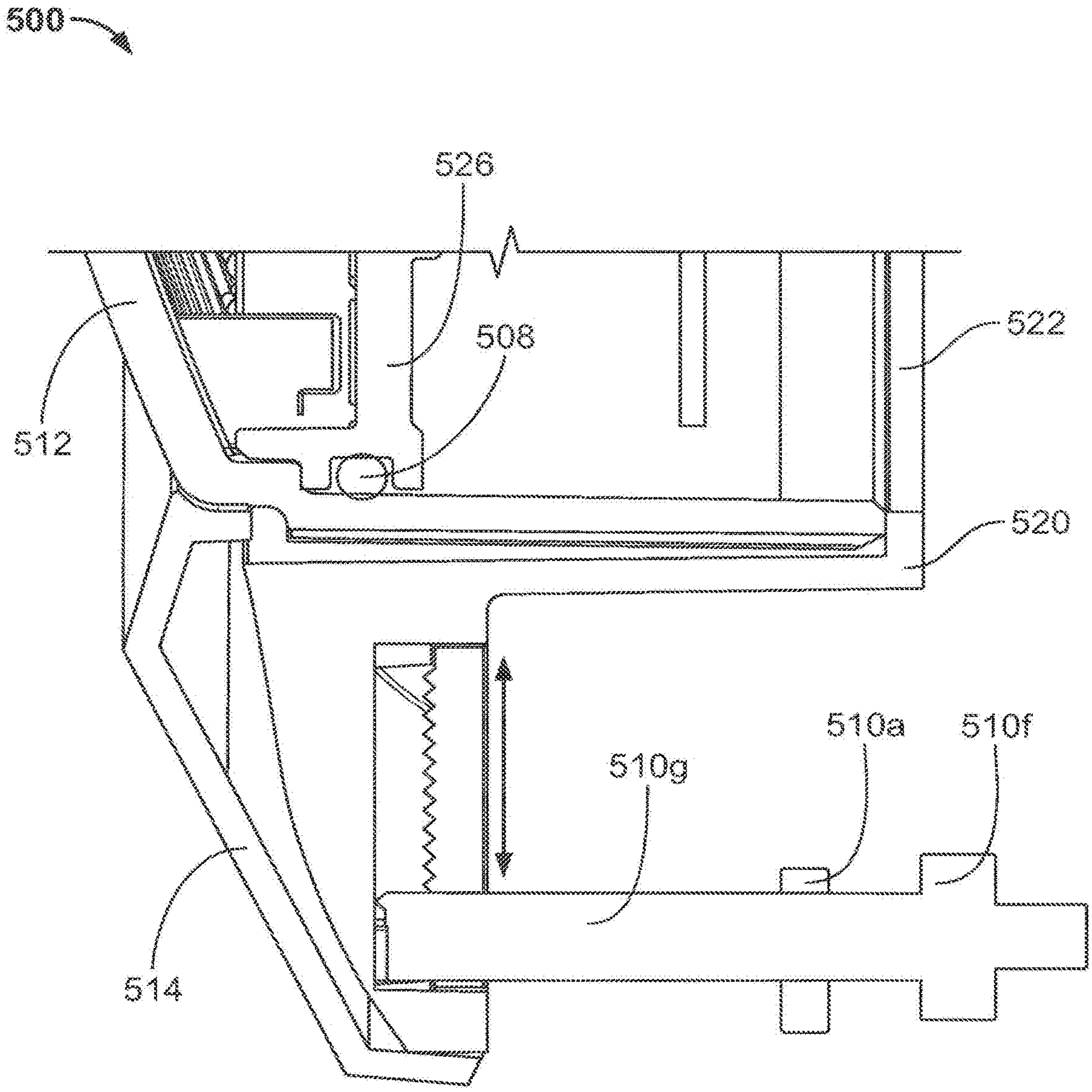
Figure 38:
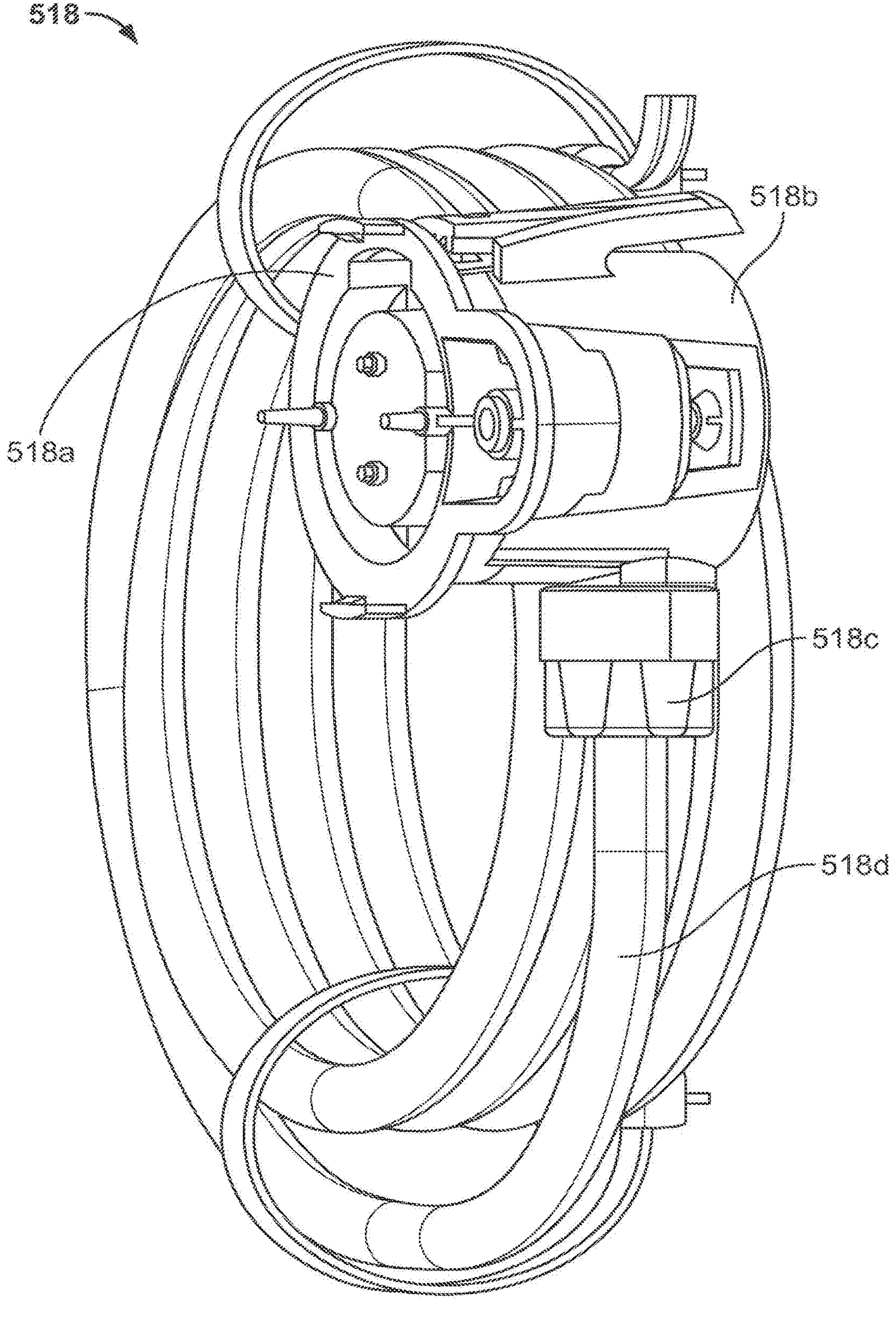
Figure 39:
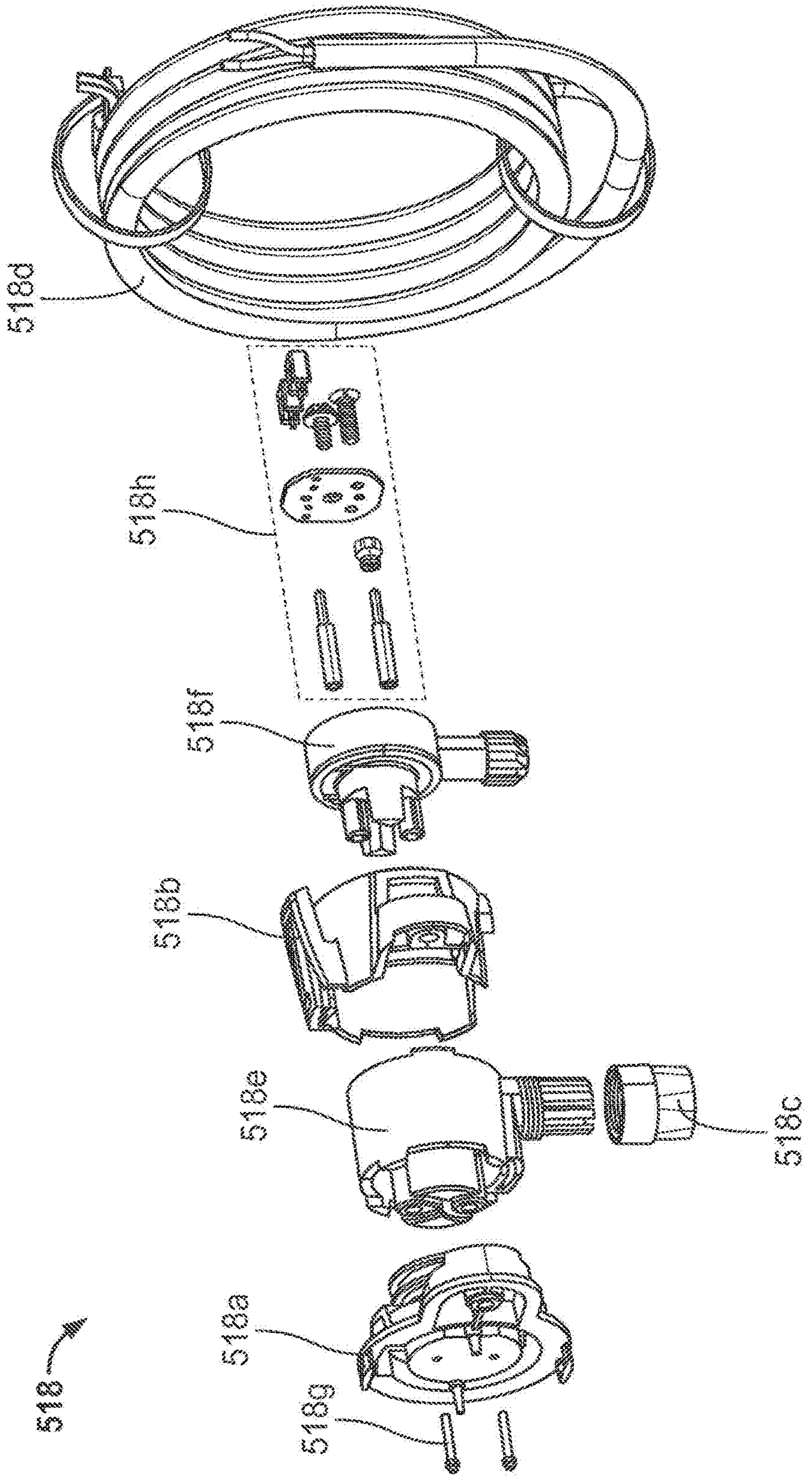

FIG. 25 is an exploded view of the underwater light of FIG. 22;

FIG. 26 is an exploded perspective view of the underwater light of FIG. 22;

FIG. 27 is a perspective view of the bezel of the underwater light of FIG. 22;

FIG. 28 is a perspective view of the lens of the underwater light of FIG. 22;

FIG. 29 is a perspective view of the rear housing plate of the underwater light of FIG. 22;

FIG. 30 is a perspective view of the printed circuit board (PCB) and the heat sink of the underwater light of FIG. 22;

FIG. 31 is a perspective view of the rear housing of the underwater light of FIG. 22;

FIG. 32 is a perspective view of the electronics assembly of the underwater light of FIG. 22;

FIG. 33 is a perspective view of the mounting flange of the underwater light of FIG. 22;

FIG. 34 is a perspective view of the underwater light of FIG. 22, showing assembly of the bezel, the lens, the rear housing and the mounting flange;

FIG. 35 is a perspective view of the underwater light of FIG. 22, showing assembly of the bezel, the lens coupled to the rear housing and the mounting flange;

FIG. 36 is an exploded perspective view of the positioning assembly of the underwater light of FIG. 22;

FIG. 37 is a cross sectional view of the underwater light of FIG. 22;

FIG. 38 is a perspective view of the cable attachment assembly for providing a watertight connection between a power and/or communications cord and the underwater light of the present disclosure; and FIG. 39 is an exploded perspective view of the cable attachment assembly of FIG. 38.

DETAILED DESCRIPTION

The present disclosure relates to an underwater light having a replaceable light-emitting diode (LED) module and cord assembly, as described in detail below in connection with FIGS. 1-39.

Figure 1:
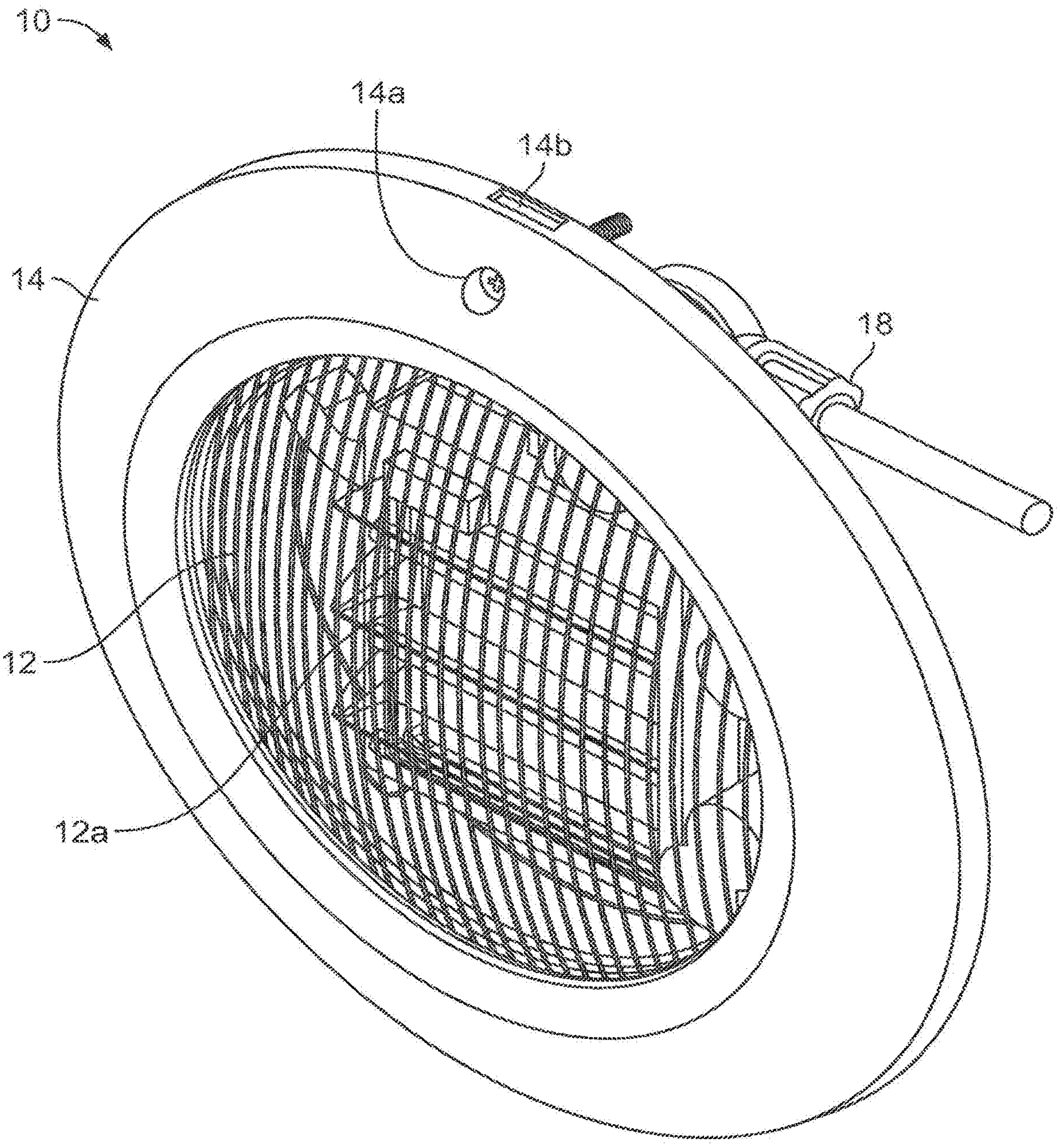
FIG. 1 is a perspective view of the underwater light of the present disclosure.

Turning to the drawings, FIG. 1 is a perspective view showing the underwater light 10 of the present disclosure. The underwater light 10 may include a lens 12 having a central portion **12*a* and a peripheral region including an annular wall 12*b* (see FIG. 4), a bezel 14 including a screw aperture 14*a* and a plurality of peripheral recesses 14*b*, and a cable attachment assembly 18. The term "lens," as used herein, refers not only to an optical component which can focus light (as in a conventional lens), but also to components which are merely transparent and do not focus light, such as a transparent and/or translucent cover. The bezel 14 is received by and couples to a mounting flange 20 (see FIG. 3). The bezel 14 is positioned about the central lens portion 12*a*. The underwater light 10 can be positioned such that the aperture 14*a* can be rotated up to 360 degrees from the typical 12 o'clock position of existing underwater lights. This allows the lens 12 to be positioned to direct light in a preferred direction in a pool or spa, and to accommodate installation of the light 10** in niches having various orientations.

Figure 2:
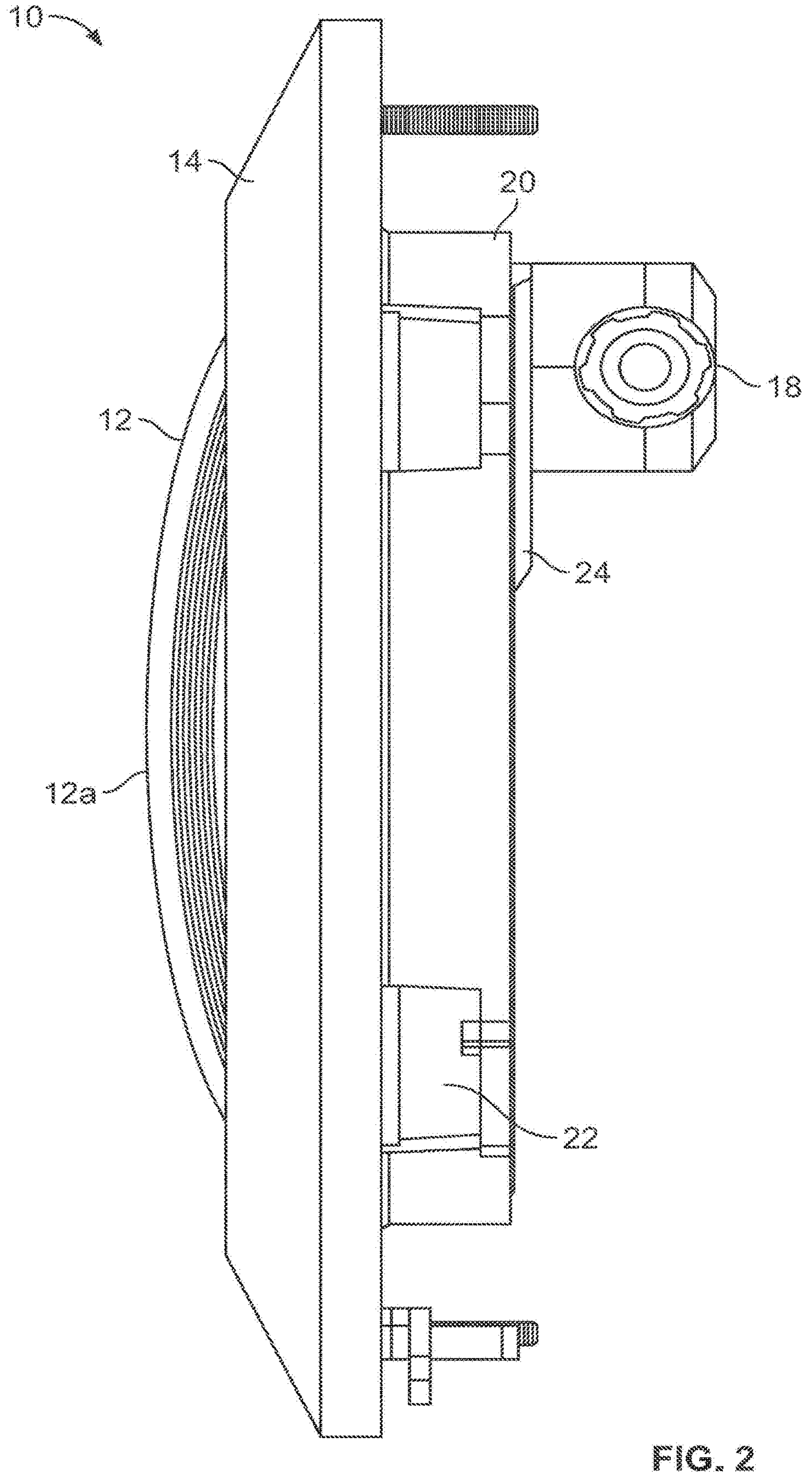
FIG. 2 is a side view of the underwater light of FIG. 1.

FIG. 2 is a side view showing the underwater light 10 of the present disclosure. As mentioned above, the bezel 14 is received by and couples to the mounting flange 20. In addition, a rear housing 22 couples to a rear of the mounting flange 20. The lens 12 is received by and couples to the rear housing 22 such that the lens 12 is in watertight communication with the rear housing 22. The rear housing 22 includes a raised portion 24 having a recess **24*a* (see FIG. 3). The recess 24*a* is configured to couple to the cable attachment assembly 18 to allow external power to be supplied to the electrical components of the underwater light 10** by way of a power cable (not shown) and/or control/communications cables (not shown) and to create a watertight seal with such components.

Figure 3:
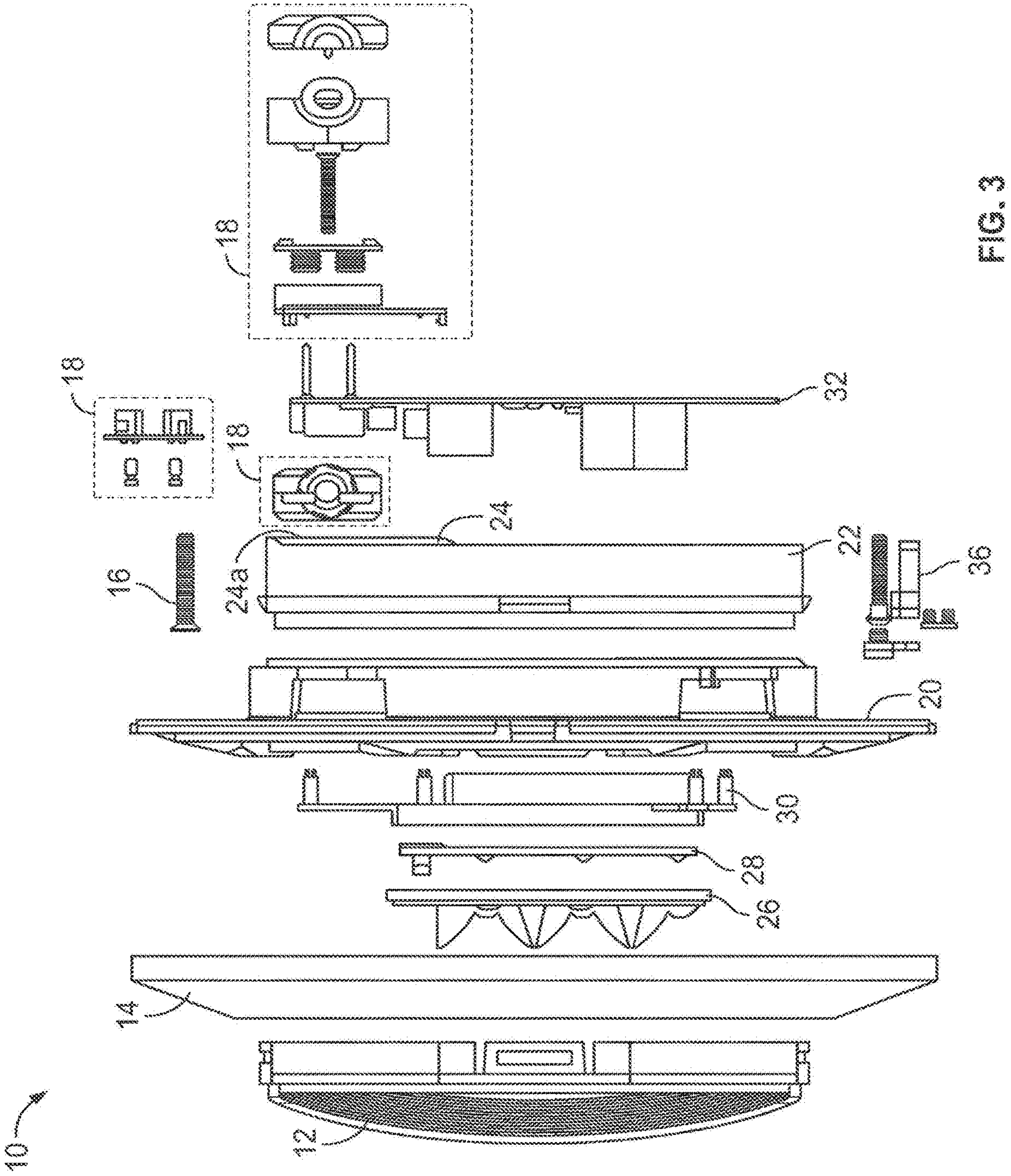
FIG. 3 is an exploded view of the underwater light of FIG. 2.

FIG. 3 is an exploded view of the underwater light 10 of FIG. 2. As shown in FIG. 3, the underwater light 10 comprises a plurality of components including the lens 12; the bezel 14; a screw 16; the cable attachment assembly 18; the mounting flange 20; the rear housing 22; an internal lens 26; a printed circuit board 28; a heat sink 30; an electronics assembly 32; and a fastening assembly 36. The components are discussed in further detail below.

Figure 4:
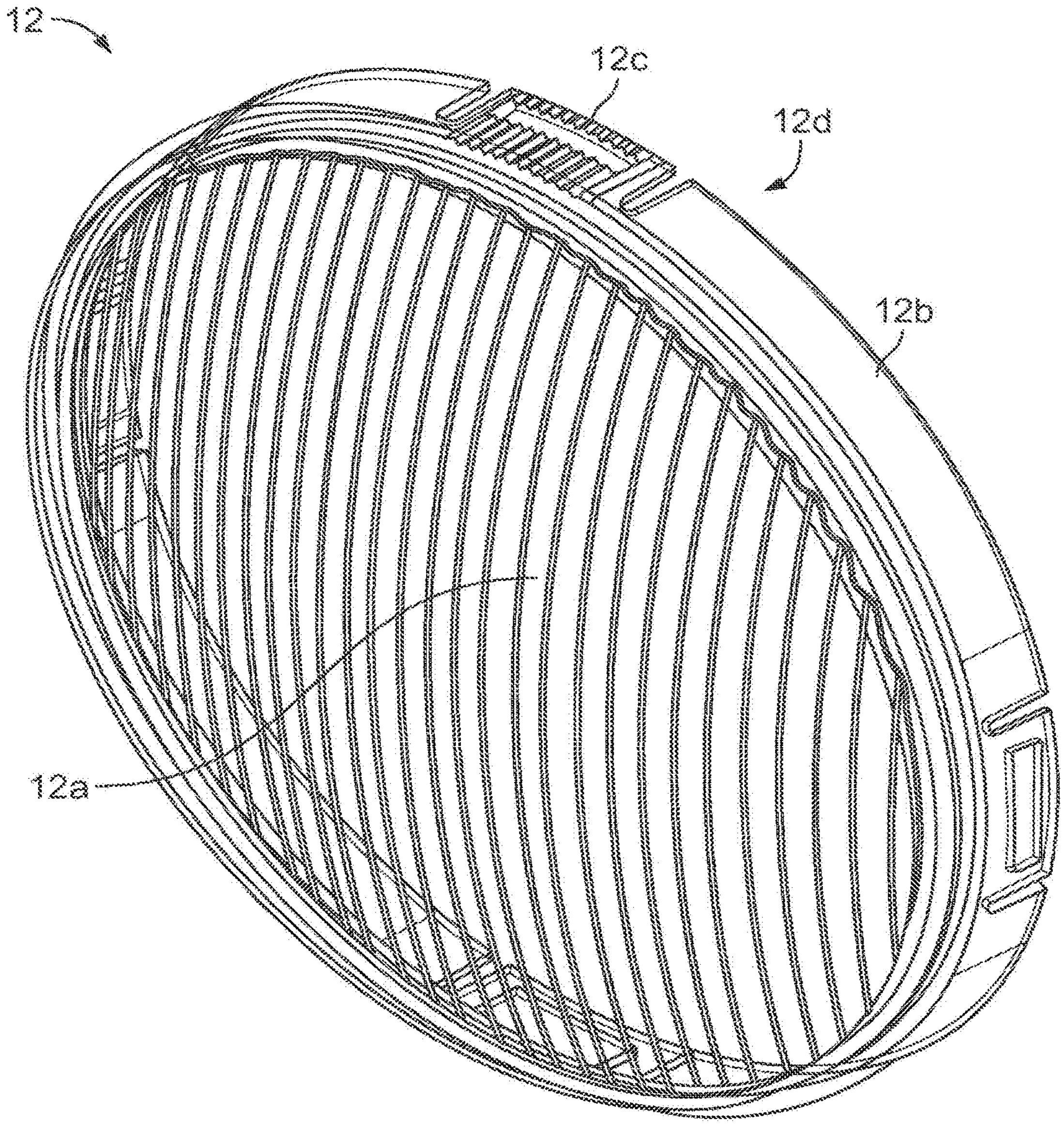
FIG. 4 is a perspective view of the lens of the underwater light of the present disclosure.

FIG. 4 is a perspective view of the lens 12 of the underwater light 10 of the present disclosure. As mentioned above, the lens 12 includes a central lens portion 12*a*, an annular wall 12*b*, a plurality of tabs 12*c* and a recess 12*d*. The annular wall 12*b* and the lens portion 12 together define the recess 12*d*. As discussed in further detail below, the recess 12*d* receives a rear housing annular projection 22*a*. In addition, the plurality of tabs 12*c* are configured to engage a rear housing plurality of notches 22*b* such that the lens 12 is in water tight communication with the rear housing 22.

The lens 12 could be formed using a suitable manufacturing process (e.g., injection molding, compression molding, thermoforming, etc.). The lens 12 could be formed from any suitable, electrically-insulating material, such as glass or a polymeric material (e.g., plastic). Such a material could include, but is not limited to, amorphous transparent copolymer having a cyclic olefin copolymer copolymerized from norbornene and ethylene using a metallocene catalyst and possessing properties important in optical components such as lenses. Such material possesses properties including, but not limited to, high transparency, low birefringence, high flowability for precision molding, high heat resistance and negligible water absorption. The lens 12 may also be formed from an unbreakable transparent plastic which allows for a light curing adhesive to be utilized for bonding the lens 12 to the rear housing 22.

Figure 5:
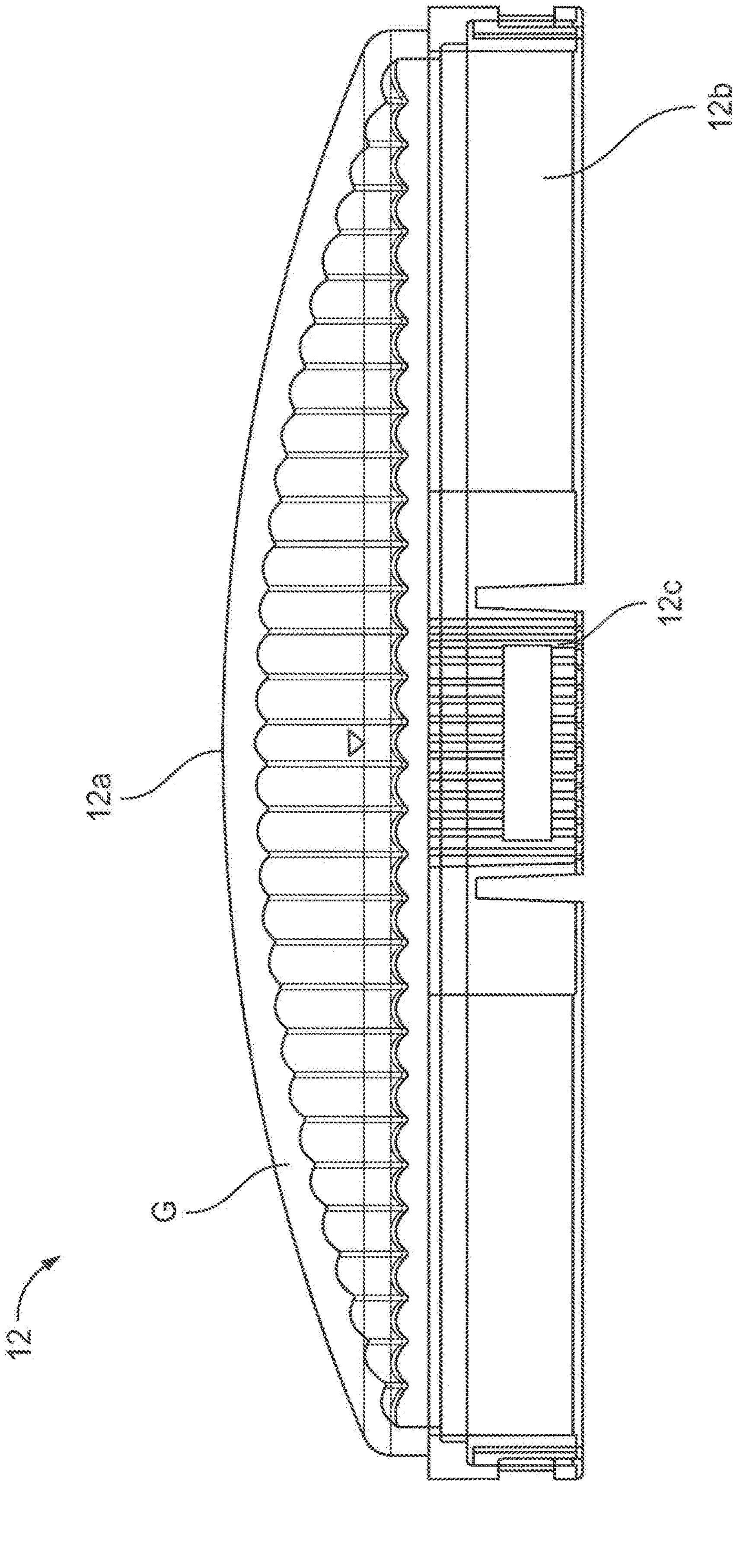
FIG. 5 is a bottom view of the lens of the underwater light of FIG. 4.

FIG. 5 is a bottom view of the lens 12 of the underwater light 10 of FIG. 4. The outer surface of the lens 12 has a silicon dioxide ($SiO_2$) coating or layer G configured to prevent the formation of condensation on an interior portion of the lens 12. The coating or layer G may be deposited by chemical vapor deposition. Alternatively the coating or layer G may be formed within the lens 12 or deposited on the interior portion of the lens 12. The coating or layer G insulates the underwater light 10 and thereby prevents the formation of condensation caused by a difference between the temperature of the air within the underwater light 10 and the temperature of pool water around the underwater light 10. It is noted that the lens 12 need not include the annular wall 12*b*. In such circumstances, the lens 12 could be shaped as a conventional lens for an underwater pool light, e.g., in the shape of a convex disc, and the lens 12 could be held in watertight position against the rear housing 22, e.g., by the bezel 14, or by other means.

Figure 6:
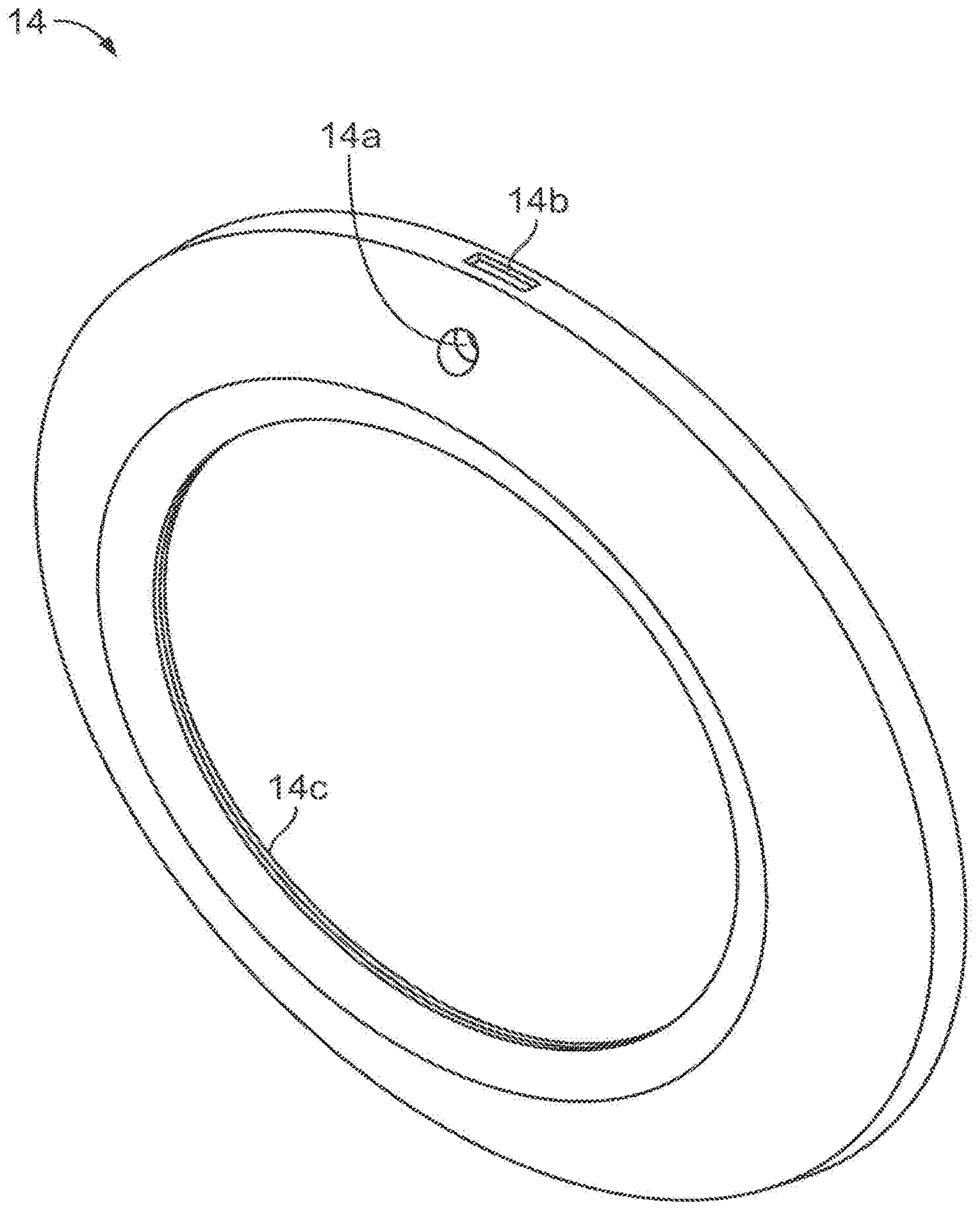
FIG. 6 is a perspective view of the bezel of the underwater light of the present disclosure.

FIG. 6 is a perspective view of the bezel 14 of the underwater light 10 of the present disclosure. The bezel 14 includes the screw aperture 14*a*, the plurality of peripheral recesses 14*b* and an annular projection 14*c*. As discussed in further detail below, the annular projection 14*c*, positioned on an interior of the bezel 14, is received by the mounting flange central aperture 20*c*. In addition, the bezel 14 couples to the mounting flange 20 via a plurality of mounting flange tabs 20*b* and a plurality of mounting flange fingers 20*d* which respectively engage the plurality of peripheral recesses 14*b* and a plurality of tabs (not shown) positioned on an interior of the bezel 14.

The aperture 14*a* could be elongate in shape to receive the screw 16 (see FIG. 3) in various positions to accommodate niches or recesses of a pool or spa of various diameters, thus allowing the underwater light 10 to be installed in multiple locations and without requiring modification of the underwater light 10. Additionally, a plurality of round apertures could be provided, extending outwardly from the center of the underwater light 10 and toward the periphery of the underwater light 10 to accommodate multiple screw positions.

The bezel 14 could be sized and shaped so as to cover niches or recesses of pools or spas having different diameters, or it could be over sized so as to cover a plurality of different diameters. The bezel 14 could be constructed of a thermally conductive and electrically insulative polymer material (e.g. plastic). In addition, the bezel could also be constructed of a chemical resistant material including, but not limited to, urethane, thermoplastic elastomer (TPE) overmolding, silicone or polyamide.

Figure 7:
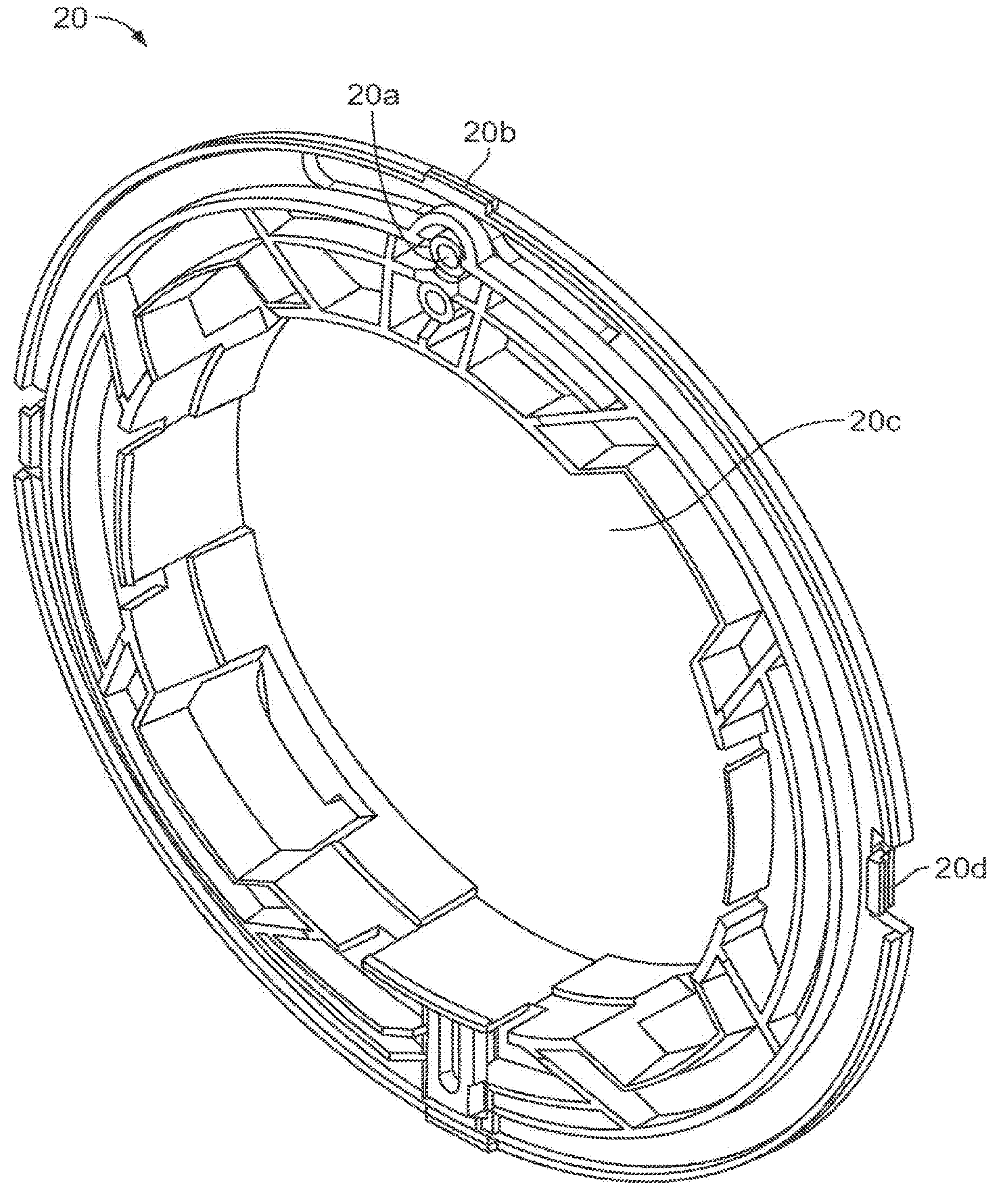
FIG. 7 is a perspective view of the mounting flange of the underwater light of the present disclosure.

FIG. 7 is a perspective view of the mounting flange 20 of the underwater light 10 of the present disclosure. The mounting flange 20 includes at least one aperture 20*a*, a plurality of tabs 20*b*, a central aperture 20*c*, and a plurality of fingers 20*d*. The central aperture 20*c* is configured to receive the bezel annular projection 14*c*. In addition, the plurality of tabs 20*b* are configured to respectively engage the plurality of bezel peripheral recesses 14*b* to couple the bezel 14 to the mounting flange 20. Also, the plurality of fingers 20*d* are configured to respectively engage the plurality of tabs positioned on the interior portion of the bezel 14 to couple the bezel 14 to the mounting flange 20.

The mounting flange 20 could be constructed of a thermally conductive and electrically insulative polymer material. Such a material could include, but is not limited to, electrically insulative and thermally conductive materials (e.g., plastic). In addition, the mounting flange 20 could also be constructed of a chemical resistant material including, but not limited to, urethane, thermoplastic elastomer (TPE) overmolding, silicone or polyamide.

Figure 8:
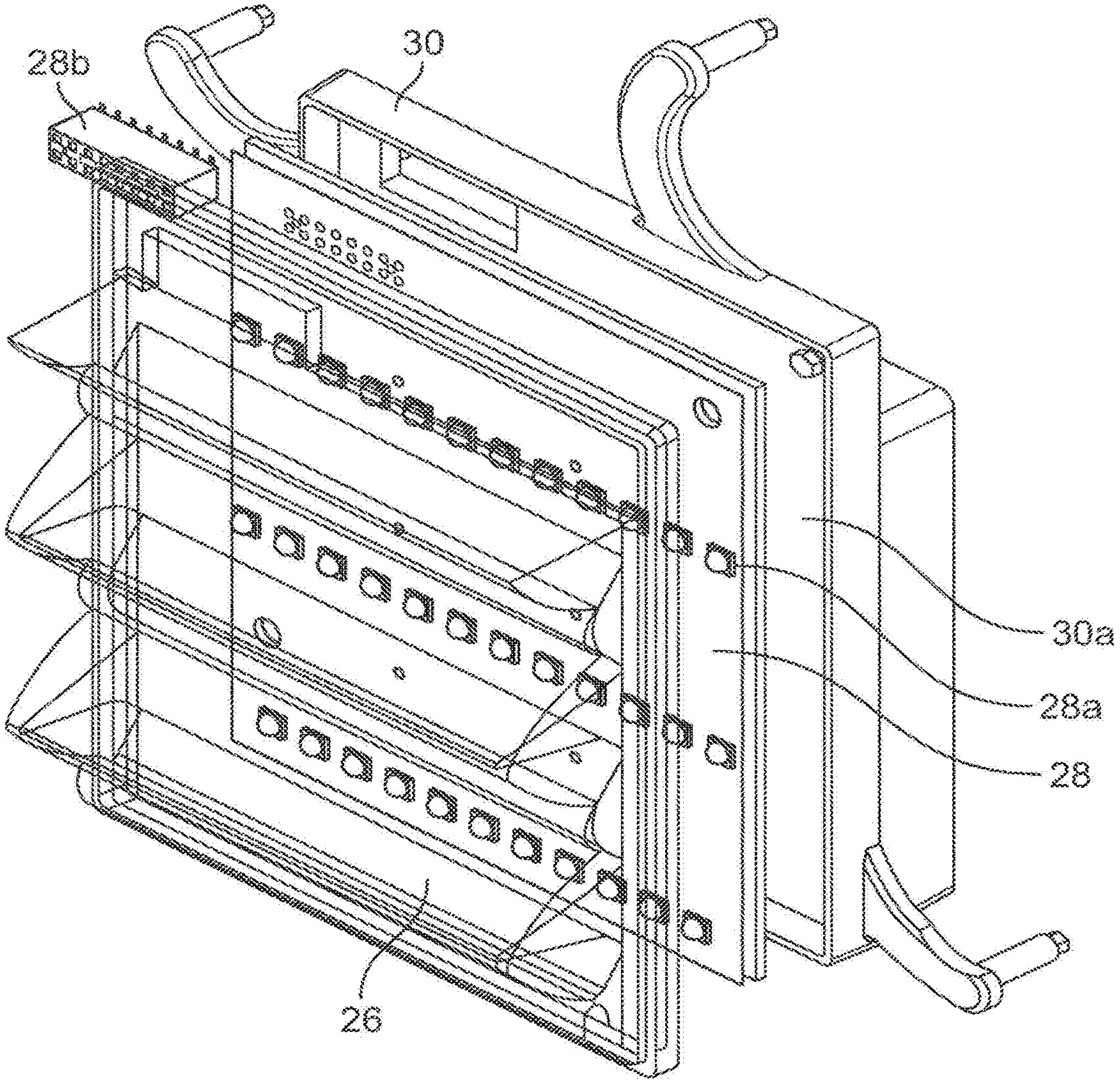
FIG. 8 is an exploded perspective view of the internal lens, the printed circuit board (PCB) and the heat sink of the underwater light of the present disclosure.

FIG. 8 is an exploded perspective view of an internal lens 26, a printed circuit board (PCB) 28 and a heat sink 30 of the underwater light 10 of the present disclosure. The PCB 28 includes a plurality of light-emitting diodes (LEDs) 28*a* and an electrical component or a plurality of electrical components 28*b*. The heat sink 30 includes an inner surface 30*a* and is positioned on a central inner surface of the rear housing 22.

The internal lens 26 can be positioned between the lens 12 and the PCB 28 to direct or focus light generated by the LEDs 28*a*. The internal lens 26 could be a collimator lens for producing parallel beams of light from the light generated by the LEDs 28*a*, or other desired types of lenses. Also, the collimator lens could be used in conjunction with a spreader lens.

In addition to the LEDs 28*a*, the PCB 28 may include several electronic components 28*b* including, but not limited to, controllers, transistors, resistors, wiring harnesses, microprocessors, etc. The PCB 28 is affixed to the inner surface 30*a* of the heat sink 30 such that the PCB 28 is enclosed by the internal lens 26 and the heat sink 30. The PCB 28 could be bonded to the heat sink inner surface 30*a* by means of a thermally conductive material, such as a thermally-conductive grease, adhesive or potting compound. The thermally-conductive adhesive could include thermally-conductive, fiberglass-reinforced, pressure-sensitive adhesive tape, or a thermally-conductive, filled polymer composite interface including an adhesive layer. The application of thermally conductive material allows for the PCB 28 to be in thermal communication with the heat sink 30 and subsequently the rear housing 22. This allows for the transfer of heat from the LEDs 28*a* and the electronic components 28*b* of the PCB 28, through the thermally conductive material, to the heat sink 30 and the exterior of the rear housing 22. It is also noted that a separate layer (or plate) of thermally conductive material could be positioned between the PCB 28 and the heat sink inner surface 30*a*. Such a separate layer (or plate) could be attached to the PCB 28 and the heat sink inner surface 30*a* using a thermally-conductive adhesive.

The heat sink 30 is constructed of thermally conductive and electrically insulative material and is positioned on a central inner surface of the rear housing 22. Such a material could include, but is not limited to, electrically insulative and thermally conductive material (e.g., plastic). In addition, the heat sink 30 could also be constructed of a chemical resistant material including, but not limited to, urethane, thermoplastic elastomer (TPE) overmolding, silicone or polyamide. The presence of the heat sink 30 on the inner surface of the rear housing 22 allows for heat to be properly dissipated away from the PCB 28 thereby cooling the LEDs 28*a* and the electrical components 28*b*. The heat sink 30 could also be molded to the rear housing 22 during its fabrication or may be attached through a suitable means (e.g. at least one screw or an adhesive).

Figure 9:
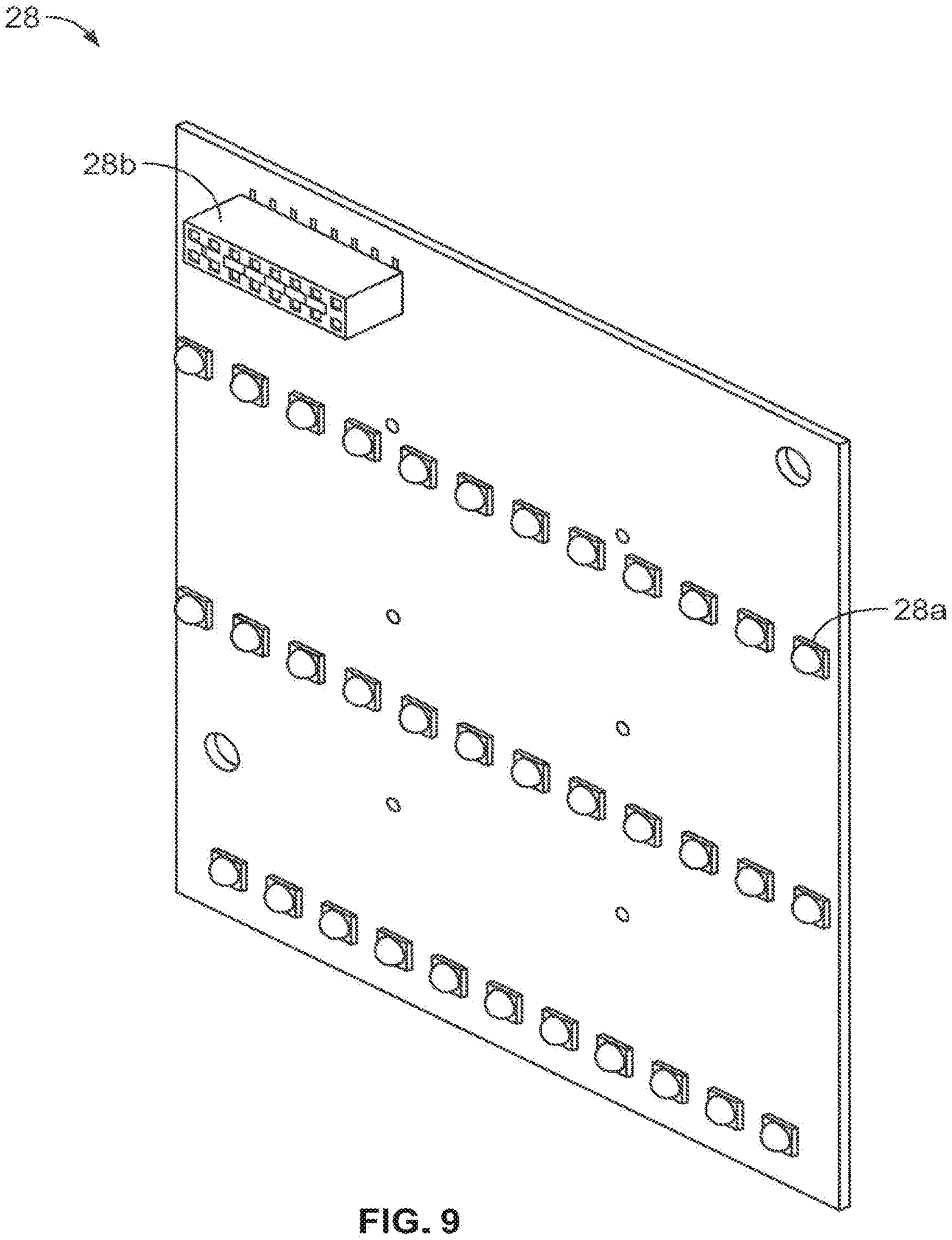
FIG. 9 is a perspective view of the PCB of FIG. 8.

FIG. 9 is a perspective view of the PCB 28 of FIG. 8. The PCB 28 may include LEDs 28*a* in addition to several electronic components 28*b* including, but not limited to, controllers, transistors, resistors, etc. The PCB 28 is affixed to the inner surface 30*a* of the heat sink 30 such that the PCB 28 is enclosed by the internal lens 26 and the heat sink 30. Various optical and/or dielectric components could be used within the underwater light 10 in addition the internal lens 26 to enhance lighting, and to promote added safety.

For example, the underwater light 10 could include a plurality of light culminators to respectively be in optical communication with the plurality of LEDs 28*a*. The light culminators collect light generated by the LEDs 28*a* to provide high intensity output. Also, optical light "pipes" could be used in place of the culminators, the pipes being made from a solid plastic or glass material and transmitting light from the LEDs 28*a* directly to an outer surface(s) of the underwater light 10 (e.g., to the lens 12).

It is noted the underwater light 10 could be utilized in horticultural applications. For example, the underwater light 10 could be utilized in underwater vertical farms to cultivate seaweed, rice, wasabi, water chestnut, etc. Accordingly, the respective colors of the LEDs 28*a* could be specified to target the wavelengths at which various chlorophyll pigments in plants absorb light to enable photosynthesis. For example, the LEDs 28*a* could be a variation of blue to target a wavelength spectrum of 400 nm to 500 nm and/or a variation of red to target a wavelength spectrum of 600 nm to 700 nm at which each of chlorophyll A and chlorophyll B absorb light. The LEDs 28*a* could also be a variation of white (e.g., magenta and light green) to provide for visual inspection of plant growth and/or harvest. In addition, the respective colors of the LEDs 28*a* could be modified according to the various stages of plant growth (seedlings, flowering, harvest, etc.) to promote an efficient plant growth cycle and a greater plant yield.

Also an optically transparent potting compound could be used to encapsulate the LEDs 28*a*, as well as the PCB 28 to which the LEDs 28*a* are mounted and portions of the culminators. The potting compound could encapsulate the LEDs 28*a* and the PCB 28 if the culminators are not provided. The potting compound protects the LEDs 28*a* and the PCB 28 from exposure to water in the event that the underwater light 10 is no longer watertight, thereby protecting against electrical shock and promoting safety. Also, the optically transparent potting compound encapsulating the PCB 28 and the LEDs 28*a* mounted thereon in addition to the ability to remove the rear housing 22 of the underwater light provide for the safe replacement of the PCB 28 mounted within the underwater light 10 when one of the LEDs 28*a* is inoperable.

Figure 10:
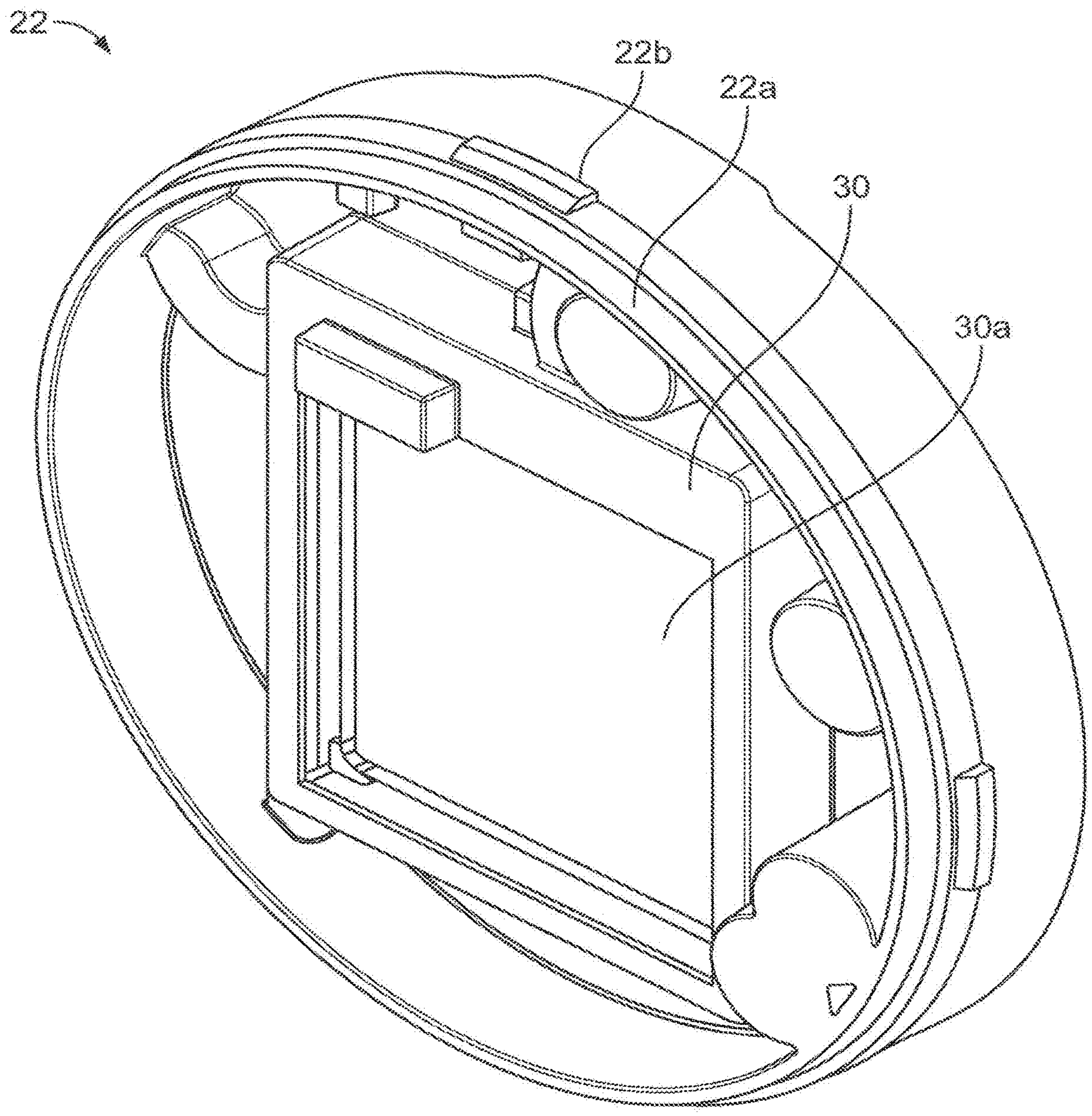
FIG. 10 is a perspective view of the rear housing of the underwater light of the present disclosure.

FIG. 10 is a perspective view of the rear housing 22 of the underwater light 10 of the present disclosure. The rear housing 22 includes an annular projection 22*a*, a plurality of notches 22*b* and the heat sink 30. As mentioned above, the heat sink 30 may be molded to the rear housing 22 during its fabrication or may be coupled to the rear housing 22 through a suitable means (e.g. at least one screw or an adhesive). The rear housing 22 may be overmolded over the electronics assembly 32. In addition, an optically transparent potting compound could be used to encapsulate the electronics assembly 32. The annular projection 22*a* is received by the lens recess 12*d* formed by the lens annular wall 12*b*. The plurality of notches 22*b* respectively engage the plurality of lens tabs 12*c* to couple the lens 12 to the rear housing 22. In addition, the annular projection 22*a* could be bonded with the lens recess 12*d* through a light curing adhesive, or any other suitable adhesive, to provide a watertight seal for the underwater light 10. The positons of the annular projection 22*a* and the lens recess 12*d* could be reversed such that the annular projection 22*a* could be provided on the lens 12, and the recess 12*d* could be provided on the rear housing 22.

Also, it is noted that the annular projection 22*a* need not be provided to facilitate the coupling of the lens 12 to the rear housing 22. Indeed, the lens 12 and the rear housing 22 could be coupled to each other by way of corresponding flat annular surfaces which are coupled to each other by gluing, bonding, etc., to create a watertight seal. Further, a gasket or O-ring could be used to create a watertight seal between the lens 12 and the rear housing 22. Still further, the lens 12 could be coupled to the rear housing 22 by way of a watertight threaded connection, i.e., the lens 12 could be threaded onto the rear housing 22 and vice versa. Also, the lens 12 could be coupled to the rear housing 22 by way of adhesives, sonic welding, etc.

The rear housing 22 is constructed of a thermally conductive and electrically insulative polymer material. Such a material could include, but is not limited to, electrically insulative and thermally conductive material (e.g., plastic). In addition, the rear housing 22 could also be constructed of a chemical resistant material including, but not limited to, urethane, thermoplastic elastomer (TPE) overmolding, silicone or polyamide. It is noted that the entirety of the rear housing 22 need not be formed of a thermally-conductive polymeric material. Rather, only a desired portion of the housing wall 18 could be formed from such material, in locations where significant amount of heat are generated. In such circumstances, the remainder of the rear housing 22, as well as the bezel 14, could be formed by a non-thermally-conductive polymeric material, and the thermally-conductive portion could be coupled to the non-thermally-conductive portion by way of insert molding, overmolding, sonic welding, adhesives, etc.

Advantageously, the electrically non-conductive nature of the exterior components of the underwater light 10 of the present disclosure (i.e., the lens 12, the bezel 14, the mounting flange 20 and the rear housing 22) permit the underwater light 10 to be installed in any location in a pool or spa without requiring specific approval of Underwriters Laboratories. Further, since the exterior of the underwater light 10 is electrically non-conductive, no specific bonding or grounding of the underwater light 10 is necessary. In addition, the rear housing 22 prevents contact with high voltage components of the underwater light 10 such as power supply components, line-level (AC) power, etc.

Figure 11:
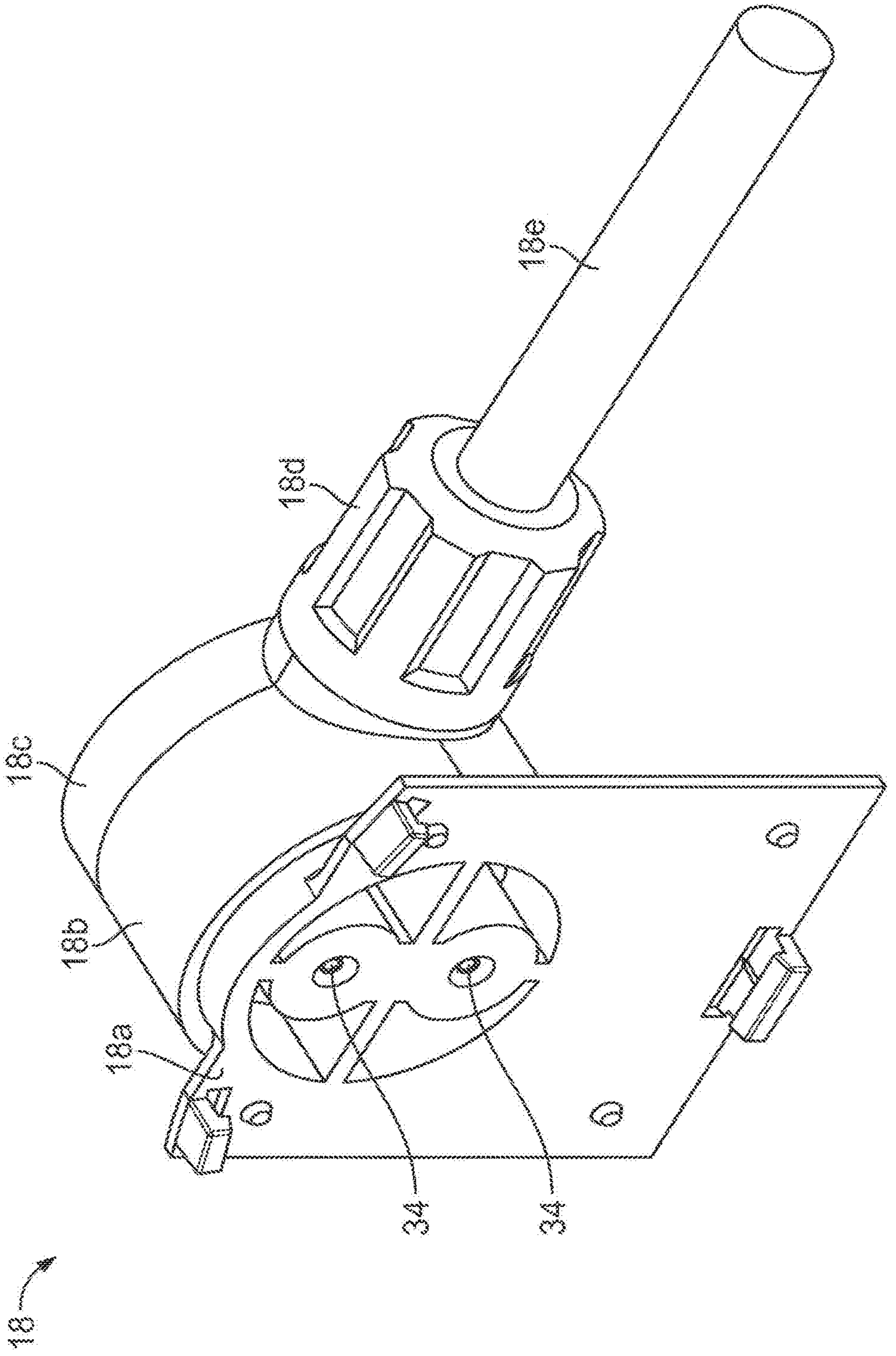
FIG. 11 is a perspective view of the cable attachment assembly for providing a watertight connection between a power and/or communications cord and the underwater light of the present disclosure.

FIG. 11 is a perspective view of the cable attachment assembly 18 for providing a watertight connection between a power and/or communications cord and the underwater light 10 of the present disclosure. The cable attachment assembly 18 includes a PCB adapter 18*a* having apertures 34, a base connector 18*b*, a cap connector 18*c*, a plug nut 18*d* and a cord 18*c* which houses a power/and or communications cord (not shown). Each of the apertures 34 of the PCB adapter 18*a* are configured to receive a terminal post (not shown) electrically coupled to the PCB 28 and the electronics assembly 32. For example, each terminal post could be soldered to one or more conductor traces of the PCB 28 and the electronics assembly 32. The terminal posts project through the base connector 18*b*. The threaded plug nut 18*d* is threaded onto a threaded aperture formed by a coupling of the base connector 18*b* and the cap connector 18*c*. The threaded plug nut 18*d* forms a watertight seal with the coupled base connector 18*b* and cap connector 18*c* via an O-ring or other sealing means. In addition, the threaded plug nut 18*d* receives, in watertight communication (e.g., by epoxy, gluing, etc.), the cord 18*e* which houses the power/ and or communications cord. Each conductor of the power and/or communications cord is coupled to respective projections of the terminal posts, thereby completing electrical connection of the power and/or communications cord to the PCB 28 and electronics assembly 32. It is noted that the terminal posts and terminal post projections could be encapsulated with a potting compound.

Figure 12:
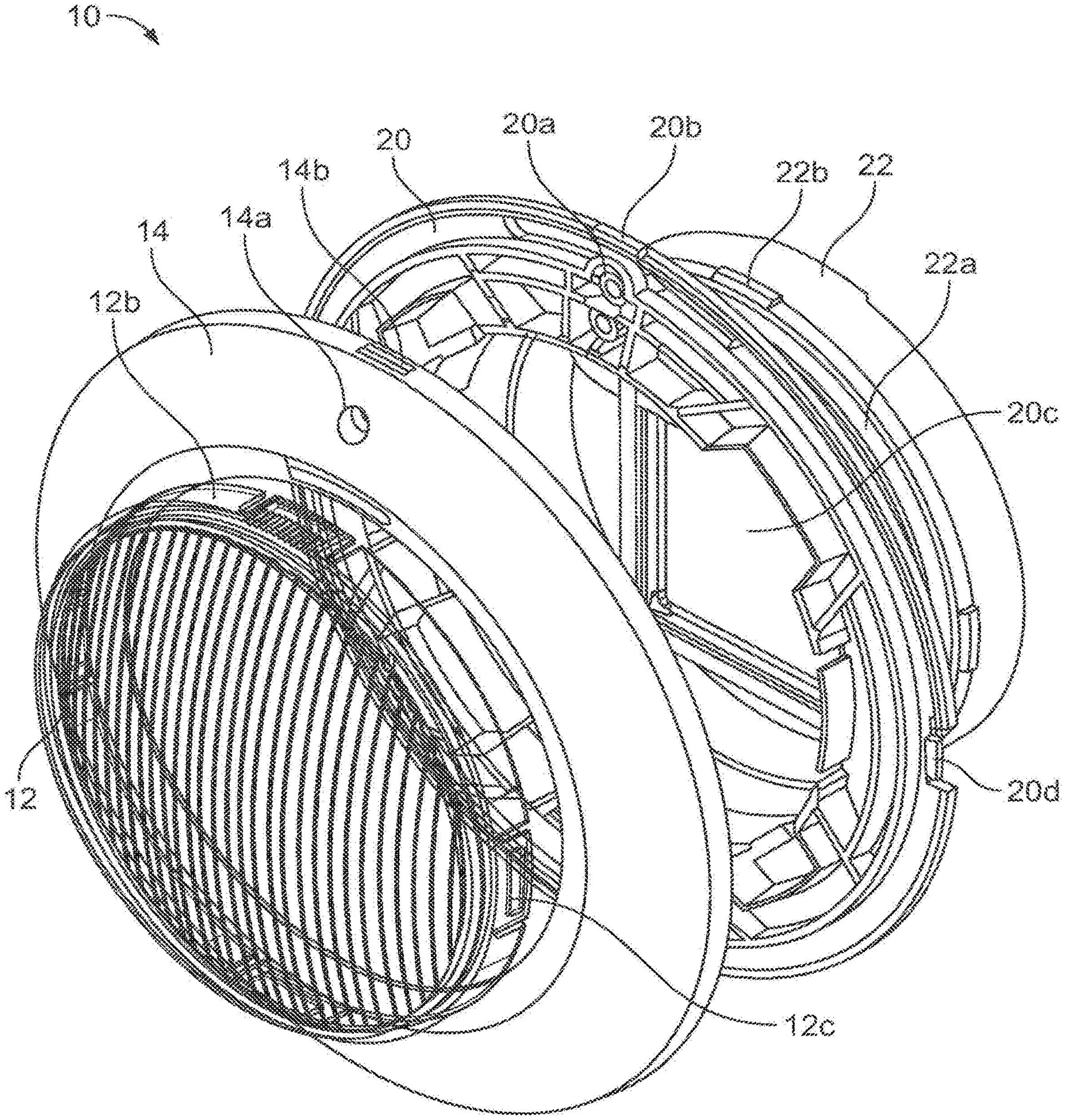
FIG. 12 is an exploded view of the underwater light of the present disclosure showing assembly of the lens, the bezel, the mounting flange and the rear housing.

FIG. 12 is an exploded perspective view of the underwater light 10 of the present disclosure showing an assembly of the lens 12, the bezel 14, the mounting flange 20 and the rear housing 22. The rear housing annular projection 22*a* is received by the lens recess 12*d* formed by the lens annular wall 12*b*. The plurality of rear housing notches 22*b* respectively engage the plurality of lens tabs 12*c* to couple the lens 12 to the rear housing 22. The mounting flange central aperture 20*c* is configured to receive the bezel annular projection 14*c* (not shown). In addition, the plurality of mounting flange tabs 20*b* are configured to respectively engage the plurality of bezel peripheral recesses 14*b* to couple the bezel 14 to the mounting flange 20. The plurality of mounting flange fingers 20*d* are configured to respectively engage the plurality of tabs (not shown) positioned on the interior portion of the bezel 14 to couple the bezel 14 to the mounting flange 20. The bezel aperture 14*a* could be elongate in shape to receive the screw 16 (not shown) such that a projection of the screw 16 may be received by the mounting flange aperture 20*a*.

Advantageously, the electrically non-conductive nature of the exterior components of the underwater light 10 of the present disclosure (i.e., the lens 12, the bezel 14, the mounting flange 20 and the rear housing 22) permit the underwater light 10 to be installed in any location in a pool or spa without requiring specific approval of Underwriters Laboratories. Further, since the exterior of the underwater light 10 is electrically non-conductive, no specific bonding or grounding of the underwater light 10 is necessary. It is also noted the rear housing 22 prevents contact with high voltage components of the underwater light 10 such as power supply components, line-level (AC) power, etc. In addition, the optically transparent potting compound encapsulating the PCB 28 and the LEDs 28*a* and electronic components 28*b* mounted thereon and the ability to remove the rear housing 22 of the underwater light 10 provide for the safe replacement of the PCB 28 mounted within the underwater light 10 when an LED 28*a* mounted thereon is inoperable.

FIG. 13*a* is a perspective view showing the underwater light 100 of the present disclosure. The underwater light 100 may include a lens 120 having a central portion 120*a* and a peripheral region including an annular wall 120*b* (see FIGS. 13*a* and 14), a bezel 140 including a screw aperture 140*a* and a plurality of peripheral recesses 140*b*, and a cable attachment assembly 180 (see FIG. 20). The term "lens," as used herein, refers not only to an optical component which can focus light (as in a conventional lens), but also to components which are merely transparent and do not focus light, such as a transparent and/or translucent cover. The bezel 140 is received by and couples to a mounting flange 200 (not shown). The mounting flange 200 can be similar to the mounting flange 20 of FIG. 7 such that the bezel 140 may be received by and couples to the mounting flange 20. The bezel 140 is positioned about the central lens portion 120*a*. The underwater light 100 can be positioned such that the aperture 140*a* can be rotated up to 360 degrees from the typical 12 o'clock position of existing underwater lights. This allows the lens 120 to be positioned to direct light in a preferred direction in a pool or spa, and to accommodate installation of the underwater light 100 in niches having various orientations.

Figure 13B:
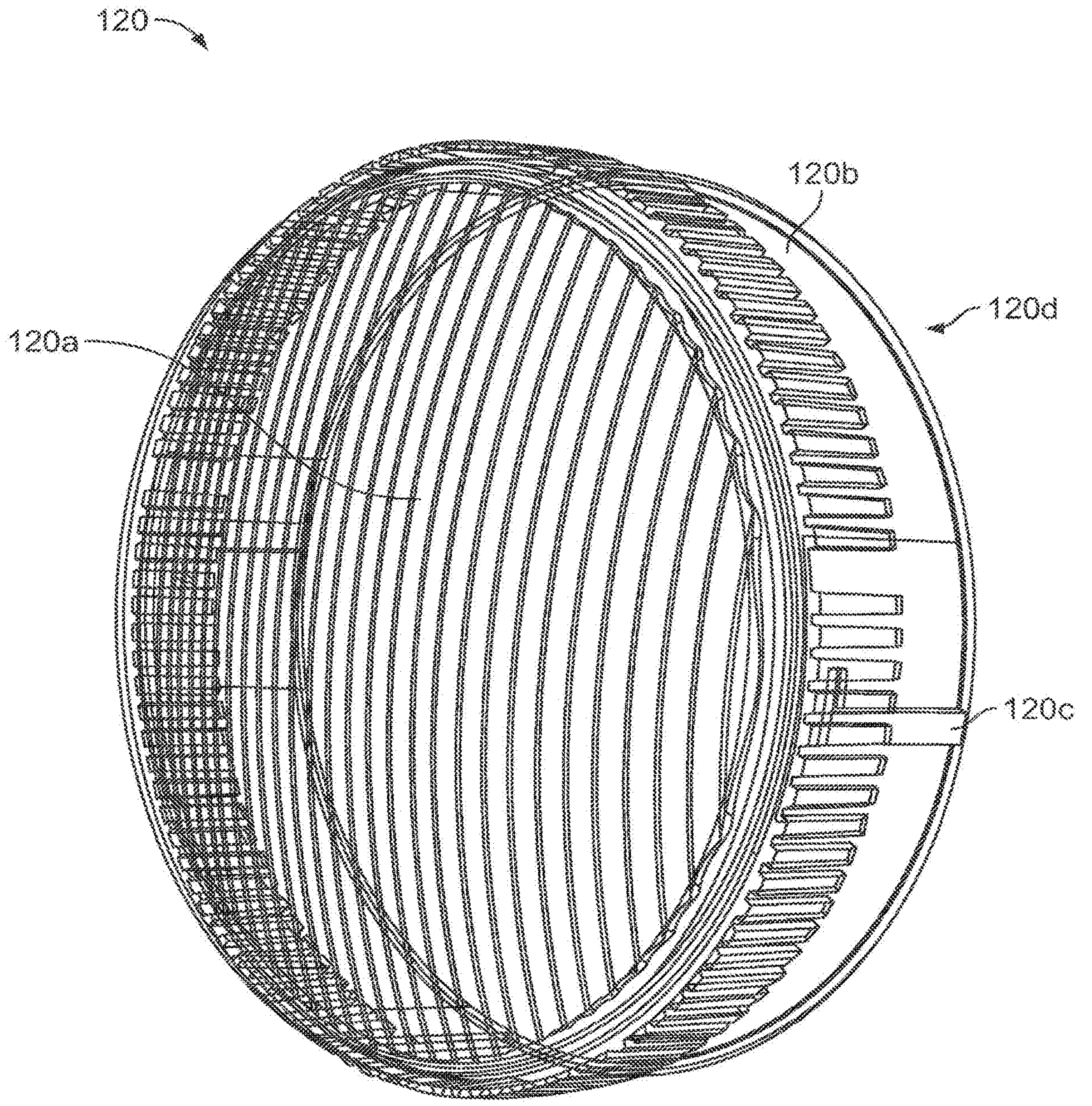

FIG. 13*b* is a perspective view of the lens 120 of the underwater light 100 of FIG. 13*a*. The lens 120 includes a central lens portion 120*a*, an annular wall 120*b*, a plurality of slots 120*c* and a recess 120*d*. The annular wall 120*b* and the lens portion 120 together define the recess 120*d*. As discussed in further detail below, the recess 120*d* receives the rear housing 220. In addition, the plurality of slots 120*c* are configured to engage a rear housing plurality of hooks 220*a* such that the lens 120 is in water tight communication with the rear housing 220.

The lens 120 could be formed using a suitable manufacturing process (e.g., injection molding, compression molding, thermoforming, etc.). The lens 120 could be formed from any suitable, electrically-insulating material, such as glass or a polymeric material (e.g., plastic). Such a material could include, but is not limited to, amorphous transparent copolymer having a cyclic olefin copolymer copolymerized from norbornene and ethylene using a metallocene catalyst and possessing properties important in optical components such as lenses. Such a material possesses properties including, but not limited to, high transparency, low birefringence, high flowability for precision molding, high heat resistance and negligible water absorption. The lens 120 may also be formed from an unbreakable transparent plastic which allows for a light curing adhesive to be utilized for bonding the lens 120 to the rear housing 220.

FIG. 14 is a bottom view of the lens 120 of the underwater light 100 of FIG. 13*a*. The outer surface of the lens 120 has a silicon dioxide ($SiO_2$) coating or layer G configured to prevent the formation of condensation on an interior portion of the lens 120. The coating or layer G may be deposited by chemical vapor deposition. Alternatively the coating or layer G may be formed within the lens 120 or deposited on the interior portion of the lens 120. The coating or layer G insulates the underwater light 100 and thereby prevents the formation of condensation caused by a difference between the temperature of the air within the underwater light 100 and the temperature of pool water around the underwater light 100. It is noted that the lens 120 need not include the annular wall 120*b*. In such circumstances, the lens 120 could be shaped as a conventional lens for an underwater pool light, e.g., in the shape of a convex disc, and the lens 120 could be held in watertight position against the rear housing 220, e.g., by the bezel 140, or by other means.

FIG. 15 is a perspective view of a rear housing plate 400 of the underwater light 100 of the present disclosure. The rear housing plate 400 includes a plurality of notches 400*a* and an annular projection 400*b* and can be positioned between the lens 120 and the rear housing 220. The annular projection 400*b* is received by the lens recess 120*d* formed by the lens annular wall 120*b*. The plurality of notches 400*a* engage the rear housing 220 such that the rear housing plate 400 is in water tight communication with the rear housing 220. In addition, the annular projection 400*b* could be bonded with the lens recess 120*d* through a light curing adhesive, or any other suitable adhesive, to provide a watertight seal for the underwater light 100. The positons of the annular projection 400*b* and the lens recess 120*d* could be reversed such that the annular projection 400*b* could be provided on the lens 120, and the recess 120*d* could be provided on the rear housing plate 400.

Also, it is noted that the annular projection 400*b* need not be provided to facilitate the coupling of the lens 120 to the rear housing plate 400. Indeed, the lens 120 and the rear housing plate 400 could be coupled to each other by way of corresponding flat annular surfaces which are coupled to each other by gluing, bonding, etc., to create a watertight seal. Further, a gasket or O-ring could be used to create a watertight seal between the lens 120 and the rear housing plate 400. Still further, the lens 120 could be coupled to the rear housing plate 400 by way of a watertight threaded connection, i.e., the lens 120 could be threaded onto the rear housing plate 400 and vice versa. Also, the lens 120 could be coupled to the rear housing plate 400 by way of adhesives, sonic welding, etc.

The rear housing plate 400 could be constructed of an electrically insulative and thermally conductive polymer material. Such a material could include, but is not limited to, electrically insulative and thermally conductive material (e.g., plastic). In addition, the rear housing plate 400 could also be constructed of a chemical resistant material including, but not limited to, urethane, thermoplastic elastomer (TPE) overmolding, silicone or polyamide.

FIG. 16 is a perspective view of the rear housing 220 of the underwater light 100 of the present disclosure. The rear housing 220 includes a plurality of hooks 220*a*. The heat sink 300 may be molded to the rear housing 220 during its fabrication or may be coupled to the rear housing 220 through a suitable means (e.g. at least one screw or an adhesive). The rear housing 220 may be overmolded over the electronics assembly 320 including a control board 320*a* and a network board 320*b*. In addition, an optically transparent potting compound could be used to encapsulate the electronics assembly 320.

As mentioned above, the rear housing plate 400 includes a plurality of notches 400*a* and an annular projection 400*b* and can be positioned between the lens 120 and the rear housing 220. The plurality of notches 400*a* engage the rear housing 220 such that the rear housing plate 400 is in water tight communication with the rear housing 220. The annular projection 400*b* is received by the lens recess 120*d* formed by the lens annular wall 120*b*. In addition, the plurality of rear housing hooks 220*a* respectively engage the plurality of lens slots 120*c* to couple the lens 120 to the rear housing 220.

The rear housing 220 is constructed of a thermally conductive and electrically insulative polymer material. Such a material could include, but is not limited to, electrically insulative and thermally conductive material (e.g., plastic). In addition, the rear housing 220 could also be constructed of a chemical resistant material including, but not limited to, urethane, thermoplastic elastomer (TPE) overmolding, silicone or polyamide. It is noted that the entirety of the rear housing 220 need not be formed of a thermally-conductive polymeric material. Rather, only a desired portion of the rear housing wall could be formed from such material, in locations where significant amount of heat are generated. In such circumstances, the remainder of the rear housing 220 could be formed by a non-thermally-conductive polymeric material, and the thermally-conductive portion could be coupled to the non-thermally-conductive portion by way of insert molding, overmolding, sonic welding, adhesives, etc.

Advantageously, the electrically non-conductive nature of the exterior components of the underwater light 100 of the present disclosure permit the underwater light 100 to be installed in any location in a pool or spa without requiring specific approval of Underwriters Laboratories. Further, since the exterior of the underwater light 100 is electrically non-conductive, no specific bonding or grounding of the underwater light 100 is necessary. In addition, the rear housing 220 prevents contact with high voltage components of the underwater light 100 such as power supply components, line-level (AC) power, etc.

FIG. 17 is a perspective view of the front of the heat sink 300 of the underwater light 100 of the present disclosure and FIG. 18 is a perspective view of the rear of the heat sink 300 of the underwater light 100 of the present disclosure. The heat sink 300 includes an inner surface 300*a* and is positioned on a central inner surface of the rear housing 220. The heat sink 300 also includes a plurality of fins 300*b* located on the rear of the heat sink 300 to promote heat dissipation. The plurality of fins 300*b* may be rectangular or trapezoidal in shape, continuous or segmented, and/or arranged in a vertical, horizontal or intersecting pattern.

The heat sink 300 is constructed of thermally conductive and electrically insulative material. Such a material could include, but is not limited to, electrically insulative and thermally conductive material (e.g., plastic). In addition, the heat sink 300 could also be constructed of a chemical resistant material including, but not limited to, urethane, thermoplastic elastomer (TPE) overmolding, silicone or polyamide. The presence of the heat sink 300 on the inner surface of the rear housing 220 allows for heat to be properly dissipated away from the PCB 280 (not shown) thereby cooling the LEDs 280*a* (not shown) and the electrical components 280*b* (not shown). The heat sink 300 could also be molded to the rear housing 22 during its fabrication or may be attached through a suitable means (e.g. at least one screw or an adhesive).

FIG. 19 is a perspective view of the electronics assembly 320 of the underwater light 100 of the present disclosure. As mentioned above, the electronics assembly 320 may include a control board 320*a* and a network board 320*b*. The control board 320 *a* may be configured to control a display of the underwater light 100 and the network board 320*b* may be configured to communicate with a wireless terminal (e.g., a remote control, tablet, laptop, etc.).

FIG. 20 is a perspective view of the cable attachment assembly 180 for providing a watertight connection between a power and/or communications cord and the underwater light 100 of the present disclosure. The cable attachment assembly 180 includes a PCB adapter 180*a* having apertures 340, a base connector 180*b*, a cap connector 180*c*, a plug nut 180*d* and a cord 180*c* which houses a power/and or communications cord (not shown). It is noted that the PCB adapter 180*a* could have a plurality of shapes. For example, the PCB adapter 180*a* could be a plurality of shapes, including but not limited to, triangular, circular, square and hexagonal.

Each of the apertures 340 of the PCB adapter 180*a* are configured to receive a terminal post (not shown) electrically coupled to the PCB 280 and the electronics assembly 320. For example, each terminal post could be soldered to one or more conductor traces of the PCB 280 and the electronics assembly 320. The terminal posts project through the base connector 180*b*. The threaded plug nut 180*d* is threaded onto a threaded aperture formed by a coupling of the base connector 180*b* and the cap connector 180*c*. The threaded plug nut 180*d* forms a watertight seal with the coupled base connector 180*b* and cap connector 180*c* via an O-ring or other scaling means. In addition, the threaded plug nut 180*d* receives, in watertight communication (e.g., by epoxy, gluing, etc.), the cord 180*e* which houses the power/and or communications cord. Each conductor of the power and/or communications cord is coupled to respective projections of the terminal posts, thereby completing electrical connection of the power and/or communications cord to the PCB 280 and electronics assembly 320. It is noted that the terminal posts and terminal post projections could be encapsulated with a potting compound.

FIG. 21 is an exploded view of the underwater light 100 of FIG. 13*a* showing assembly of the lens 120, the rear housing plate 400 and the rear housing 220. As mentioned above, the rear housing plate 400 includes a plurality of notches 400*a* and an annular projection 400*b* and can be positioned between the lens 120 and the rear housing 220. The plurality of notches 400*a* engage the rear housing 220 such that the rear housing plate 400 is in water tight communication with the rear housing 220. The annular projection 400*b* is received by the lens recess 120*d* formed by the lens annular wall 120*b*. In addition, the plurality of rear housing hooks 220*a* respectively engage the plurality of lens slots 120*c* to couple the lens 120 to the rear housing 220.

Advantageously, the electrically non-conductive nature of the exterior components of the underwater light 100 of the present disclosure permit the underwater light 100 to be installed in any location in a pool or spa without requiring specific approval of Underwriters Laboratories. Further, since the exterior of the underwater light 100 is electrically non-conductive, no specific bonding or grounding of the underwater light 100 is necessary. In addition, the rear housing 220 prevents contact with high voltage components of the underwater light 100 such as power supply components, line-level (AC) power, etc. In addition, the rear housing plate 400 and the optically transparent potting compound encapsulating the PCB 280 (not shown) and the LEDs 280*a* (not shown) and electronic components 280*b* (not shown) mounted thereon and the ability to remove the rear housing 220 of the underwater light 100, provide for the safe replacement of the PCB 280 mounted within the underwater light 100 when an LED 280*a* mounted thereon is inoperable.

FIG. 22 is a perspective view showing another embodiment of the underwater light 500 of the present disclosure. The underwater light 500 includes a lens 512 having a central portion 512*a* and a peripheral region including an annular wall 512*b* (see FIG. 28), a bezel 514 including a screw aperture 514*a* and a plurality of peripheral recesses 514*b*, and a cable attachment assembly 518. The term “lens,” as used herein, refers not only to an optical component which can focus light (as in a conventional lens), but also to components which are merely transparent and do not focus light, such as a transparent and/or translucent cover. The bezel 514 is received by and couples to a mounting flange 520 (see FIG. 23). The bezel 514 is positioned about the central lens portion 512*a*. The underwater light 500 can be positioned such that the aperture 514*a* can be rotated up to 360 degrees from the typical 12 o’clock position of existing underwater lights. This allows the lens 512 to be positioned to direct light in a preferred direction in a pool or spa, and to accommodate installation of the light 500 in niches having various orientations.

FIG. 23 is a side view showing the underwater light 500 of FIG. 22. As mentioned above, the bezel 514 is received by and couples to the mounting flange 520. A screw 506 may be received by the screw aperture 514*a* to couple the bezel 514 to the mounting flange 520. In addition, a rear housing 522 couples to a rear of the mounting flange 520. The lens 512 is received by and couples to the rear housing 522 such that the lens 512 is in watertight communication with the rear housing 522. The rear housing 522 includes a recessed portion configured to couple to the cable attachment assembly 518 to allow external power to be supplied to the electrical components of the underwater light 500 by way of a power cable (not shown) and/or control/communications cables (not shown) and to create a watertight seal with such components. A positioning assembly 510 provides for the vertical movement of the underwater light 500 within an underwater niche during installation of the underwater light 500 such that the underwater light 500 can be accommodated and installed in underwater niches of different sizes. This allows the underwater light 500 to be positioned in a preferred vertical orientation in a pool or spa underwater niche.

FIG. 24 is a rear view of the underwater light 500 of FIG. 22. As mentioned above, the underwater light 500 may include the positioning assembly 510, the cable attachment assembly 518, the mounting flange 520 and the rear housing 522.

FIG. 25 is an exploded view of the underwater light 500 of FIG. 22. As shown in FIG. 25, the underwater light 500 comprises a plurality of components including the bezel 514; the lens 512; an O-ring 508; a rear housing plate 526; a printed circuit board (PCB) 528; a PCB back plate 529; a heat sink 530; the rear housing 522; an electronics assembly 532; and the mounting flange 520. FIG. 26, is an exploded perspective view of the underwater light 500 of FIG. 22. The components are discussed in further detail below.

FIG. 27 is a perspective view of the bezel 514 of the underwater light 500 of the present disclosure. The bezel 514 includes the screw aperture 514*a*, the plurality of peripheral recesses 514*b* and an annular projection 514*c*. As discussed in further detail below, the annular projection 514*c*, positioned on an interior of the bezel 514, is received by the mounting flange central aperture 520*c*. In addition, the bezel 514 couples to the mounting flange 520 via a plurality of mounting flange fingers 520*b* which engage the plurality of peripheral recesses 514*b* positioned on the bezel 514.

The aperture 514*a* could be elongate in shape to receive the screw 506 (see FIG. 23) in various positions to accommodate niches or recesses of a pool or spa of various diameters, thus allowing the underwater light 500 to be installed in multiple locations and without requiring modification of the underwater light 500. Additionally, a plurality of round apertures could be provided, extending outwardly from the center of the underwater light 500 and toward the periphery of the underwater light 500 to accommodate multiple screw positions.

The bezel 514 could be sized and shaped so as to cover niches or recesses of pools or spas having different diameters, or it could be over sized so as to cover a plurality of different diameters. The bezel 514 could be constructed of a thermally conductive and electrically insulative polymer material. Such a material could include, but is not limited to, electrically insulative and thermally conductive material (e.g., plastic). In addition, the bezel 514 could also be constructed of a chemical resistant material including, but not limited to, urethane, thermoplastic elastomer (TPE) overmolding, silicone or polyamide.

FIG. 28 is a perspective view of the lens 512 of the underwater light 500 of the present disclosure. As mentioned above, the lens 512 includes a central lens portion 512*a*, an annular wall 512*b*, a plurality of tabs 512*c* and a recess 512*d*. The annular wall 512*b* and the lens portion 512 together define the recess 512*d*. As discussed in further detail below, the recess 512*d* receives a rear housing plate annular projection 526*b*. In addition, the plurality of tabs 512*c* are configured to engage a rear housing plurality of notches 522*a* such that the lens 512 is in water tight communication with the rear housing 522.

The lens 512 could be formed using a suitable manufacturing process (e.g., injection molding, compression molding, thermoforming, etc.). The lens 512 could be formed from any suitable, electrically-insulating material, such as glass or a polymeric material (e.g., plastic). Such a material could include, but is not limited to, amorphous transparent copolymer having a cyclic olefin copolymer copolymerized from norbornene and ethylene using a metallocene catalyst and possessing properties important in optical components such as lenses. For examples, TOPAS COC possess properties including, but not limited to, high transparency, low birefringence, high flowability for precision molding, high heat resistance and negligible water absorption. The lens 512 may also be formed from an unbreakable transparent plastic which allows for a light curing adhesive to be utilized for bonding the lens 512 to the rear housing 522.

The outer surface of the lens 512 may have a silicon dioxide ($SiO_2$) coating configured or layer to prevent the formation of condensation on an interior portion of the lens 512. The coating or layer may be deposited by chemical vapor deposition. Alternatively the coating or layer may be formed within the lens 512 or deposited on the interior portion of the lens 512. The coating or layer insulates the underwater light 500 and thereby prevents the formation of condensation caused by a difference between the temperature of the air within the underwater light 500 and the temperature of pool water around the underwater light 500.

FIG. 29 is a perspective view of a rear housing plate 526 of the underwater light 500 of FIG. 22. The rear housing plate 526 includes a plurality of notches 526*a*, an annular projection 526*b* and an internal lens 526*c*. The rear housing plate 526 can be positioned between the lens 512 and the rear housing 522. The internal lens 526 can be positioned between the lens 512 and the PCB 528 to direct or focus light generated by the LEDs 528*a*. The internal lens 526 could be a collimator lens for producing parallel beams of light from the light generated by the LEDs 528*a*, or other desired types of lenses. Also, the collimator lens could be used in conjunction with a spreader lens.

The annular projection 526*b* is received by the lens recess 512*d* formed by the lens annular wall 512*b*. The plurality of notches 526*a* engage the rear housing 522 such that the rear housing plate 526 is in water tight communication with the rear housing 522. In addition, the annular projection 526*b* could be bonded with the lens recess 512*d* through a light curing adhesive, or any other suitable adhesive, to provide a watertight seal for the underwater light 500. The positions of the annular projection 526*b* and the lens recess 512*d* could be reversed such that the annular projection 526*b* could be provided on the lens 512, and the recess 512*d* could be provided on the rear housing plate 526.

Also, it is noted that the annular projection 526*b* need not be provided to facilitate the coupling of the lens 512 to the rear housing plate 526. Indeed, the lens 512 and the rear housing plate 526 could be coupled to each other by way of corresponding flat annular surfaces which are coupled to each other by gluing, bonding, etc., to create a watertight seal. Further, a gasket or O-ring 508 could be used to create a watertight seal between the lens 512 and the rear housing plate 526. Still further, the lens 512 could be coupled to the rear housing plate 526 by way of a watertight threaded connection, i.e., the lens 512 could be threaded onto the rear housing plate 526 and vice versa. Also, the lens 512 could be coupled to the rear housing plate 526 by way of adhesives, sonic welding, spin welding, etc.

The rear housing plate 526 could be constructed of an electrically insulative and thermally conductive polymer material. Such a material could include, but is not limited to, electrically insulative and thermally conductive material (e.g., plastic). In addition, the rear housing plate 526 could also be constructed of a chemical resistant material including, but not limited to, urethane, thermoplastic elastomer (TPE) overmolding, silicone or polyamide.

FIG. 30 is an exploded perspective view of the printed circuit board (PCB) 528, the PCB back plate 529 and a heat sink 530 of the underwater light 500 of the present disclosure. The PCB 528 includes a plurality of light-emitting diodes (LEDs) 528*a* and an electrical component or a plurality of electrical components 528*b*. The heat sink 530 includes an inner surface 530*a* and a plurality of fins 300*b* and is positioned on a central inner surface of the rear housing 522. In addition to the LEDs 528*a*, the PCB 528 may include several electronic components 528*b* including, but not limited to, controllers, transistors, resistors, wiring harnesses, microprocessors, etc. The PCB 528 is affixed to the inner surface 530*a* of the heat sink 530 via the PCB back plate 529 such that the PCB 528 is enclosed by the internal lens 526*c* of the rear housing plate 526 and the heat sink 530. Various optical and/or dielectric components could be used within the underwater light 500 in addition the internal lens 526*c* to enhance lighting, and to promote added safety.

For example, the underwater light 500 could include a plurality of light culminators to respectively be in optical communication with the plurality of LEDs 528*a*. The light culminators collect light generated by the LEDs 528*a* to provide high intensity output. Also, optical light "pipes" could be used in place of the culminators, the pipes being made from a solid plastic or glass material and transmitting light from the LEDs 528*a* directly to an outer surface(s) of the underwater light 500 (e.g., to the lens 512).

It is noted the underwater light 500 could be utilized in horticultural applications. For example, the underwater light 500 could be utilized in underwater vertical farms to cultivate seaweed, rice, wasabi, water chestnut, etc. Accordingly, the respective colors of the LEDs 528*a* could be specified to target the wavelengths at which various chlorophyll pigments in plants absorb light to enable photosynthesis. For example, the LEDs 528*a* could be a variation of blue to target a wavelength spectrum of 400 nm to 500 nm and/or a variation of red to target a wavelength spectrum of 600 nm to 700 nm at which each of chlorophyll A and chlorophyll B absorb light. The LEDs 528*a* could also be a variation of white (e.g., magenta and light green) to provide for visual inspection of plant growth and/or harvest. In addition, the respective colors of the LEDs 528*a* could be modified according to the various stages of plant growth (seedlings, flowering, harvest, etc.) to promote an efficient plant growth cycle and a greater plant yield.

Also an optically transparent potting compound (e.g., formed from a thermally conductive and electrically insulative material) could be used to encapsulate the LEDs 528*a*, as well as the PCB 528 to which the LEDs 528*a* are mounted and portions of the culminators. The potting compound could encapsulate the LEDs 528*a* and the PCB 528 if the culminators are not provided. The potting compound protects the LEDs 528*a* and the PCB 528 from exposure to water in the event that the underwater light 10 is no longer watertight, thereby protecting against electrical shock and promoting safety. Also, the optically transparent potting compound encapsulating the PCB 528 and the LEDs 528*a* mounted thereon in addition to the ability to remove the rear housing 522 of the underwater light provide for the safe replacement of the PCB 528 mounted within the underwater light 500 when one of the LEDs 528*a* is inoperable.

The PCB 528 is affixed to the PCB back plate 529. The PCB back plate 529 is affixed to the inner surface 530*a* of the heat sink 530 such that the PCB 528 is enclosed by the internal lens 526*c* of the rear housing plate 526 and the heat sink 530. The PCB back plate 529 is a separate layer (or plate) of thermally conductive material positioned between the PCB 528 and the heat sink inner surface 530*a*. The PCB back plate 529 could be attached to the PCB 528 and the heat sink inner surface 530*a* using a thermally-conductive adhesive.

For example, the PCB backplate 529 could be bonded to the heat sink inner surface 530*a* by means of a thermally conductive material, such as a thermally-conductive grease, adhesive or potting compound. The thermally-conductive adhesive could include thermally-conductive, fiberglass-reinforced, pressure sensitive adhesive tape, or a thermally-conductive, filled polymer composite interface including an adhesive layer. The application of thermally conductive material allows for the PCB 528 to be in thermal communication with the heat sink 530 and subsequently the rear housing 522. This allows for the transfer of heat from the LEDs 528*a* and the electronic components 528*b* of the PCB 528, through the PCB backplate 529 and the thermally conductive material, to the heat sink 530 and the exterior of the rear housing 522.

The heat sink 530 includes an inner surface 530*a* and is positioned on a central inner surface of the rear housing 522. The heat sink 530 also includes a plurality of fins 530*b* located on the rear of the heat sink 530 to promote heat dissipation. The plurality of fins 530*b* may be rectangular or trapezoidal in shape, continuous or segmented, and/or arranged in a vertical, horizontal or intersecting pattern. The heat sink 530 is constructed of thermally conductive and electrically insulative material and is positioned on a central inner surface of the rear housing 522. Such a material could include, but is not limited to, electrically insulative and thermally conductive material (e.g., plastic). In addition, the heat sink 530 could also be constructed of a chemical resistant material including, but not limited to, urethane, thermoplastic elastomer (TPE) overmolding, silicone or polyamide. The presence of the heat sink 530 on the inner surface of the rear housing 522 allows for heat to be properly dissipated away from the PCB 528 thereby cooling the LEDs 528*a* and the electrical components 528*b*. The heat sink 530 could also be molded to the rear housing 522 during its fabrication or may be attached through a suitable means (e.g. at least one screw or an adhesive).

FIG. 31 is a perspective view of the rear housing 522 of the underwater light 500 of FIG. 22. The rear housing 522 includes a plurality of notches 522*a*. The heat sink 530 may be molded to the rear housing 522 during its fabrication or may be coupled to the rear housing 522 through a suitable means (e.g. at least one screw or an adhesive) such that the rear housing 522 is molded to receive the plurality of fins 530*b* of the heat sink 530. The rear housing 522 may be overmolded over the electronics assembly 532 including control electronics and network electronics. In addition, an optically transparent potting compound (e.g., formed from a thermally conductive and electrically insulative material) could be used to encapsulate the electronics assembly 532.

As mentioned above, the rear housing plate 526 includes a plurality of notches 526*a* and an annular projection 526*b* and can be positioned between the lens 512 and the rear housing 522. The plurality of notches 526*a* engage the rear housing 522 such that the rear housing plate 526 is in water tight communication with the rear housing 522. The annular projection 526*b* is received by the lens recess 512*d* formed by the lens annular wall 512*b*. In addition, the plurality of rear housing notches 522*a* respectively engage the plurality of lens tabs 512*c* to couple the lens 512 to the rear housing 522.

The rear housing 522 is constructed of a thermally conductive and electrically insulative polymer material. In addition, the rear housing 522 could also be constructed of a chemical resistant material including, but not limited to, urethane, thermoplastic elastomer (TPE) overmolding, silicone or polyamide. It is noted that the entirety of the rear housing 522 need not be formed of a thermally-conductive polymeric material. Rather, only a desired portion of the rear housing wall could be formed from such material, in locations where significant amount of heat are generated. In such circumstances, the remainder of the rear housing 522 could be formed by a non-thermally-conductive polymeric material, and the thermally-conductive portion could be coupled to the non-thermally-conductive portion by way of insert molding, overmolding, sonic welding, adhesives, etc.

Advantageously, the electrically non-conductive nature of the exterior components of the underwater light 500 of the present disclosure permit the underwater light 500 to be installed in any location in a pool or spa without requiring specific approval of Underwriters Laboratories. Further, since the exterior of the underwater light 500 is electrically non-conductive, no specific bonding or grounding of the underwater light 500 is necessary. In addition, the rear housing 522 prevents contact with high voltage components of the underwater light 500 such as power supply components, line-level (AC) power, etc.

FIG. 32 is a perspective view of the electronics assembly 532 of the underwater light 500 of FIG. 22. As mentioned above, the electronics assembly 532 may include control and network electronics. The control electronics may be configured to control a display of the underwater light 500 and the network electronics may be configured to communicate with a wireless terminal (e.g., a remote control, tablet, laptop, etc.).

FIG. 33 is a perspective view of the mounting flange 520 of the underwater light 500 of FIG. 22. The mounting flange 520 includes at least one aperture 520*a*, a plurality of fingers 520*b* and a central aperture 520*c*. The central aperture 520*c* is configured to receive the bezel annular projection 514*c*. In addition, the plurality of fingers 520*b* are configured to respectively engage the plurality of bezel peripheral recesses 514*b* to couple the bezel 514 to the mounting flange 520.

The mounting flange 520 could be constructed of a thermally conductive and electrically insulative polymer material (e.g., plastic). In addition, the mounting flange 520 could also be constructed of a chemical resistant material including, but not limited to, urethane, thermoplastic elastomer (TPE) overmolding, silicone or polyamide.

FIG. 34 is an exploded perspective view of the underwater light 500 of FIG. 22, showing an assembly of the lens 512, the bezel 514, the mounting flange 520 and the rear housing 522. The rear housing plate annular projection 522*a* is received by the lens recess 512*d* formed by the lens annular wall 512*b*. The plurality of rear housing notches 522*a* respectively engage the plurality of lens tabs 512*c* to couple the lens 512 to the rear housing 522. The mounting flange central aperture 520*c* is configured to receive the bezel annular projection 514*c*. In addition, the plurality of mounting flange fings 520*b* are configured to respectively engage the plurality of bezel peripheral recesses 514*b* to couple the bezel 514 to the mounting flange 520. The bezel aperture 514*a* could be elongate in shape to receive the screw 506 (not shown) such that a projection of the screw 506 may be received by the mounting flange aperture 520*a*.

Advantageously, the electrically non-conductive nature of the exterior components of the underwater light 500 of the present disclosure (i.e., the lens 512, the bezel 514, the mounting flange 520 and the rear housing 522) permit the underwater light 500 to be installed in any location in a pool or spa without requiring specific approval of Underwriters Laboratories. Further, since the exterior of the underwater light 500 is electrically non-conductive, no specific bonding or grounding of the underwater light 500 is necessary. It is also noted the rear housing 522 prevents contact with high voltage components of the underwater light 500 such as power supply components, line-level (AC) power, etc. In addition, the optically transparent potting compound encapsulating the PCB 528 and the LEDs 528*a* and electronic components 528*b* mounted thereon and the ability to remove the coupled lens 512 and the rear housing 522 of the underwater light 500 provide for the safe replacement of the PCB 528 mounted within the underwater light 500 when an LED 528*a* mounted thereon is inoperable. Specifically, the assembly of the lens 512, the bezel 514, the mounting flange 520 and the rear housing 522 of the underwater light 500 allow for the coupled lens 512 and rear housing 522 to be removed from the front of the underwater light 500 after removal of the bezel 514.

FIG. 35 is a perspective view of the underwater light 500 of FIG. 22, showing assembly of the bezel, the coupled lens and rear housing and the mounting flange. As mentioned above, the assembly of the lens 512, the bezel 514, the mounting flange 520 and the rear housing 522 of the underwater light 500 allow for the coupled lens 512 and rear housing 522 to be removed from the front of the underwater light 500 after removal of the bezel 514. The bezel 514 may be keyed to facilitate the removal thereof from the assembled underwater light 500.

The rear housing plate annular projection 522*a* is received by the lens recess 512*d* formed by the lens annular wall 512*b*. The plurality of rear housing notches 522*a* respectively engage the plurality of lens tabs 512*c* to couple the lens 512 to the rear housing 522. The space between the lens 512 and the rear housing 522 is pressurized when the lens 512 is pressed onto the rear housing 522. Specifically, the O-ring 508, positioned along the periphery of the rear housing plate 526, seals the coupling between the lens 512 and the rear housing 522 such that the lens 512 and the rear housing 522 are in watertight communication. An optically transparent potting compound may encapsulate the PCB 528 and the LEDs 528*a* and electronic components 528*b*. Alternatively, silica packets may be positioned in the pressurized space between the lens 512 and the rear housing 522.

FIG. 36 is an exploded perspective view of the positioning assembly 510 of the underwater light 500 of FIG. 22. The positioning assembly 510 includes a connector 510*a*, a nut 510*d*, a screw 510*c* and a clip 510*f*. The connector 510*a* includes a circular aperture 510*b* that is configured to receive the coupled screw 510*e* and nut 510*d*. The connector 510 also includes rectangular apertures 510*c* configured to respectively receive the prongs 510*g* of the clip 510*f*. The clip 510*f* coupled to the connector 510*a* allows for the vertical movement of the underwater light 500 within an underwater niche. The connector 510*a* coupled to the screw 510*c* and nut 510*d* allows for fixing a position of the underwater light 500 within the underwater niche by tightening the screw 510*c*. As such, the positioning assembly 510 allows for the vertical movement of the underwater light 500 within an underwater niche during installation of the underwater light 500 such that the underwater light 500 can be accommodated and installed in underwater niches of different sizes. This allows the underwater light 500 to be positioned and fixed in a preferred vertical orientation in a pool or spa underwater niche. FIG. 37 is a cross sectional view illustrating the vertical movement provided by the positioning assembly 510.

FIG. 38 is a perspective view of the cable attachment assembly 518 of the underwater light 500 for providing a watertight connection between a power and/or communications cord and the underwater light 500 of the present disclosure. The cable attachment assembly 518 includes a PCB adapter 518*a* having apertures (not shown), a housing 518*b*, a plug nut 518*c* and a cord 518*d* which houses a power/and or communications cord (not shown). It is noted that the PCB adapter 518*a* could have a plurality of shapes. For example, the PCB adapter 518*a* could be a plurality of shapes, including but not limited to, triangular, circular, square and hexagonal.

FIG. 39 is an exploded perspective view of the cable attachment assembly 518 of FIG. 38. The cable attachment assembly 518 may include a PCB adapter 518*a*; a cap housing 518*b*; and plug nut 518*c*; a cord 518*d*; a base connector 518*e*; a cap connector 518*f*; terminals posts 518*g* and screw assembly 518*h*. Each aperture of the PCB adapter 518*a* is configured to receive a terminal post 518*g* electrically coupled to the PCB 528 and the electronics assembly 532. For example, each terminal post 518*g* could be soldered to one or more conductor traces of the PCB 528 and the electronics assembly 532. The terminal posts 518*g* project through the base connector 518*c*. The threaded plug nut 518*c* is threaded onto a threaded aperture formed by a coupling of the base connector 518*e* and the cap connector 518*f*. The coupled base connector 518*c* and the cap connector 518*f* are accommodated within the cap housing 518*b*. The threaded plug nut 518*c* forms a watertight seal with the coupled base connector 518*e* and the cap connector 518*f* via an O-ring or other sealing means. In addition, the threaded plug nut 518*c* receives, in watertight communication (e.g., by epoxy, gluing, etc.), the cord 518*d* which houses the power/and or communications cord. Each conductor of the power and/or communications cord is coupled to respective projections of the terminal posts 518*g* via the screw assembly 518*h*, thereby completing electrical connection of the power and/or communications cord to the PCB 528 and electronics assembly 532. It is noted that the terminal posts 518*g* could be encapsulated with a potting compound.

Having thus described the present disclosure in detail, it is to be understood that the foregoing description is not intended to limit the spirit or scope thereof.

The invention claimed is:

1. An underwater light, comprising:

a watertight housing including:

(i) a lens having an annular wall and a recess formed by the annular wall, (ii) a rear housing plate having an internal lens, and (iii) a rear housing coupled to the lens; and a printed circuit board assembly including:

(i) a printed circuit board having a front surface and a rear surface, the front surface including at least one light-emitting element; and (ii) a heat sink having an inner surface and a rear surface, the rear surface of the heat sink including a plurality of heat dissipating fins;

wherein:

the printed circuit board assembly is positioned between the rear housing plate and the rear housing and enclosed by the lens and the rear housing, and the printed circuit board is removable from the watertight housing and encapsulated by an optically transparent potting compound formed from a thermally conductive and electrically insulative material.

2. The underwater light of claim 1, wherein the lens is formed of an electrically insulating material including one of glass or a polymeric material, and includes silicon dioxide formed within the lens, on an outer surface of the lens, or on an interior surface of the lens.

3. The underwater light of claim 1, wherein the rear housing plate is positioned between the lens and the rear housing, the lens recess receiving the annular projection of the rear housing plate and the plurality of notches of the rear housing plate engaging the rear housing such that the internal lens of the rear housing plate is positioned between the lens and the printed circuit board to direct or focus light generated by the at least one light-emitting element.

4. The underwater light of claim 3, further comprising a gasket between the lens and the rear housing plate.

5. The underwater light of claim 1, wherein each of the rear housing plate and the rear housing is formed of at least one of a thermally conductive and electrically insulative polymer material or a chemical material including one of urethane, thermoplastic elastomer over molding, silicone or polyamide.

6. The underwater light of claim 1, further comprising a back plate having a front surface and a rear surface and being formed of a thermally conductive material, wherein the rear surface of the printed circuit board is affixed to the front surface of the back plate and the rear surface of the back plate is affixed to the inner surface of the heat sink, the back plate transferring heat from the printed circuit board through the back plate to the heat sink and an exterior of the rear housing.

7. The underwater light of claim 1, further comprising an electronics assembly including control electronics and network electronics, wherein:

the electronics assembly is encapsulated by the optically transparent potting compound, and the electronics assembly is molded to the rear housing and the rear housing is overmolded over the electronics assembly.

8. The underwater light of claim 1, wherein:

the heat sink is molded to the rear housing and the rear housing is molded to receive the plurality of heat dissipating fins of the heat sink, and the heat sink is formed of at least one of a thermally conductive and electrically insulative polymer material or a chemical material including one of urethane, thermoplastic elastomer overmolding, silicone or polyamide.

9. The underwater light of claim 1, further comprising a cable attachment assembly including:

a printed circuit board (PCB) adapter receiving at least one terminal post of a PCB of an underwater light;

a base connector couplable to the PCB adapter, the base connector receiving an electrical cable supplying one or more of power or data for the underwater light;

a cap connector received by the base connector;

a screw assembly received by the cap connector and coupling at least one conductor of the electrical cable to the at least one terminal post of the PCB; and a cap housing coupling the base connector to the PCB adapter.

10. An underwater light, comprising:

a watertight housing including:

(i) a lens having an annular wall and a recess formed by the annular wall, and (ii) a rear housing coupled to the lens;

a printed circuit board having a front surface and a rear surface, the front surface including at least one light-emitting element; and a heat sink having an inner surface and a rear surface, the rear surface of the heat sink including a plurality of heat dissipating fins;

wherein the printed circuit board assembly is positioned between and enclosed by the lens and the rear housing, and wherein the printed circuit board is removable from the watertight housing and encapsulated by an optically transparent potting compound.

11. The underwater light of claim 10, wherein the lens is formed of an electrically insulating material including one of glass or a polymeric material, and includes silicon dioxide formed within the lens, on an outer surface of the lens, or on an interior surface of the lens.

12. The underwater light of claim 10, wherein the rear housing is formed of at least one of a thermally conductive and electrically insulative polymer material or a chemical material including one of urethane, thermoplastic elastomer over molding, silicone or polyamide.

13. The underwater light of claim 10, further comprising an internal lens, wherein the internal lens is positioned between the lens and the printed circuit board to direct or focus light generated by the at least one light-emitting element.

14. The underwater light of claim 10, wherein:

the heat sink is positioned on a central inner surface of the rear housing, the heat sink being molded to the rear housing and the rear housing being overmolded over the heat sink, and the heat sink is formed of at least one of a thermally conductive and electrically insulative polymer material or a chemical material including one of urethane, thermoplastic elastomer overmolding, silicone or polyamide.

15. The underwater light of claim 14, wherein the rear surface of the printed circuit board is affixed to the overmolded inner surface of the heat sink by a thermally conductive material including at least one of a grease, an adhesive or a potting compound, the thermally conductive material transferring heat from the printed circuit board through the thermally conductive material to the heat sink and an exterior of the rear housing.

16. The underwater light of claim 10, further comprising an electronics assembly, wherein the electronics assembly is encapsulated by the optically transparent potting compound and molded to the rear housing, the rear housing being overmolded over the electronics assembly.

17. The underwater light of claim 10, further comprising a cable attachment assembly including:

a printed circuit board (PCB) adapter receiving at least one terminal post of a PCB of an underwater light;

a base connector couplable to the PCB adapter, the base connector receiving an electrical cable supplying one or more of power or data for the underwater light;

a cap connector received by the base connector;

a screw assembly received by the cap connector and coupling at least one conductor of the electrical cable to the at least one terminal post of the PCB; and a cap housing coupling the base connector to the PCB adapter.

18. A cable attachment assembly for an underwater light, comprising:

a printed circuit board (PCB) adapter including at least one aperture configured to receive at least one terminal post of a PCB of an underwater light;

a base connector couplable to the PCB adapter, the base connector receiving an electrical cable supplying one or more of power or data for the underwater light, the at least one terminal post of the PCB of the underwater light projecting through the base connector of the cable attachment assembly;

a cap connector received by the base connector;

a screw assembly received by the cap connector and coupling at least one conductor of the electrical cable to the at least one terminal post of the PCB; and a cap housing coupling the base connector to the PCB adapter.

19. The cable attachment assembly of claim 18, further comprising a plug nut forming a watertight seal between the electrical cable and the base connector.

20. The cable attachment assembly of claim 18, wherein the at least one terminal post is encapsulated with a potting compound.

21. The cable attachment assembly of claim 18, wherein the at least one terminal post is soldered to a conductor trace of the PCB.

22. The cable attachment assembly of claim 18, wherein the at least one terminal post extends through the aperture formed in the PCB adapter.

* * * * *